United States Patent
Yu

(10) Patent No.: US 11,260,368 B2
(45) Date of Patent: Mar. 1, 2022

(54) METHOD FOR REDUCING METAL OXIDE AND METHOD FOR PRODUCING PHOTOCATALYST USING SAME

(71) Applicant: DAEGU GYEONGBUK INSTITUTE OF SCIENCE & TECHNOLOGY, Daegu (KR)

(72) Inventor: Jong-Sung Yu, Seoul (KR)

(73) Assignee: DAEGU GYEONGBUK INSTITUTE OF SCIENCE & TECHNOLOGY, Daegu (KR)

( * ) Notice: Subject to any disclaimer, the term of this patent is extended or adjusted under 35 U.S.C. 154(b) by 587 days.

(21) Appl. No.: 15/552,722

(22) PCT Filed: Sep. 30, 2016

(86) PCT No.: PCT/KR2016/010993
§ 371 (c)(1),
(2) Date: Dec. 11, 2017

(87) PCT Pub. No.: WO2017/057959
PCT Pub. Date: Apr. 6, 2017

(65) Prior Publication Data
US 2018/0318795 A1 Nov. 8, 2018

(30) Foreign Application Priority Data

Sep. 30, 2015 (KR) .................. 10-2015-0137690
Mar. 4, 2016 (KR) .................. 10-2016-0026325
Jul. 25, 2016 (KR) .................. 10-2016-0093986

(51) Int. Cl.
*B01J 23/00* (2006.01)
*B01J 21/06* (2006.01)
(Continued)

(52) U.S. Cl.
CPC ............ *B01J 21/063* (2013.01); *B01J 21/10* (2013.01); *B01J 23/42* (2013.01); *B01J 35/004* (2013.01);
(Continued)

(58) Field of Classification Search
CPC . B01J 21/063; B01J 37/16; B01J 37/34; B01J 21/10; B01J 35/0013; B01J 35/1014;
(Continued)

(56) References Cited

U.S. PATENT DOCUMENTS 6,152,982 A 11/2000 Froes et al.

FOREIGN PATENT DOCUMENTS

JP 1997192496 A 7/1997
JP 2005288316 A 10/2005
(Continued)

OTHER PUBLICATIONS

Translation of JP-2012214348-A (Year: 2012).*
(Continued)

*Primary Examiner* — Haytham Soliman
(74) *Attorney, Agent, or Firm* — Harness, Dickey & Pierre, P.L.C.

(57) ABSTRACT

The present invention relates to a method of reducing a metal oxide comprising the steps of preparing a mixture by mixing a metal oxide and a metal hydride (step 1) and reducing the mixture by heat treatment (step 2) and a method of producing a photocatalyst using the same, and The method of reducing a metal oxide of the present invention can easily reduce such metal oxides as $TiO_2$, $ZrO_2$, $V_2O_3$, and $Fe_2O_3$.

6 Claims, 84 Drawing Sheets

(51) Int. Cl.

| | |
|---|---|
| *C01G 23/047* | (2006.01) |
| *B01J 37/16* | (2006.01) |
| *C01G 49/06* | (2006.01) |
| *C01G 31/02* | (2006.01) |
| *C01G 19/02* | (2006.01) |
| *C01G 23/04* | (2006.01) |
| *C01G 9/02* | (2006.01) |
| *B01J 37/34* | (2006.01) |
| *B01J 21/10* | (2006.01) |
| *B01J 35/00* | (2006.01) |
| *B01J 35/10* | (2006.01) |
| *B01J 23/42* | (2006.01) |
| *C01G 25/02* | (2006.01) |
| *B01J 37/08* | (2006.01) |

(52) U.S. Cl.
CPC ........... *B01J 35/0013* (2013.01); *B01J 35/10* (2013.01); *B01J 35/1014* (2013.01); *B01J 37/082* (2013.01); *B01J 37/16* (2013.01); *B01J 37/34* (2013.01); *C01G 9/02* (2013.01); *C01G 19/02* (2013.01); *C01G 23/043* (2013.01); *C01G 23/047* (2013.01); *C01G 25/02* (2013.01); *C01G 31/02* (2013.01); *C01G 49/06* (2013.01); *C01P 2002/01* (2013.01); *C01P 2002/70* (2013.01); *C01P 2002/72* (2013.01); *C01P 2002/82* (2013.01); *C01P 2002/84* (2013.01); *C01P 2002/85* (2013.01); *C01P 2002/88* (2013.01); *C01P 2004/04* (2013.01); *C01P 2004/64* (2013.01); *C01P 2004/80* (2013.01)

(58) Field of Classification Search
CPC ........ B01J 23/42; B01J 35/004; B01J 37/082; B01J 35/10; C01G 49/06; C01G 31/02; C01G 19/02; C01G 23/043; C01G 9/02; C01G 25/02; C01G 23/047; C01P 2004/04; C01P 2002/84; C01P 2002/82; C01P 2002/72; C01P 2004/80; C01P 2002/85; C01P 2002/88; C01P 2002/01; C01P 2002/70; C01P 2004/64
USPC ........................................................ 502/350
See application file for complete search history.

(56) References Cited

FOREIGN PATENT DOCUMENTS

| JP | 2007083259 A | | 4/2007 |
|---|---|---|---|
| JP | 2012214348 A | * | 11/2012 |
| JP | 2012214348 A | | 11/2012 |
| KR | 1020020082633 A | | 10/2002 |

OTHER PUBLICATIONS

Nersisyan et al. "Direct magnesiothermic reduction of titanium dioxide to titanium powder through combustion synthesis" Chemical Engineering Journal vol. 235, Jan. 1, 2014, pp. 67-74 (Year: 2014).*
Gordon et al. "Nonaqueous Synthesis of TiO2 Nanocrystals Using TiF4 to Engineer Morphology, Oxygen Vacancy Concentration, and Photocatalytic Activity" J. Am. Chem. Soc. 2012, 134, 15, 6751-6761 (Year: 2012).*
Zhang, De Liang, et al. "Reaction Kinetics and Microstructural Evolution during the Heating of High Energy Ball Milled Al—TiO2 and Al—V2O5 Composite Powders." Journal of Metastable and Nanocrystalline Materials, vol. 13, Trans Tech Publications, Ltd., Jan. 2002, pp. 287-292. (Year: 2002).*
Nersisyan et al. "Titanium powder prepared by a rapid exothermic reaction." Chemical Engineering Journal vol. 157, Issue 1, Feb. 15, 2010, pp. 270-275. (Year: 2010).*
Eshed M, Pol S, Gedanken A, Balasubramanian M. Zirconium nanoparticles prepared by the reduction of zirconium oxide using the RAPET method. Beilstein J Nanotechnol. 2011;2:198-203. doi:10.3762/bjnano.2.23 (Year: 2011).*
Behnajady et al. (2011). Synthesis of Mg-Doped TiO2 Nanoparticles under Different Conditions and its Photocatalytic Activity. Photochemistry and photobiology, 87(6), 1308-1314.
Chen et al. (2011). Increasing solar absorption for photocatalysis with black hydrogenated titanium dioxide nanocrystals. Science, 331(6018), 746-750.
Gusev et al. (2003). Synthesis of Ti4O7 magneli phase using mechanical activation. Science of Sintering, 35(3), 141-145.
Naldoni et al. (2012). Effect of nature and location of defects on bandgap narrowing in black TiO2 nanoparticles. Journal of the American Chemical Society, 134(18), 7600-7603.
Park et al. (2011). Preparation of porous zirconium microspheres by magnesiothermic reduction and their microstructural characteristics. Journal of Materials Research, 26(16), 2117-2122.
Saldan et al. (2015). Hydrogen storage properties of γ-Mg (BH 4) 2 modified by MoO 3 and TiO 2. International Journal of Hydrogen Energy, 40(36), 12286-12293.
Sinhamahapatra et al. (2015). A new approach to prepare highly active and stable black titania for visible light-assisted hydrogen production. Energy & Environmental Science, 8(12), 3539-3544.
Sinhamahapatra et al. (2016). Oxygen-deficient zirconia (ZrO2-x): a new material for solar light absorption. Scientific reports, 6, 27218: 1-8.
English language abstract for JP 1997192496 A (1997).
English language abstract for JP 2005288316 A (2005).
English language abstract for JP 2007083259 B2 (2007).
English language abstract for JP 2012214348 A (2012).
English language abstract for KR 1020020082633 A (2002).
International Search Report from corresponding PCT/KR2016/010993 dated Jan. 6, 2017.

* cited by examiner

FIG. 1

| Color | | | | | |
|---|---|---|---|---|---|
| | Comparative example 1 | Example 1 | Example 2 | Example 3 | Example 4 |

FIG. 33

| CT | CT-Ar | BT-0.3 | BT-0.5 |
|---|---|---|---|

| BT-0.6 | BT-0.75 | BT-1 |
|---|---|---|

| Color | | | | |
|---|---|---|---|---|
| | Comparative example 11 | Example 18 | Example 17 | Example 19 |

METHOD FOR REDUCING METAL OXIDE AND METHOD FOR PRODUCING PHOTOCATALYST USING SAME

CROSS-REFERENCE TO RELATED APPLICATIONS

This application is a U.S. National Phase Application of PCT/KR2016/010993, filed Sep. 30, 2016, which claims priority from KR 10-2015-0137690, filed Sep. 30, 2015; KR 10-2016-0026325, filed Mar. 4, 2016; and KR 10-2016-0093986, filed Jul. 25, 2016, the contents of which applications are incorporated herein by reference in their entireties for all purposes.

BACKGROUND OF THE INVENTION

1. Field of the Invention

The present invention relates to a method for reducing a metal oxide and a method for producing a photocatalyst using the same.

2. Description of the Related Art

Titania ($TiO_2$) has been studied as a semiconductor photocatalyst for various reactions such as hydrogen generation, $CO_2$ reduction, and removal of environmental contaminants. In addition, it has been applied to a wide range of sensors, photocatalysts for various reactions, photovoltaics, and energy related electrode materials. The characteristics of such materials depend on the chemical composition, size, surface characteristic, and morphology. In particular, when the chemical composition and surface characteristic of a material is changed, the material can display new physical and chemical characteristics.

The crystal structure of titania ($TiO_2$) can be roughly divided into rutile structure and anatase structure. Titania having the rutile crystal structure is stable at high temperature and has a high refractive index, hardness, and dielectric constant, so that it can be widely used for white pigment of industrial paint, cosmetics, food additives, etc. Titania having the anatase crystal structure has stronger oxidation energy than titania having the rutile crystal structure. For this reason, titania having the anatase crystal structure is more advantageous for use as a photocatalyst. It is also advantageous if the chance of transition to the rutile crystal structure is less.

The energy band gap of anatase titania ($TiO_2$) is about 3.2 eV, indicating it responses in the ultraviolet region having a wavelength of about 380 nm or shorter. That is, anatase titania shows photolysis only under ultraviolet light condition. Anatase titania itself does not react in the visible light range taking most of the sunlight, and displays photolysis only when it is irradiated with ultraviolet light by using a special light source such as an UV lamp. Therefore, studies on the anatase titania that can react in the visible light range taking most of the sunlight have been actively going on.

The most representative method to make anatase titania respond in the visible light range is doping the anatase titania with ions of such metals as Fe, V, and Pt (Japanese Patent Publication No. 1997-192496, No. 2007-0083259, Korean Patent Publication No. 2002-0082633). However, when the metal ions are doped as described above, various defects are generated due to the photodegradation and charge imbalance, and the performance is not sufficient.

Recently, hydrogen-treated reduced titania has been reported, which shows a significant visible light absorbing capacity. However, despite the enhanced absorption capacity extended to the visible light range of the reduced titania, the efficiency of water splitting under visible light is lower than expected.

Therefore, it is urgently required to develop a new technique to prepare a titania photocatalyst having an excellent photolysis capability with maintaining excellent activity in visible light range.

In the course of study about the reduction method of titania, the present inventors developed a method of reducing a metal oxide, and a method of producing a reduced titania showing various characteristics using the same, and a method of producing a reduced titania photocatalyst having excellent activity and stability against sunlight, leading to the completion of the present invention.

Related prior art references are the following patent references.

(Patent reference 1) Japanese Patent Publication No. 1997-192496, (Patent reference 2) Japanese Patent Publication No. 2007-0083259, (Patent reference 3) Korean Patent Publication No. 2002-0082633.

SUMMARY OF THE INVENTION

It is an object of the present invention to provide a method of reducing a metal oxide and a method of producing a photocatalyst using the same.

To achieve the above object, the present invention provides a method of reducing a metal oxide comprising the following steps:

preparing a mixture by mixing a metal oxide and a metal hydride (step 1); and reducing the mixture above by heat-treatment (step 2).

The present invention also provides a method of producing a photocatalyst comprising the following steps:

preparing a mixture by mixing a metal oxide and a metal hydride (step 1); and preparing a photocatalyst by heat-treating the mixture (step 2).

The present invention also provides a method of reducing a metal oxide comprising the following steps:

preparing a mixture by mixing a metal oxide and a metal (step 1); and heat-treating the mixture in an atmosphere in which hydrogen ($H_2$) is supplied (step 2).

In addition, the present invention provides to a photocatalyst prepared by the method of reducing a metal oxide above.

Advantageous Effect

The method of reducing a metal oxide of the present invention can easily reduce such metal oxides as $TiO_2$, $ZrO_2$, $V_2O_3$, and $Fe_2O_3$. In a preferred embodiment of the present invention, the method of producing the reduced titania ($TiO_{2-x}$) regulate the reduction level so that it is advantageous for the preparation of a titania material that can be applied in various fields. The method of the invention is also advantageous in providing the reduced titania that shows excellent photocatalytic efficiency in visible light range, compared with the conventional method.

The photocatalyst prepared by the method of reducing a metal oxide above shows the efficiency of solar hydrogen production (solar to $H_2$) from methanol and water of 1~4% and the efficiency of solar hydrogen production (STH) from seawater of at least 1%. Therefore, the photocatalyst of the present invention can be used to produce hydrogen, the clean energy resource, from water by using sunlight more easily and less expensively.

BRIEF DESCRIPTION OF THE DRAWINGS

The application of the preferred embodiments of the present invention is best understood with reference to the accompanying drawings, wherein:

FIG. 1 is a set of photographs illustrating the comparison of colors of those titanias prepared in the comparative example and the example of the present invention.

FIG. 33 is a set of photographs illustrating the colors of the photocatalysts prepared in the comparative example and the example of the present invention.

FIG. 62 is a set of photographs illustrating the color of the zirconias prepared in the comparative example and the example of the present invention, observed by the naked eye.

DESCRIPTION OF THE PREFERRED EMBODIMENTS

Figure 2:
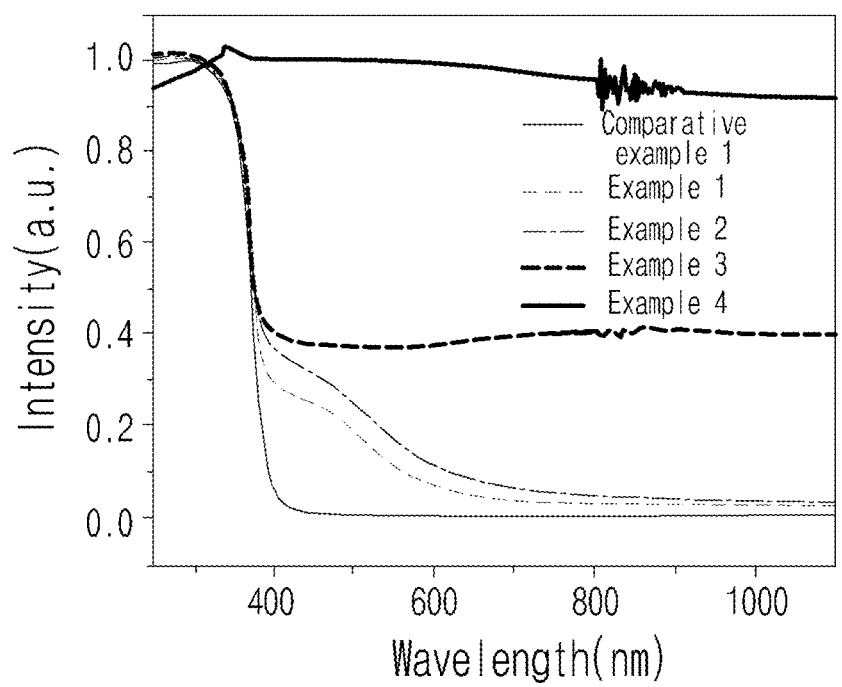
FIG. 2 is a graph illustrating the light absorption characteristics of those titanias prepared in the comparative example and the example of the present invention.

Hereinafter, the preferable embodiments of the present invention are described with the attached drawings. However, the embodiments of the present invention can be modified and altered in various ways and the present invention is not limited to the following illustration. It is well understood by those in the art who has the average knowledge on this field that the embodiments of the present invention are given to explain the present invention more precisely. Therefore, the shape and size of the elements in the drawings may be exaggerated for clarity of illustration and the elements indicated by the same mark in the drawings are the same elements. The factors showing similar function or activity are also indicated by the same mark in all the drawings. In addition, the inclusion of an element throughout the specification does not exclude other elements, but may include other elements, unless specifically stated otherwise.

<Method for Reducing Metal Oxides>

The present invention provides a method of reducing a metal oxide comprising the steps of preparing a mixture by mixing a metal oxide and a metal hydride (step 1); and reducing the mixture above by heat-treatment (step 2).

The method of reducing a metal oxide of the present invention is advantageous in reducing various metal oxides such as ZrO, $SiO_2$, ZnO, $Fe_2O_3$, $SnO_2$, $Al_2O_3$, $V_2O_3$, RuO, and $SrTiO_3$ more easily, by which it gives advantages in preparing various materials with improved physical properties and catalytic characteristics.

Hereinafter, the method of reducing a metal oxide of the present invention is described in more detail.

In the method of reducing a metal oxide of the present invention, step 1 is to prepare a mixture by mixing a metal oxide and a metal hydride.

At this time, the metal oxide is preferably one or more oxides selected from the group consisting of $TiO_2$, $ZrO_2$, $V_2O_3$, $SnO_2$, $ZnO_2$, and $Fe_2O_3$.

The metal hydride above is preferably one or more hydrides selected from the group consisting of $MgH_2$, $NaAlH_4$, $NaBH_4$, $LiAlH_4$, $CaH_2$, $ZrH_2$, $TiH_2$, $VH_2$, NaH, LiH, KH, RbH, CsH, and $Mg_2FeH_6$.

For example, according to the method above, $TiO_2$ can be reduced by using $MgH_2$, by which a reduced titania with the anatase or rutile structure which has the same crystal structure as the original titania ($TiO_2$) can be obtained. In addition, TiO and Ti compounds can also be obtained by the method above.

In the method of reducing a metal oxide of the present invention, step 2 is to reduce the mixture above by heat-treatment.

At this time, the heat-treatment is preferably performed in the presence of an inert gas, for example in the presence of argon or nitrogen gas. The heat-treatment is preferably performed at the temperature of 200~700° C., and more preferably performed at 100~700° C.

This is to prevent a reaction other than the reduction reaction of the metal oxide during the heat-treatment.

The method of reducing a metal oxide of the present invention can additionally include a step of treating the reduced product with acid after the step of reducing and heat-treating using a reducing agent and heat, but not always limited thereto.

The step of acid treatment is to eliminate any metal component from the product. That is, the mixture finished with the heat-treatment in step 2 is etched with acid, so that the metal component generated from the metal hydride in the course of the reduction of the metal hydride to eliminate the metal component. The step of acid treatment can be carried out by stirring in 2.0 M HCl solution for 24 hours, but the method of treating with acid is not limited thereto.

In an example of the present invention, when the metal oxide is titania ($TiO_2$), a reduced titania ($TiO_{2-x}$) can be prepared (In the formula above, x is a rational number of 0.00001~2).

In an example of the present invention, in the method of producing a reduced titania ($TiO_{2-x}$) using a metal hydride, the degree of reduction of titania can be properly regulated by the metal hydride so that various types of reduced titania ($TiO_2$) can be prepared. As a result, various types of titania materials having improved physical properties and catalytic characteristics can be advantageously prepared.

By controlling the size of the bandgap of titania and the number of oxygen vacancies by the metal hydride, the reduced titania ($TiO_{2-x}$) having significantly improved absorption performance, photocatalytic performance, and catalytic stability can be prepared.

In an example of the present invention, when titania ($TiO_2$) is used as a metal oxide and magnesium hydride ($MgH_2$) is used as a metal hydride, the heat-treatment in step 2 is preferably performed at 100~700° C., which is preferred to induce the reduction reaction of titania ($TiO_2$) by $MgH_2$. If the heat-treatment is performed at the temperature lower than 100° C., titania ($TiO_2$) would not be reduced. If the heat-treatment is performed at the temperature higher than 700° C., the reduction would be induced excessively, which is not only inefficient and waste of energy but also hard to control the surface characteristics of the reduced titania.

In an example of the present invention, the method of producing the reduced titania ($TiO_{2-x}$) can additionally include a step of acid-treatment after heat-treatment.

The step of acid-treatment is to eliminate the metal component generated in the course of reduction of titania ($TiO_2$) by etching the mixture finished with the heat-treatment in step 2 using an acid. By this acid-treatment, the reduced titania ($TiO_{2-x}$) not-containing the metal component can be prepared. The acid-treatment above is preferably performed by stirring for 24 hours in 2.0 M HCl solution, but not always limited thereto.

Thereafter, the acid treated mixture is washed with water to eliminate the acid, followed by drying at 80° C. to collect the reduced titania ($TiO_{2-x}$) The present invention also provides a method of reducing a metal oxide comprising the steps of preparing a mixture by mixing a metal oxide and a metal (step 1) and heat-treating the mixture in an atmosphere in which hydrogen ($H_2$) is supplied.

At this time, in the step of preparing a mixture by mixing a metal oxide and a metal, the molar ratio of the metal to the metal oxide is 0.1~1.5 and more preferably 0.3~1.0.

The step of preparing a mixture by mixing a metal oxide and a metal can be accomplished by mixing metal oxide and metal powders using a stirrer. The said metal oxide and metal powders are not particularly limited and might be commercial ones.

In the step of preparing a mixture by mixing metal oxide and metal powders, the molar ratio of the metal to the metal oxide is 0.3~1.0. The titania photocatalyst of the present invention contains Mg, by which light absorption and photoactivity can be improved not only in UV range but also in visible light range and infrared (IR) light range. When the molar ratio of the metal to the metal oxide is 0.3~0.7, the photoactivity can be further improved.

The present invention includes a step of heat-treating the metal oxide and metal powders in an atmosphere in which hydrogen ($H_2$) is supplied. Heat treatment in the presence of hydrogen ($H_2$) facilitates the reduction of the metal oxide powder and the improvement of absorbance and photoactivity by affecting the size and the surface area of the crystal grains of the generated photocatalyst.

To maximize the above effect, the concentration of hydrogen ($H_2$) in Ar can be 5%, and the heat-treatment temperature can be 400~800° C.

After the step of heat-treatment, the step of acid-treatment can be added. Mg can be removed by treating the heat-treated powder with an acid. The step of acid-treatment can be accomplished by stirring for 24 hours in 1.0 M HCl solution, but the present invention is not limited thereto.

Then, the acid treated titania is washed with water to eliminate the acid, followed by drying at 80° C. to produce the titania photocatalyst.

<Preparation of Photocatalyst>

The present invention also provides a method of producing a photocatalyst comprising the steps of preparing a mixture by mixing a metal oxide and a metal hydride (step 1) and preparing a photocatalyst by heat-treating the mixture (step 2).

In a preferred embodiment of the present invention, the metal oxide can be one or more oxides selected from the group consisting of $TiO_2$, $ZrO_2$, $V_2O_3$, $SnO_2$, $ZnO_2$, and $Fe_2O_3$.

The conventional titania ($TiO_2$) photocatalyst has the energy bandgap of approximately 3.2 eV, so that it reacts in the ultraviolet range having a wavelength of about 380 nm or shorter. That is, the titania ($TiO_2$) photocatalyst itself does not react in the visible light range taking most of the sunlight, and can only act as a photocatalyst when it is irradiated with ultraviolet light by using a special light source such as an UV lamp.

The reduced titania photocatalyst produced by the conventional method displays a little improved light absorption performance in the visible light range, but does not show the corresponding hydrogen generation by water decomposition. That is, the reduced titania photocatalyst prepared by the conventional method improves the photoactivity by increasing the electron density and improving the charge transfer in the titania due to the surface defects and oxygen vacancies formed by reduction playing the role of electron donors, but if the surface defects and oxygen vacancies exceed a certain level, they play as a mediator to accelerate electron-hole recombination, resulting in the decrease of photoactivity, on the contrary. Therefore, the conventional reduced titania, even with the improved light absorption performance in the visible light range, still has a problem that the photocatalyst performance using visible light, for example, hydrogen generation performance by water decomposition is not greatly improved.

The method of producing the reduced titania ($TiO_{2-x}$) photocatalyst according to an example of the present invention is to overcome the problem of the conventional photocatalyst, and thus to provide a novel converted titania ($TiO_{2-x}$) photocatalyst displaying significantly improved photocatalyst performance in the visible light range.

The method of producing the reduced titania ($TiO_{2-x}$) photocatalyst using a metal hydride of the present invention can provide a photocatalyst having significantly improved sunlight absorption performance, photocatalyst performance, and catalytic stability by controlling the size of bandgap, number of oxygen vacancy, and hydrogen substitution with the vacancy in the titania by using the metal hydride.

The method of producing the reduced titania ($TiO_{2-x}$) photocatalyst of the present invention is advantageous in preparing the reduced titania ($TiO_{2-x}$) photocatalyst more easily by heat-treating titania ($TiO_2$) with comparatively low temperature of 100~700° C.

Hereinafter, the method of producing a photocatalyst of the present invention is described in more detail, step by step.

In the method of producing a photocatalyst of the present invention, step 1 is to prepare a mixture by mixing a metal oxide and a metal hydride.

Step 1 is a step of mixing a metal oxide and a metal hydride as a reducing agent.

In a preferred embodiment of the present invention, the metal oxide is white titania ($TiO_2$) which can be synthesized or a commercial product. The metal hydride can be one or more hydrides selected from the group consisting of Hydride® $MgH_2$, $NaAlH_4$, $NaBH_4$, $LiAlH_4$, $CaH_2$, $ZrH_2$, $TiH_2$, $VH_2$, NaH, LiH, KH, RbH, CsH, and $Mg_2FeH_6$.

For example, magnesium hydride ($MgH_2$) can be used as the metal hydride, and at this time the content of magnesium hydride ($MgH_2$) is preferably 0.1~2 molar ratio to the titania ($TiO_2$) and more preferably 0.1~1 molar ratio to the titania ($TiO_2$)

The said titania ($TiO_2$) is reduced by the magnesium hydride ($MgH_2$) above, which is to increase the photocatalyst performance to sunlight.

If the molar ratio of magnesium hydride ($MgH_2$) to titania ($TiO_2$) is less than 0.1, which means the amount of the reducing agent is relatively small, the reduction of titania ($TiO_2$) would not be successfully accomplished. If the molar ratio of magnesium hydride ($MgH_2$) to titania ($TiO_2$) is more than 1, the number of oxygen vacancy is increased in the titania ($TiO_2$) caused by the magnesium hydride ($MgH_2$), so that the light absorption ability in the visible light range would be increased but the phase change of $TiO_2$ into TiO or to Ti would be caused by the excessive amount of magnesium hydride ($MgH_2$) or the photocatalyst performance would be reduced because the excessive magnesium hydride ($MgH_2$) reacts with the titania to produce a new compound.

More preferably, the molar ratio of magnesium hydride ($MgH_2$), the reducing agent, to titania ($TiO_2$) is 0.1~0.75.

To increase photocatalyst performance using visible light, it is preferred to regulate the number of defects generated by $MgH_2$ in $TiO_2$ and the hydrogen doping the oxygen vacancy. If the molar ratio of $MgH_2$ to $TiO_2$ is more than 0.75, the number of oxygen vacancy made by $MgH_2$ would be increased and accordingly visible light absorption would be increased, while, on the other hand, the number of electron-hole recombination would also be increased or phase conversion would be caused, resulting in the decrease of photocatalyst performance.

In the method of producing a photocatalyst of the present invention, step 2 is a step of mixing the metal oxide and the metal hydride, which is a reducing agent, and then heat-treating the mixture to reduce the metal oxide.

At this time, the heat-treatment is preferably performed in an inert atmosphere.

This is to prevent a reaction other than the reduction reaction of metal oxide by metal hydride in the course of the heat-treatment. For example, the inert atmosphere can be an atmosphere in which argon or nitrogen gas is supplied, but not always limited thereto When the heat-treatment is performed in the presence of $MgH_2$, it is preferably performed at the temperature between 100° C. and 700° C.

This is to induce the reduction reaction of metal oxide by $MgH_2$. If the heat-treatment is performed at the temperature lower than 100° C., the metal oxide would not be reduced. If the heat-treatment is performed at the temperature higher than 700° C., the reduction would be induced excessively, which is not only inefficient and waste of energy but also hard to control the surface characteristics of the photocatalyst.

The method of producing a photocatalyst can additionally include a step of acid-treatment after heat-treatment.

The step of acid-treatment is to eliminate the metal component and magnesium oxide (MgO) generated in the course of reduction of metal oxide by etching the mixture finished with the heat-treatment in step 2 using an acid. By this acid-treatment, the photocatalyst not-containing the metal component can be prepared. The acid-treatment above is preferably performed by stirring for 24 hours in 2.0 M HCl solution, but not always limited thereto.

Thereafter, the acid treated mixture is washed with water to eliminate the acid, followed by drying at 80° C. to collect the reduced metal oxide photocatalyst.

The method of producing a photocatalyst can additionally include a step of forming platinum (Pt) on the surface of the reduced metal oxide photocatalyst by irradiating light to the solution containing a platinum (Pt) precursor wherein the reduced metal oxide photocatalyst of step 2 is dispersed, by which the photocatalyst containing platinum (Pt) can be prepared.

At this time, the light can be a light including UV-visible light such as general xenon (Xe) lamp, and sunlight can also be used.

Sunlight is used to cause the photocatalyst activity. The reduced metal oxide photocatalyst prepared in step 2 displays excellent photocatalyst performance in sunlight including visible light, so that the photocatalyst containing Pt can be prepared by reducing Pt from the solution containing the Pt precursor using UV-visible light.

The method of producing a photocatalyst of the present invention can additionally include a step of forming platinum (Pt) on the surface of the photocatalyst as described above to produce a reduced metal oxide photocatalyst having platinum (Pt) particles dispersed on its surface.

By this way, the photocatalyst with better photocatalyst performance to sunlight can be prepared.

At this time, the platinum is preferably included in the reduced metal oxide photocatalyst at the concentration of 0.1~5 weight % by the reduced metal oxide photocatalyst, and more preferably 0.25~5 weight %.

The said concentration is advantageous to increase the catalytic activity of Pt. If Pt is included in the reduced metal oxide photocatalyst at the concentration of less than 0.1 weight % by the reduced metal oxide photocatalyst, the catalytic activity improvement effect of Pt would be very weak. If the concentration of Pt in the reduced metal oxide photocatalyst is more than 5 weight % by the reduced metal oxide photocatalyst, even though the bigger amount of Pt is used, the catalytic activity would not be increased any more, indicating waste of high price Pt.

In the meantime, the photocatalyst prepared by the method of producing a photocatalyst of the present invention can be doped with hydrogen.

The hydrogen can be doped into the oxygen vacancy or intrusive defect sites created by the activated metal and hydrogen atoms as the metal hydride is decomposed. Unlike the conventional photocatalyst, the photocatalyst prepared by the method of the present invention can have a relatively large number of oxygen vacancies by including the hydrogen in the oxygen vacancy or intrusive defect sites and reduce electron-hole recombination, resulting in excellent photocatalyst performance.

The photocatalyst above preferably has the anatase structure.

The photocatalyst can be a nanoparticle in the diameter of 5~50 nm. This is advantageous to increase the catalytic activity. That is, when the photocatalyst is prepared in the diameter of 5~50 nm, indicating it has a relatively large surface area, the catalytic activity can be increased. The said photocatalyst has the hollow surface, but the diameter at this time is not limited to the above.

The said photocatalyst can absorb the light having a wavelength of 800 nm or less and displays an excellent catalytic activity thereby. In particular, the photocatalyst shows an excellent catalytic activity in the UV-visible light range of 300~800 nm.

<Photocatalyst>

The present invention provides a photocatalyst prepared by the method of reducing a metal oxide comprising the steps of preparing a mixture by mixing a metal oxide and a metal hydride (step 1) and reducing the mixture by heat-treatment (step 2).

Hereinafter, the photocatalyst prepared by the method of reducing a metal oxide is described in more detail.

The photocatalyst of the present invention preferably has the anatase structure.

The conventional photocatalyst can have either rutile structure or anatase structure. The anatase structure shows stronger oxidation energy than the rutile structure, because of which the anatase crystal structure is more advantageous for a photocatalyst. At this time, the less the transition to the rutile crystal structure, the more advantageous it is.

In a preferred embodiment of the present invention, the photocatalyst prepared by the method of reducing titania ($TiO_2$) is prepared by reducing anatase titania, so that it has the anatase phase. Therefore, the photocatalyst of the present invention is a photocatalyst excellent in photocatalyst performance to sunlight or visible light with the controlled bandgap size and defects such as oxygen vacancy.

The conventional anatase titania ($TiO_2$) has the energy bandgap of approximately 3.2 eV, so that it reacts in the ultraviolet range having a wavelength of about 380 nm or shorter. That is, the anatase titania ($TiO_2$) does not react in the visible light range taking most of the sunlight, and can only act as a photocatalyst when it is irradiated with ultraviolet light by using a special light source such as an UV lamp.

The photocatalyst of the present invention is preferably a nanoparticle in the diameter of 5~50 nm.

This is advantageous to increase the catalytic activity. That is, when the photocatalyst is prepared in the diameter of 5~50 nm, indicating it has a relatively large surface area, the catalytic activity can be increased. However, the diameter is not limited thereto.

The said photocatalyst displays an excellent photocatalytic activity to the light having a wavelength of 800 nm or less, in particular to the UV-visible light range of 300~800 nm.

The photocatalyst prepared by the method of the present invention is advantageous in decomposing or synthesizing a material by using sunlight, where visible light covers most of the area.

For example, the photocatalyst can generate hydrogen from water by using sunlight.

In addition, the photocatalyst can generate hydrogen from seawater using sunlight.

The hydrogen generation amount and the generation rate of the photocatalyst of the present invention are significantly higher than those of the conventional photocatalyst.

The photocatalyst prepared by the method of the present invention can be doped with hydrogen.

The hydrogen can be doped into the oxygen vacancy or intrusive defect sites of the photocatalyst. Unlike the conventional photocatalyst, the photocatalyst prepared by the method of the present invention can have a relatively large number of oxygen vacancies by including the hydrogen in the oxygen vacancy or intrusive defect sites and reduce electron-hole recombination, resulting in excellent photocatalyst performance.

On the surface of the photocatalyst of the present invention, platinum (Pt) can be formed.

Platinum (Pt) is a catalytic metal. To increase the photocatalytic activity, platinum (Pt) particles can be dispersed on the surface of the reduced metal oxide.

At this time, Pt preferably has the diameter of 0.5~5 nm. This diameter range is advantageous to increase the dispersion of Pt on the surface of the reduced metal oxide. However, the diameter of Pt is not limited thereto and smaller Pt particles than the reduced metal oxide can be included.

The platinum is preferably included at the concentration of 0.1~5 weight % by the photocatalyst, and more preferably 0.25~5 weight %. The said concentration is advantageous to increase the catalytic activity of Pt. If Pt is included at the concentration of less than 0.1 weight % by the photocatalyst, the catalytic activity improvement effect of Pt would be very weak. If the concentration of Pt is more than 5 weight % by the photocatalyst, even though the bigger amount of Pt is used, the catalytic activity would not be increased any more, indicating waste of high price Pt.

The photocatalyst of the present invention preferably has the hollow surface. As a result, the surface area and the pore volume can be widened to further enhance the catalytic activity The said photocatalyst is a photocatalyst that catalyzes in ultraviolet and visible light ranges, unlike metal oxides. The photocatalyst has a significantly increased photocatalytic activity in the ultraviolet and visible light range, compared with the photocatalyst prepared by the conventional method, for example, metal ion doping or hydrogen treatment.

The photocatalyst of the present invention shows STH (solar to $H_2$) efficiency of 1~4% when it is used for hydrogen generation.

According to a report by Department of Energy (DOE, USA), when the SHT efficiency of the photocatalyst using sunlight reaches approximately 5%, the production cost of $H_2$ can be set at 2~3 USD per Kg. So, if the photocatalyst of the invention showing the SHT efficiency of 1~4% can match the energy price to the above, suggesting that it is advantageous in realization of $H_2$ commercialization.

In another example of the present invention, the invention provides the photocatalyst prepared by the method of reducing a metal oxide comprising the steps of preparing a mixture by mixing a metal oxide and a metal (step 1) and heat-treating the mixture in an atmosphere in which hydrogen ($H_2$) is supplied.

The conventional photocatalyst displays a poor light absorption in the visible light range. The conventional photocatalyst treated with $H_2$ shows a little improved light absorption in the visible light range but does not show the corresponding activity. This is attributed to various factors such as negative factors for the photochemical catalytic activity.

For example, in the titania photocatalyst, the surface detect and oxygen vacancy play a role of electron donors and thus can improve electron density and charge transfer in order to increase photoactivity, but at the same time these factors act as a mediator that accelerates the recombination of the separated electrons and holes, resulting in the decrease of photoactivity. Therefore, even though the synthesized titania shows the improved light absorption capacity that can absorb visible light, the reaction efficiency of water decomposition with visible light seems not to be increased much.

The titania photocatalyst according to an example of the present invention contains Mg, so that it can control systematically the size of bandgap, defect location, and oxygen vacancy, suggesting that the present invention provides a stable titania photocatalyst having optimal conditions and excellent hydrogen generation performance.

The present invention also provides the photocatalyst prepared by the method of reducing a metal oxide of the invention and characteristically having the bandgap of 1.0 eV~2.5 eV.

Hereinafter, the photocatalyst prepared by the method of reducing a metal oxide of the invention is described in more detail.

The photocatalyst above is an oxide semiconductor that can absorb visible light.

The oxide semiconductor photocatalyst inducing chemical reaction by absorbing light has mostly a large bandgap, suggesting that it displays a strong photoactivity in UV range but shows a low activity in visible light range so that it has limited use of solar energy.

In the case of the conventional photocatalyst, even though it is an important oxide semiconductor widely used in coatings, sensors, catalysts, energy storage, and biomedical applications, it is still difficult to be used as a photocatalyst using sunlight because it has a wide bandgap of 5 eV and can only absorb light in high energy UV range.

On the other hand, the photocatalyst of the present invention has a low bandgap of 1.5 eV, indicating that it can absorb light even in visible light range, so that it can be used as a photocatalyst using sunlight. In an example of the present invention, the black zirconia ($ZrO_{2-x}$) photocatalyst has almost the same structure as the conventional white zirconia ($ZrO_2$), but lacks oxygen in the lattice, which makes it a more stable zirconia having excellent visible light absorption capacity and excellent photocatalyst performance. So, it can be applied to various fields such as photocatalysts, sensors, coatings, energy storage, and biomedical applications.

Further, the present invention provides a photocatalyst that can absorb visible light.

The said photocatalyst can absorb visible light. Therefore, compared with the conventional photocatalyst, it is more excellent photocatalyst showing improved activity to sunlight. The photocatalyst above can be used for the hydrogen generation and the decomposition of harmful compounds such as rhodamine B (RhB), suggesting that it is advantageously used in photocatalyst applications.

Practical and presently preferred embodiments of the present invention are illustrative as shown in the following Examples and Experimental Examples.

However, it will be appreciated that those skilled in the art, on consideration of this disclosure, may make modifications and improvements within the spirit and scope of the present invention.

Example 1

A reduced titania ($TiO_{2-x}$) photocatalyst was prepared by the following steps.

Step 1: 4 g of anatase titania ($TiO_2$) nanoparticles (Sigma-Aldrich) and 0.4 g of magnesium hydride ($MgH_2$, Alfa Aesar) were mixed to make a mixture wherein the molar ratio of $MgH_2$ to $TiO_2$ is 0.3.

Step 2: The mixture was loaded in a tube furnace, followed by heat-treatment at 500° C. for 8 hours under argon (Ar) atmosphere.

Step 3: The heat-treated mixture was loaded in diluted hydrochloric acid (HCl) solution, followed by stirring for about one day to eliminate residual magnesium (Mg).

Step 4: The magnesium-free mixture was washed with purified water and ethanol, followed by drying in an 80° C. oven to prepare a reduced titania ($TiO_{2-x}$) photocatalyst.

Example 2

A reduced titania ($TiO_{2-x}$) photocatalyst was prepared by the same manner as described in example 1 except that the amount of magnesium hydride ($MgH_2$, Alfa Aesar) was adjusted to 0.66 g in order for the molar ratio of $MgH_2$ to $TiO_2$ to be 0.5 in step 1 of example 1.

Example 3

A reduced titania ($TiO_{2-x}$) photocatalyst was prepared by the same manner as described in example 1 except that the amount of magnesium hydride ($MgH_2$, Alfa Aesar) was adjusted to 1.0 g in order for the molar ratio of $MgH_2$ to $TiO_2$ to be 0.75 in step 1 of example 1.

Example 4

A reduced titania ($TiO_{2-x}$) photocatalyst was prepared by the same manner as described in example 1 except that the amount of magnesium hydride ($MgH_2$, Alfa Aesar) was adjusted to 1.3 g in order for the molar ratio of $MgH_2$ to $TiO_2$ to be 1 in step 1 of example 1.

Example 5

A reduced titania ($TiO_{2-x}$) photocatalyst was prepared by the following steps.

Step 1: 20 mg of the reduced photocatalyst prepared in example 2 was dispersed in 50 ml of 20% methanol solution, to which $H_2PtCl_6$ was added, resulting in a mixed solution.

Step 2: The mixed solution was irradiated with 450 W Xenon lamp by using an infrared filter for 2 hours in order to form Pt nanoparticles of 2~3 nm in diameter on the surface of the photocatalyst, resulting in the preparation of a reduced titania ($TiO_{2-x}$) photocatalyst containing Pt at the concentration of 0.1% by the weight of the final photocatalyst.

Example 6

A reduced titania ($TiO_{2-x}$) photocatalyst containing Pt at the concentration of about 0.25% was prepared by the same manner as described in example 5 except that the amount of Pt was adjusted in order for the Pt nanoparticles to be included at the concentration of 0.25% by the weight of the photocatalyst in step 2 of example 5.

Example 7

A reduced titania ($TiO_{2-x}$) photocatalyst containing Pt at the concentration of about 0.5% was prepared by the same manner as described in example 5 except that the amount of Pt was adjusted in order for the Pt nanoparticles to be included at the concentration of 0.5% by the weight of the photocatalyst in step 2 of example 5.

Example 8

A reduced titania ($TiO_{2-x}$) photocatalyst containing Pt at the concentration of about 1% was prepared by the same manner as described in example 5 except that the amount of Pt was adjusted in order for the Pt nanoparticles to be included at the concentration of 1% by the weight of the photocatalyst in step 2 of example 5.

Example 9

A reduced titania ($TiO_{2-x}$) photocatalyst containing Pt at the concentration of 1% was prepared by the same manner as described in example 5 except that the reduced titania ($TiO_{2-x}$) photocatalyst prepared in example 1 was used in step 1 and the amount of Pt solution was adjusted in order for the Pt nanoparticles to be included in the photocatalyst at the concentration of 1% by the weight of the photocatalyst in step 2.

Example 10

A reduced titania ($TiO_{2-x}$) photocatalyst containing Pt at the concentration of 1% was prepared by the same manner as described in example 5 except that the reduced titania ($TiO_{2-x}$) photocatalyst prepared in example 3 was used in step and the amount of Pt solution was adjusted in order for the Pt nanoparticles to be included in the photocatalyst at the concentration of 1% by the weight of the photocatalyst in step 2.

Example 11

A reduced titania ($TiO_{2-x}$) photocatalyst containing Pt at the concentration of 1% was prepared by the same manner as described in example 5 except that the reduced titania ($TiO_{2-x}$) photocatalyst prepared in example 4 was used in step 1 and the amount of Pt solution was adjusted in order for the Pt nanoparticles to be included in the photocatalyst at the concentration of 1% by the weight of the photocatalyst in step 2.

The molar ratios and the Pt contents in those titania ($TiO_2$) of example 1 example 11 are shown in Table 1 below.

TABLE 1

|  | $MgH_2/TiO_2$ molar ratio | Pt content (%) |
|---|---|---|
| Example 1 | 0.3 | — |
| Example 2 | 0.5 | — |
| Example 3 | 0.75 | — |
| Example 4 | 1 | — |
| Example 5 | 0.5 | 0.1 |
| Example 6 | 0.5 | 0.25 |
| Example 7 | 0.5 | 0.5 |
| Example 8 | 0.5 | 1 |
| Example 9 | 0.3 | 1 |
| Example 10 | 0.75 | 1 |
| Example 11 | 1 | 1 |

Example 12 (BT-0.3)

The nano $TiO_2$ was provided from Aldrich Co. The mixture composed of $TiO_2$ and Mg powder was loaded in a tube furnace, followed by heating at 650° C. for 5 hours under 5% $H_2$/Ar atmosphere. The molar ratio of $TiO_2$ to Mg in the mixture was 0.3. After annealing, the mixture was stirred for 24 hours in 1.0 M HCl solution. The mixture was washed with water to eliminate the acid, and then the mixture was dried at 80° C., resulting in the synthesis of a titania photocatalyst. Other titania photocatalysts of example 12~example 16 were prepared by regulating the molar ratios of Mg to $TiO_2$ in the $TiO_2$/Mg powder mixture to be 0.3, 0.5, 0.6, 0.75, and 1.

Example 13 (BT-0.5)

A titania photocatalyst was prepared by the same manner as described in example 12 except that the molar ratio of $TiO_2$ to Mg in the mixture above was 0.5.

Example 14 (BT-0.6)

A titania photocatalyst was prepared by the same manner as described in example 12 except that the molar ratio of $TiO_2$ to Mg in the mixture above was 0.6.

Example 15 (BT-0.75)

A titania photocatalyst was prepared by the same manner as described in example 12 except that the molar ratio of $TiO_2$ to Mg in the mixture above was 0.75.

Example 16 (BT-1.0)

A titania photocatalyst was prepared by the same manner as described in example 12 except that the molar ratio of $TiO_2$ to Mg in the mixture above was 1.0.

Example 17

A black zirconia ($ZrO_{2-x}$) was prepared by the following steps.

Step 1: A mixture was prepared by mixing nano zirconia ($ZrO_2$) powders (Aldrich) and magnesium (Mg) powders.

At this time, the molar ratio of magnesium (Mg) to zirconia ($ZrO_2$) in the mixture was 1.

Step 2: The mixture was placed in a furnace, followed by heating at 650° C. for 5 hours under 5% $H_2$/Ar atmosphere.

Step 3: The heat-treated mixture was stirred for 24 hours in 2.0 M HCl solution. The mixture was washed with water to eliminate the acid, and then the mixture was dried at 80° C., resulting in the preparation of a black zirconia ($ZrO_{2-x}$)

Example 18

A black zirconia ($ZrO_{2-x}$) was prepared by the same manner as described in example 17 except that the molar ratio of magnesium (Mg) to zirconia ($ZrO_2$) in the mixture was 0.5.

Example 19

A black zirconia ($ZrO_{2-x}$) was prepared by the same manner as described in example 17 except that the molar ratio of magnesium (Mg) to zirconia ($ZrO_2$) in the mixture was 1.3.

Example 20

A black zirconia ($ZrO_{2-x}$) was prepared by the same manner as described in example 17 except that the stirring process for 24 hours in HCl solution in step 3 was not performed.

Comparative Example 1

4 g of white anatase titania ($TiO_2$) nanoparticles were provided from Sigma-Aldrich Co.

Comparative Example 2

A reduced titania ($TiO_{2-x}$) photocatalyst was prepared by the same manner as described in example 2 except that titania ($TiO_2$) and magnesium hydride ($MgH_2$) were not mixed together and instead heat-treated separately in one tube furnace.

Comparative Example 3

A reduced titania ($TiO_{2-x}$) photocatalyst was prepared by the same manner as described in example 2 except that the heat-treatment was performed without using magnesium hydride ($MgH_2$) under 5% $H_2$/Ar atmosphere.

Comparative Example 4

A reduced titania ($TiO_{2-x}$) photocatalyst was prepared by the same manner as described in example 2 except that magnesium (Mg) was used instead of magnesium hydride ($MgH_2$) and the heat-treatment was performed at 650° C. under 5% $H_2$/Ar atmosphere.

Comparative Example 5

A reduced titania ($TiO_{2-x}$) photocatalyst was prepared by the same manner as described in example 2 except that magnesium (Mg) was used instead of magnesium hydride ($MgH_2$) and the heat-treatment was performed at 650° C.

Comparative Example 6

A titania ($TiO_2$) photocatalyst containing Pt at the concentration of about 1% was prepared by the same manner as described in example 5 except that the titania ($TiO_2$) of comparative example 1 was used in step 1 and the amount of Pt solution was adjusted in order for Pt to be included in the final photocatalyst at the concentration of 1% by the weight of the final photocatalyst.

Comparative Example 7 (CT)

Nano $TiO_2$ was provided from Aldrich Co.

Comparative Example 8 (CT-Ar)

Nano $TiO_2$ was loaded in a tube furnace, followed by heating at 650° C. for 5 hours under Ar atmosphere. After annealing, the mixture was stirred for 24 hours in 1.0 M HCl solution. The mixture was washed with water to eliminate the acid, and then the mixture was dried at 80° C., resulting in the synthesis of a titania photocatalyst.

Comparative Example 9 (CT-H)

A titania photocatalyst was synthesized under the same conditions as described in comparative example 8 except that heating was performed under 5% $H_2$/Ar atmosphere.

Comparative Example 10 (BT-0.5-Ar)

A titania photocatalyst was synthesized under the same conditions as described in example 13 except that heating was performed under Ar atmosphere.

Comparative Example 11

Nano zirconia ($ZrO_2$) powders were provided from Aldrich Co.

Comparative Example 12

To perform the heat-treatment without Mg and $H_2$ in example 17, the nano $ZrO_2$ powders provided from Aldrich Co. were placed in a furnace and heat-treated at 650° C. for 5 hours under Ar atmosphere, resulting in the preparation of a black zirconia ($ZrO_{2-x}$).

Comparative Example 13

To perform the heat-treatment without Mg in example 17, the nano $ZrO_2$ powders provided from Aldrich Co. were placed in a furnace and heat-treated at 650° C. for 5 hours under 5% $H_2$/Ar atmosphere, resulting in the preparation of a black zirconia ($ZrO_{2-x}$).

Comparative Example 14

A black zirconia ($ZrO_{2-x}$) was prepared by the same manner as described in example 17 except that $H_2$ was not included in step 2 of example 17 to perform the heat-treatment without $H_2$.

Preparation Method of Pt Deposited Catalyst

A $TiO_2$ catalyst was used as in 50 ml of 20% methanol aqueous solution in closed gas circulation system. After adding a proper amount of H2PtCl6.6H2O, Pt was deposited thereon by irradiating ultraviolet (UV) light under Ar atmosphere, and as a result, a Pt deposited photocatalyst was prepared.

H₂ Generation 10 mg of the photocatalyst containing Pt (up to 1 wt %) was added to methanol aqueous solution (50 ml, 20%) in closed gas circulation system. A light of a total solar wavelength was irradiated using a 400 W Xenon lamp equipped with an IR filter. Methanol was used as a sacrificial reagent. At this time, anodic reaction generating $O_2$ from $H_2O$ was not induced. The amount of $H_2$ was determined by on-line gas chromatography (Bruker 450 GC) connected to the reactor. The reaction was carried out at 25° C. under Ar atmosphere. 25 mg of a photocatalyst was used to investigate the activity in visible light (400-780 nm, obtained by using a cut-off filter) and other parameters were kept constant. As described hereinbefore, the stable catalyst system was irradiated with the total solar wavelength in a certain reaction condition. The solution was stored in a normal atmospheric state and irradiated for 2 hours daily for 10 days.

Hereinafter, the results of the investigation performed with the examples and the comparative examples above are illustrated.

Experimental Example 1 Comparison of Color and Light Absorption of the Reduced Titania ($TiO_{2-x}$) Photocatalyst To compare color and light absorption of the reduced titania ($TiO_{2-x}$) photocatalysts prepared in the example and the comparative example, the following experiment was performed with changing the amount of magnesium hydride ($MgH_2$).

First, to compare the colors, the titania photocatalysts prepared in comparative example 1 and examples 1~4 were observed by the naked eye and the results are shown in FIG. 1.

As shown in FIG. 1, the titania ($TiO_2$) photocatalyst prepared in comparative example 1 showed the brightest white. As the amount of $MgH_2$ was increased from example 1 to example 4, the color of the titania photocatalyst turned darker from yellow to gray and further to black.

To compare the light absorption, the light absorption of the titania photocatalysts prepared in comparative example 1 and examples 1~4 was investigated by using an UV-VIS-NIR spectrophotometer (Agilent Technology) at the wavelength of 250~1100. The results are shown in FIG. 2.

As shown in FIG. 2, the reduced titania photocatalysts prepared in example 1 example 4 displayed higher light absorption than the titania ($TiO_2$) photocatalyst prepared in comparative example 1. In particular, the larger the amount of magnesium hydride ($MgH_2$) used, the higher the light absorption of the reduced titania photocatalyst.

Therefore, it was confirmed that as the amount of $MgH_2$ increases in the preparation process, the reduced titania photocatalyst can have higher absorption capacity.

Experimental Example 2 Analysis of the Phase and Defect of the Reduced Titania ($TiO_{2-x}$) Photocatalyst To analyze the phase of the titania ($TiO_{2-x}$) photocatalyst prepared by the method of the invention, the following experiment was performed.

Figure 3:
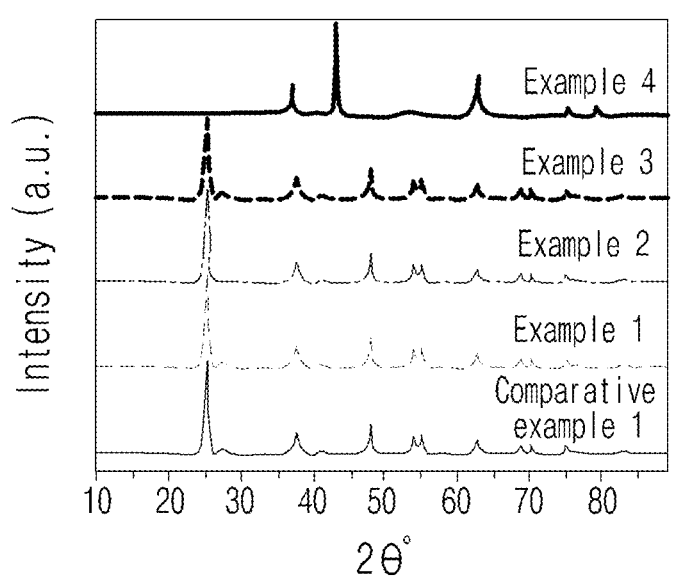
FIG. 3 is a graph illustrating the results of X-ray diffraction (XRD) analysis investigating phases and defects of those titanias prepared in the comparative example and the example of the present invention.
Figure 4:
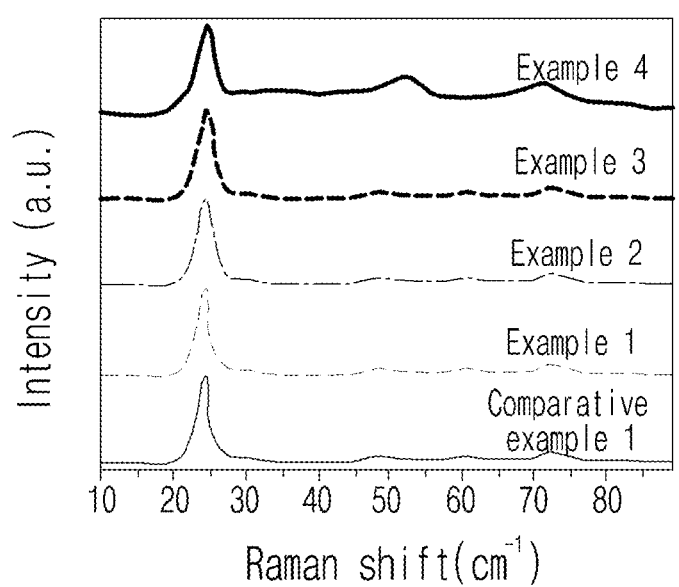
FIG. 4 is a graph illustrating the results of Raman spectroscopy investigating phases and defects of those titanias prepared in the comparative example and the example of the present invention.

The titania ($TiO_2$) of comparative example 1 and the reduced titanias ($TiO_{2-x}$) prepared in examples 1~4 proceeded to phase analysis using X-ray diffractometer (XRD). The surface detect analysis was performed by Raman spectrograph. The results are shown in FIG. 3 and FIG. 4. The results of analysis using high resolution transmission electron microscope (HR-TEM) and high resolution scanning electron microscope (HR-SEM) are shown in FIGS. 5~8.

The oxygen deficiency analysis was performed using X-ray photoelectron spectroscopy (XPS) and the results are shown in Table 2 below.

As a result of the XRD analysis, as shown in FIG. 3, the reduced titanias prepared in examples 1~3 were found to be the same phase as the titania of comparative example 1, that is the anatase phase. However, the reduced titania prepared in example 4 was the other phase, that is the TiO phase.

Therefore, it was confirmed that when the molar ratio of magnesium hydride ($MgH_2$) to titania ($TiO_2$) was less than 1, there was no phase change, but when the molar ratio was more than 1, the phase changed.

As a result of the Raman analysis, as shown in FIG. 4, the reduced titanias prepared in examples 1~4 showed wider peak than the titania of comparative example 1 and the location of the peak was also moved a little away from the original location, which seemed to be cause of oxygen vacancy or lattice disorder.

Figure 5:
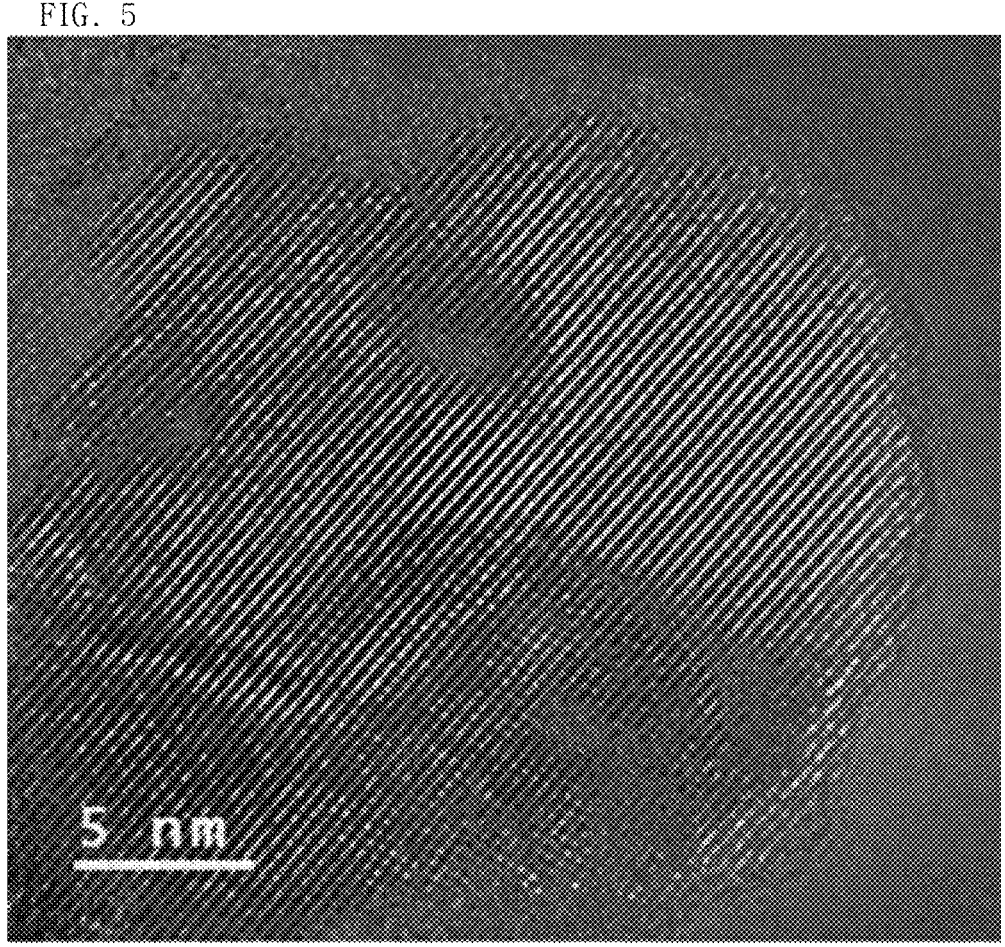
FIG. 5 and FIG. 6 are high-resolution transmission electron microscope (HR-TEM) photographs illustrating the surface defects of those titanias prepared in the comparative example and the example of the present invention.
Figure 6:
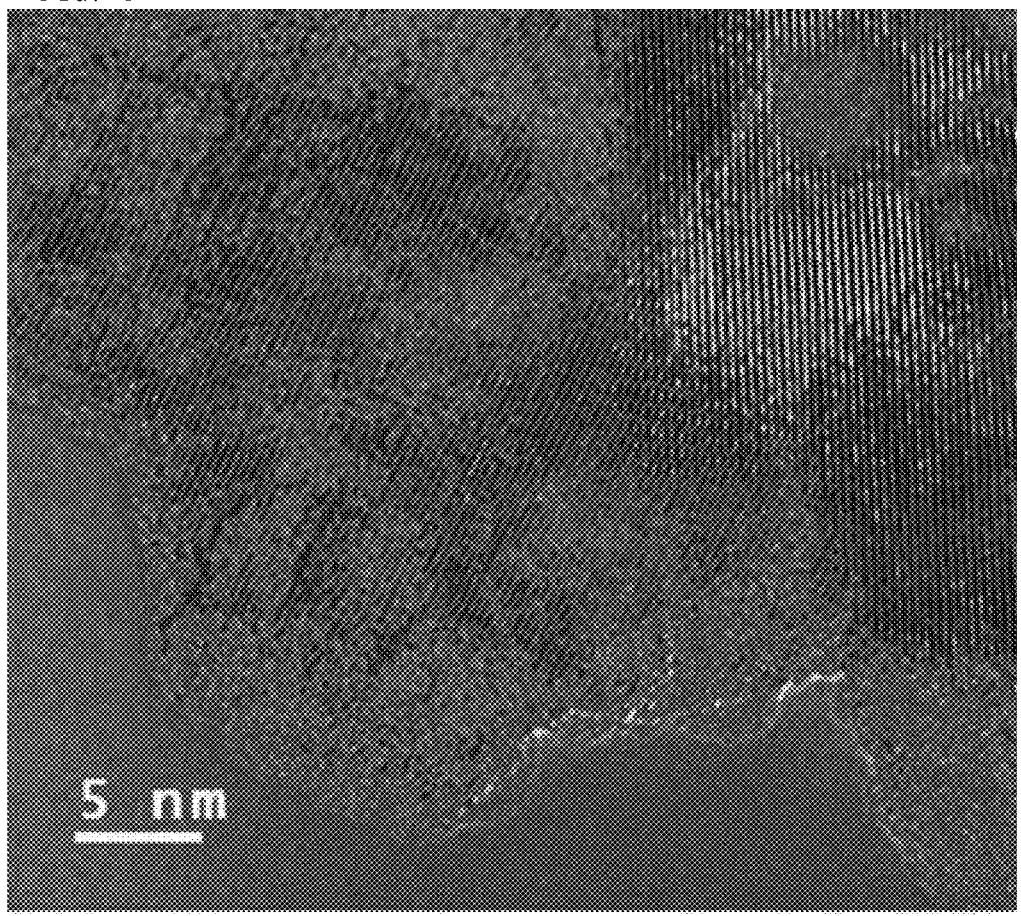
Figure 7:
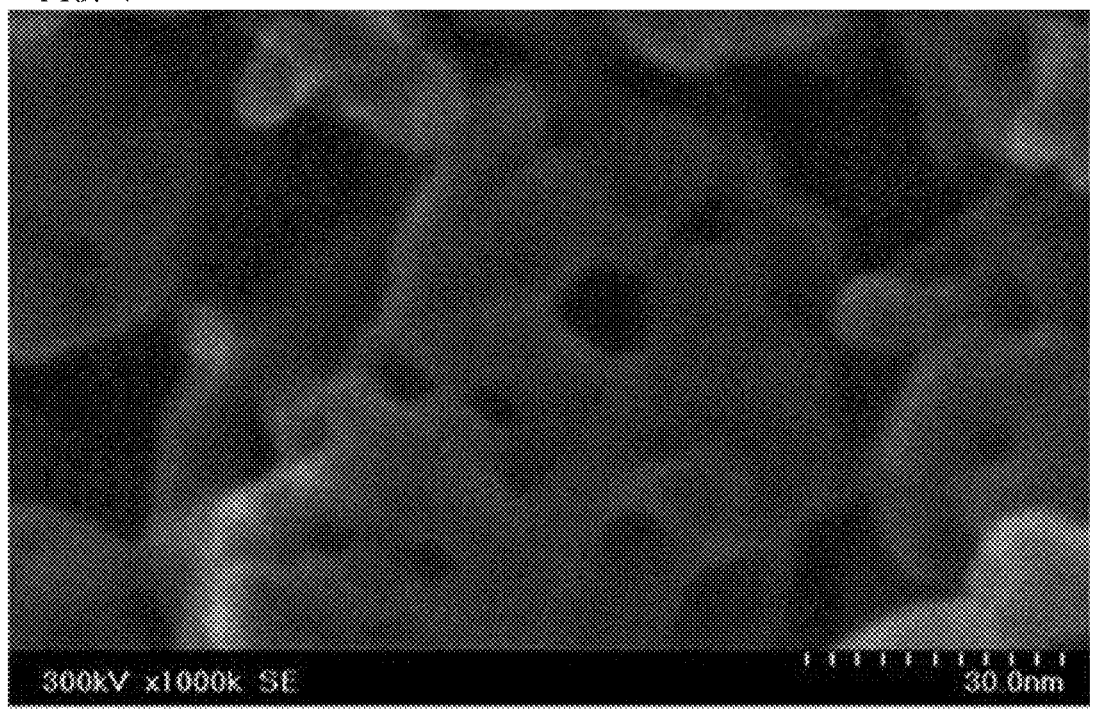
FIG. 7 and FIG. 8 are high-resolution scanning electron microscope (HR-SEM) photographs illustrating the surface defects of those titanias prepared in the comparative example and the example of the present invention.
Figure 8:
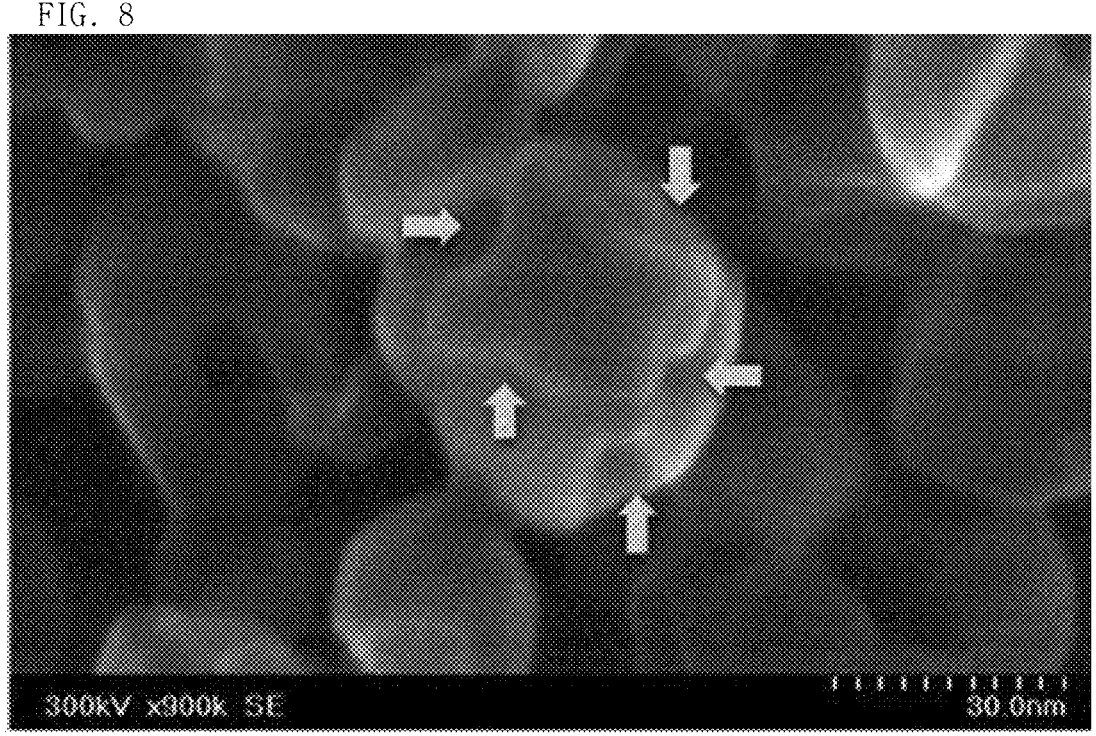

FIG. 5 and FIG. 6 are transmission electron microscope photographs illustrating the titania photocatalyst of comparative example 1 and the reduced titania photocatalyst prepared in example 2. FIG. 7 and FIG. 8 are scanning electron microscope photographs illustrating the titania photocatalyst of comparative example 1 and the reduced titania photocatalyst prepared in example 2. Comparing those photographs, it was observed that FIG. 6 showed more surface-detects and FIG. 8 displayed the hollow surface.

Even though there was no phase change, the color and the light absorption capacity of the reduced titania photocatalysts prepared in examples 1~3 could be changed by the surface detects.

In the meantime, the amounts of oxygen and oxygen vacancy included in the reduced titania photocatalysts prepared in examples 1~3 and in the titania photocatalyst of comparative example 1 were calculated by X-ray photoelectron spectroscopy (XPS). As a result, as shown in Table 2, the titania photocatalyst of comparative example 1 displayed the least number of oxygen vacancy and the reduced titania photocatalyst prepared in example 3 showed the biggest number of oxygen vacancy.

TABLE 2

| | Oxygen status | Oxygen (O) 1s peak site | Relative area | Relative amount (%) |
|---|---|---|---|---|
| Comparative Example 1 | Oxygen lattice | 529.79 | 1.245 | 87.55 |
| | Oxygen vacancy | 531.29 | 0.177 | 12.45 |
| Example 1 | Oxygen lattice | 529.75 | 1.027 | 74.2 |
| | Oxygen vacancy | 230.81 | 0.357 | 25.8 |
| Example 2 | Oxygen lattice | 529.78 | 1.037 | 73.0 |
| | Oxygen vacancy | 530.77 | 0.378 | 27.0 |
| Example 3 | Oxygen lattice | 529.62 | 1.16 | 65.9 |
| | Oxygen vacancy | 530.95 | 0.597 | 34.1 |

Experimental Example 3 Comparison of Hydrogen Generation Performance (1)—Hydrogen Generation Performance for the Light of Ultraviolet-Visible Light Range Using 450 W Xenon Lamp To compare the hydrogen generation amount and the generation rate of the reduced titania ($TiO_{2-x}$) photocatalyst for ultraviolet-visible light (UV-VIS), the following experiment was performed with the titania photocatalysts prepared in the comparative example and the example of the invention with changing the amount of $MgH_2$.

The hydrogen generation capacity of the reduced titania photocatalysts containing 1% of platinum (Pt) prepared in comparative example 6 and examples 8~11 was investigated by using on-line gas chromatography (Bruker 450 GC) connected to the reactor. The time-dependent hydrogen generation amount and the generation rate were measured and the results are shown in FIG. 9 and FIG. 10.

Figure 9:
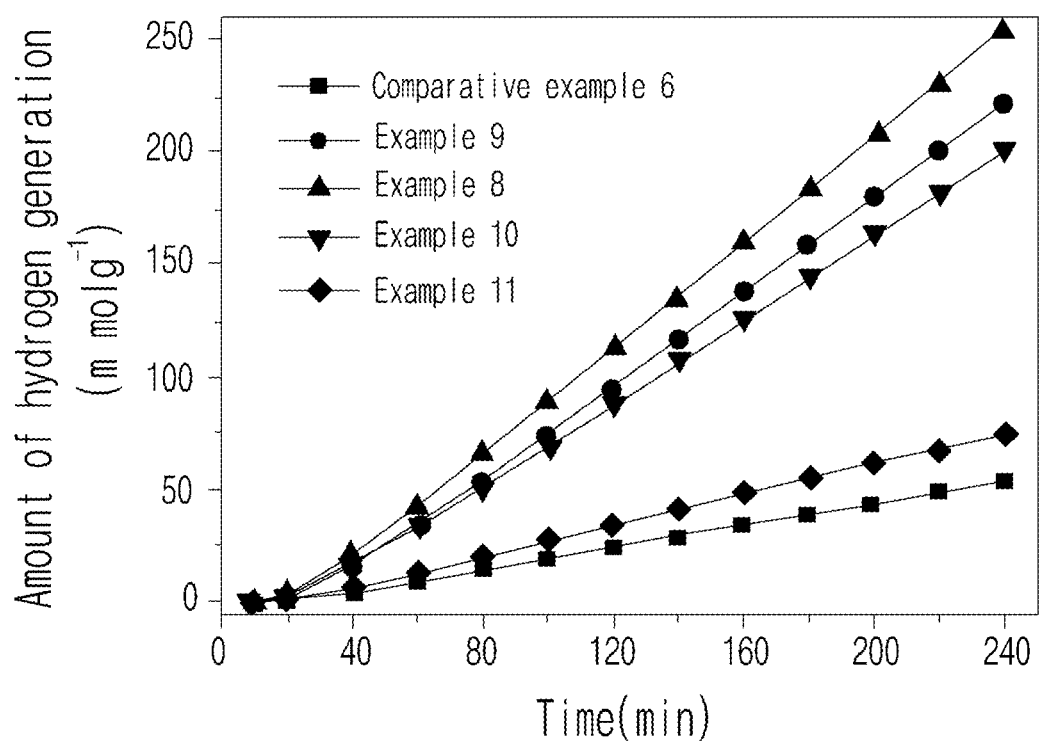
FIG. 9 and FIG. 10 are graphs illustrating the hydrogen generation performance of the titania photocatalysts containing 1% of platinum (Pt), prepared in the comparative example and the example of the present invention, using the light of UV-visible light range obtained from Xe lamp.
Figure 10:
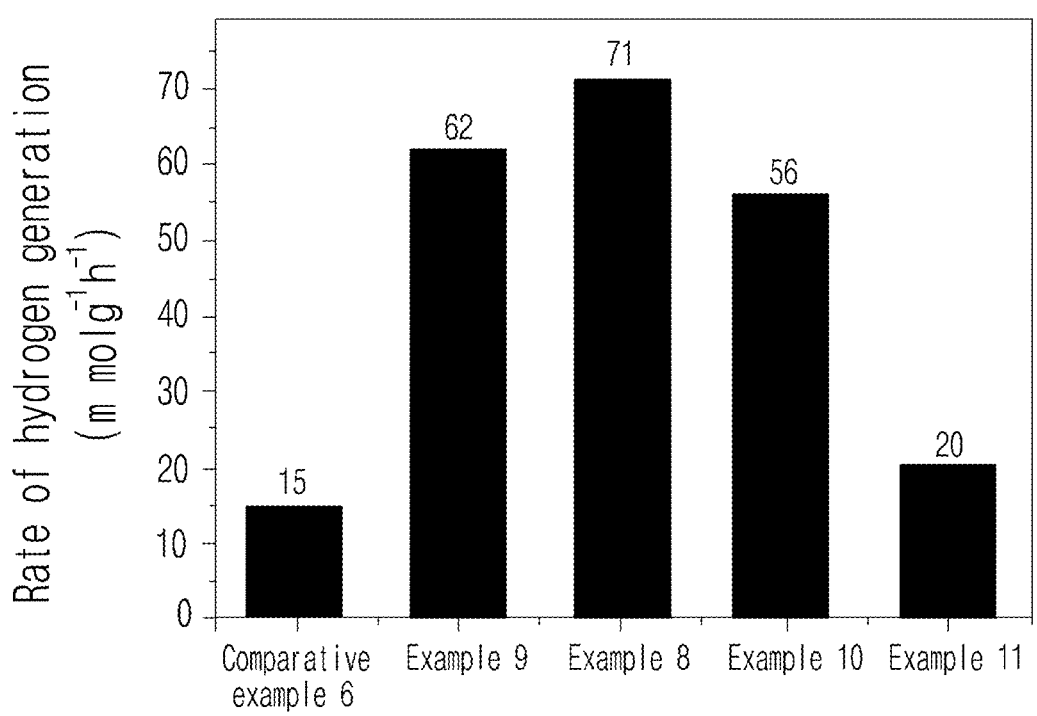

As shown in FIGS. 9 and 10, the titania photocatalyst containing 1% of platinum (Pt) prepared in comparative example 6 generated hydrogen at a very slow rate of 15 m molg-1h-1, while the reduced titania photocatalysts prepared in examples 9, 8, and 10 generated hydrogen relatively at a high rate of 62 m molg-1h-1, 71 m molg-1h-1, and 56 m molg-1h-1 respectively. In particular, the reduced titania photocatalyst prepared in example 8 wherein $MgH_2$ was included at the molar ratio of 0.5 to titania ($TiO_2$) showed at least 4.7 times higher hydrogen generation rate than the photocatalyst of comparative example 6.

In the meantime, the reduced titania photocatalyst containing 1% of platinum (Pt) prepared in example 11 generated hydrogen at a little higher rate of 20 m molg-1h-1 than the photocatalyst of comparative example 6.

Therefore, it was confirmed that the reduced titania photocatalyst of the present invention had excellent hydrogen generation performance, compared with before the reduction. In particular, when $MgH_2$ was included at the molar ratio of less than 1 to titania ($TiO_2$), the hydrogen generation rate was significantly increased.

Experimental Example 4 Comparison of Hydrogen Generation Performance (2)—Hydrogen Generation Performance for the Light of Ultraviolet-Visible Light Range Using Simulated Sunlight To compare the hydrogen generation amount and the generation rate of the reduced titania ($TiO_{2-x}$) photocatalyst for simulated sunlight, the following experiment was performed with the titania photocatalysts prepared in the comparative example and the example of the invention with changing the amount of $MgH_2$.

The hydrogen generation capacity of the reduced titania photocatalysts containing 1% of platinum (Pt) prepared in comparative example 6 and examples 8~11 was investigated by using on-line gas chromatography (Bruker 450 GC) connected to the reactor under the simulated sunlight condition (AM 1.5 G, 1 Sun). The time-dependent hydrogen generation amount and the generation rate were measured and the results are shown in FIG. 11 and FIG. 12.

Figure 11:
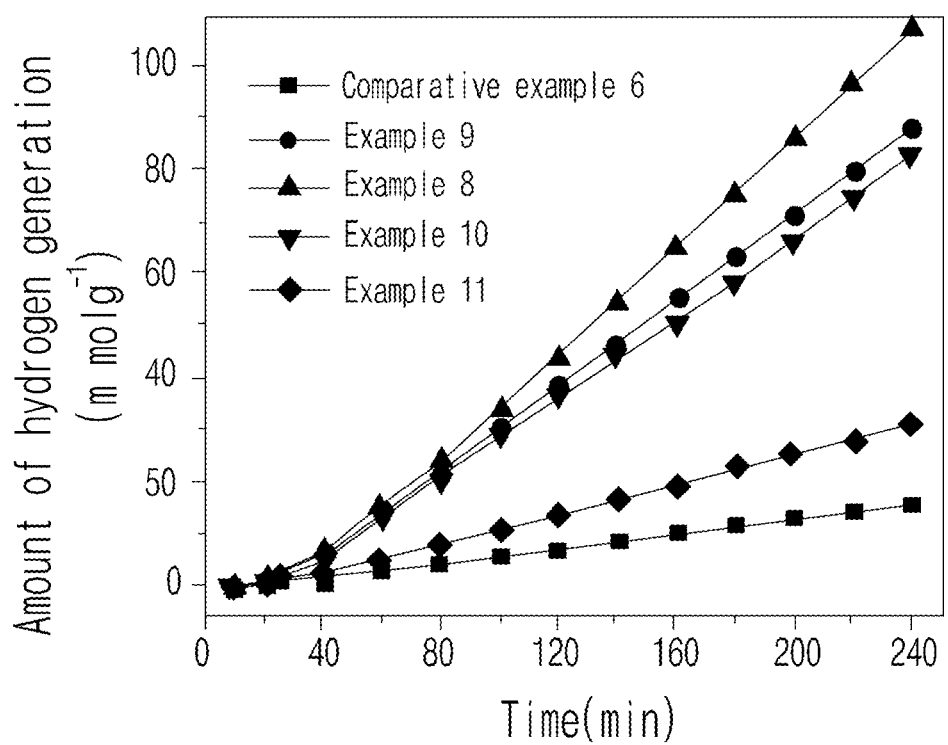
FIG. 11 and FIG. 12 are graphs illustrating the hydrogen generation performance of the titania photocatalysts containing 1% of platinum (Pt), prepared in the comparative example and the example of the present invention, using the light of UV-visible light range obtained from similar sunlight.
Figure 12:
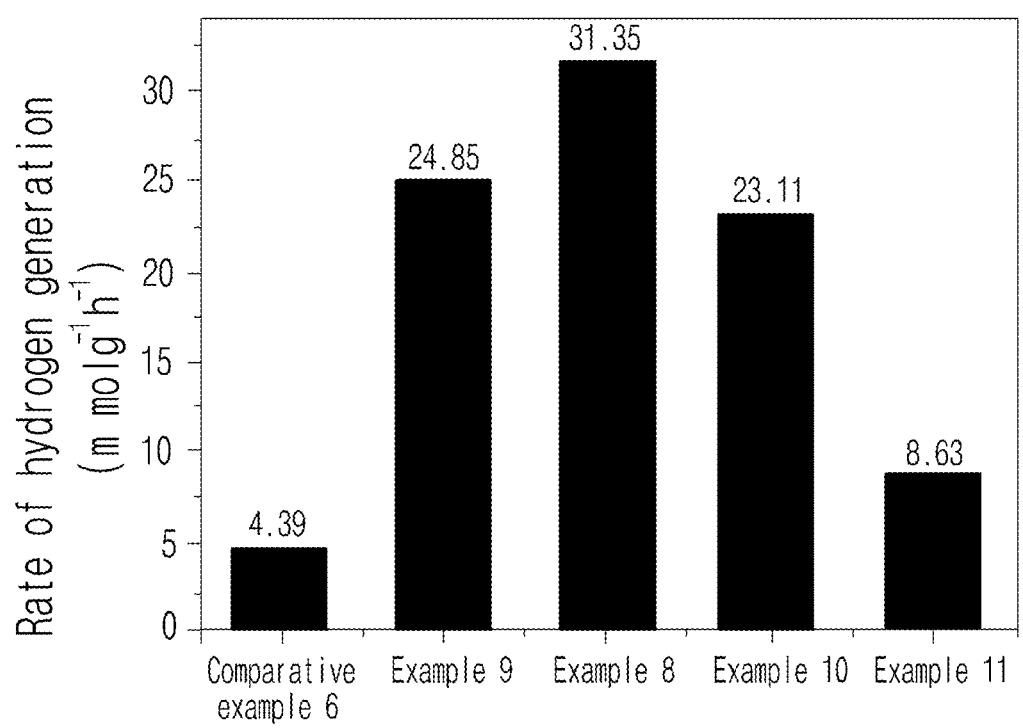

As shown in FIGS. 11 and 12, the titania photocatalyst containing 1% of platinum (Pt) prepared in comparative example 6 generated hydrogen at a very slow rate of 4.39 m molg-1h-1, while the reduced titania photocatalysts prepared in examples 9, 8, and 10 generated hydrogen relatively at a high rate of 24.85 m molg-1h-1, 31.35 m molg-1h-1, and 23.11 m molg-1h-1 respectively. In particular, the reduced titania photocatalyst prepared in example 8 wherein $MgH_2$ was included at the molar ratio of 0.5 to titania ($TiO_2$) showed at least 7 times higher hydrogen generation rate than the photocatalyst of comparative example 6.

In the meantime, the reduced titania photocatalyst prepared in example 11 generated hydrogen at a little higher rate of 8.63 m molg-1h-1 than the photocatalyst of comparative example 6.

Therefore, it was confirmed that the reduced titania photocatalyst of the present invention had excellent hydrogen generation performance under the simulated sunlight condition (AM 1.5 G, 1 Sun), compared with before the reduction. In particular, when $MgH_2$ was included at the molar ratio of less than 1 to titania ($TiO_2$), the hydrogen generation rate was significantly increased.

Experimental Example 5 Evaluation of Solar to H2 (STH) Efficiency

To investigate solar to H2 (STH) efficiency of the reduced titania photocatalyst of the present invention, the following experiment was performed.

The reduced titania photocatalyst containing Pt (0.25%) prepared in example 6 was loaded in a reactor containing 20% methanol, which was irradiated with 1 Sun (100 mW) of incident light under similar sunlight condition (AM 1.5 G, 1 Sun), and then the rate of hydrogen generation by water decomposition was measured, based on which the solar to $H_2$ (STH) efficiency was calculated according to formula 1 below.

STH=hydrogen generation energy/similar sunlight (AM 1.5 G, 1 Sun) energy×100     <Formula 1>

As a result, it was confirmed that the STH efficiency was about 2.6%. This result indicates that the reduced titania photocatalyst prepared by the method of the invention exhibits a very high STH efficiency.

Experimental Example 6 Comparison of Hydrogen Generation Performance (3)—Comparison of Hydrogen Generation Rate The following experiment was performed in order to compare the hydrogen generation rate of the reduced titania photocatalyst prepared by the method of the invention between in the UV-VIS range realized by using Xenon lamp and in the 300~700 nm range selected by band pass.

The reduced titania photocatalyst containing Pt (0.25%) prepared in example 6 was loaded in the reactor containing 20% methanol, which was irradiated with 50 mWcm-2 Xenon lamp. The hydrogen generation by the reduced titania photocatalyst irradiated with the light of UV-VIS or the light of 300~700 nm range selected by using a blue bandpass was measured by on-line gas chromatography (Bruker 450 GC) connected to the reactor. The results are shown in FIG. 13.

The reduced titania photocatalyst containing Pt (0.25%) prepared in example 6 was loaded in a reactor containing 20% methanol that was irradiated with 1 Sun (100 mW) of incident light under similar sunlight condition (AM 1.5 G, 1 Sun), and then the rate of hydrogen generation by water decomposition was measured, based on which the solar to $H_2$ (STH) efficiency was calculated according to formula 1 below.

Figure 13:
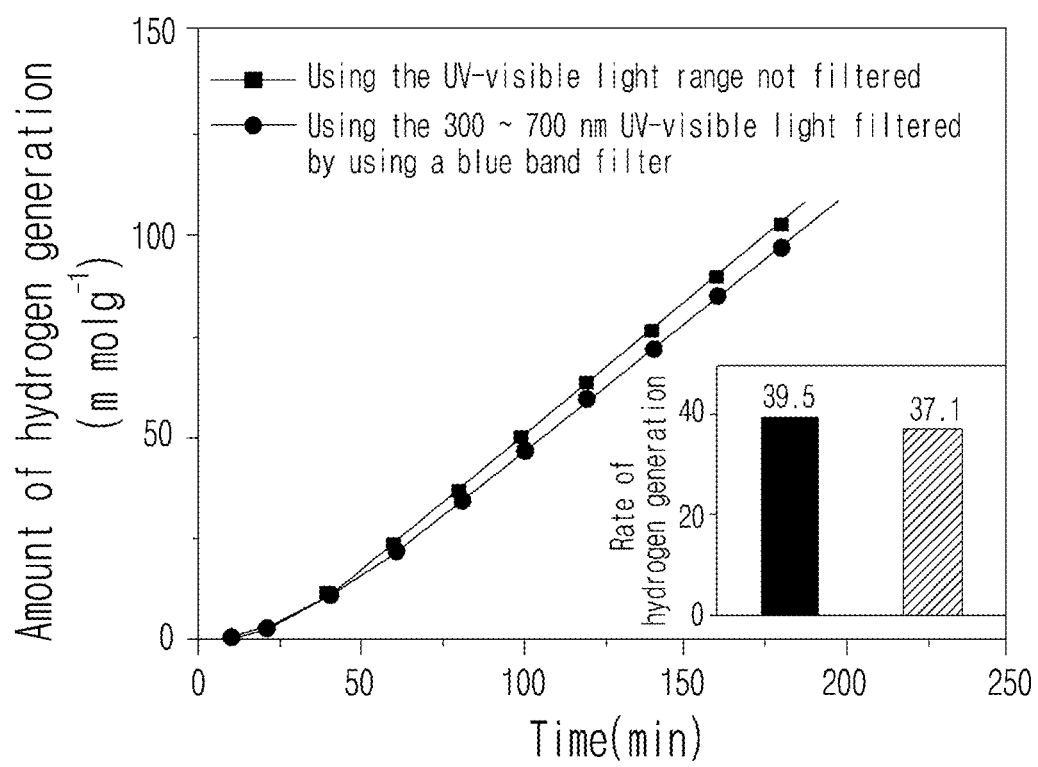
FIG. 13 is a graph illustrating the comparison of the hydrogen generation performance of the titania photocatalyst containing 1% of platinum (Pt), prepared in the example of the present invention, between in the UV-visible light range of 300~700 nm selected by using a blue band filter and in the UV-visible light range not filtered by the blue band filter.

As shown in FIG. 13, when the light of UV-VIS range was irradiated, the hydrogen generation rate was 39.5 m molg-1h-1, and when the light of 300~700 nm range selected by using a blue bandpass was irradiated, the hydrogen generation rate was 37.1 m molg-1h-1, which seems to be similar between them.

Therefore, the reduced titania photocatalyst of the present invention was confirmed to have an excellent catalytic activity in the UV-VIS light of 300~700 nm.

Experimental Example 7 Evaluation of Hydrogen Generation Stability

The following experiment was performed to investigate the catalytic stability of the reduced titania photocatalyst containing Pt prepared by the method of the present invention.

The reduced titania photocatalyst containing Pt at the concentration of 0.25% prepared in example 6 was loaded in a reactor containing 20% methanol, followed by irradiation with the simulated sunlight (1.5 G, 1 Sun). Then, the catalytic stability was evaluated.

The photocatalyst was irradiated by two different ways as follows:

1) After the photocatalyst was irradiated for 50 hours continuously, to which approximately 5 ml of methanol aqueous solution added, followed by irradiation for 50 hours more to make the total irradiation time 100 hours.

2) The same sample was irradiated for 4 hours a day for 25 days. Then, the sample was stored in a dark storage box for 25 days. Thereafter, the sample was irradiated for 4 hours a day for 25 days to make the total irradiation time 200 hours.

After the photocatalyst was irradiated by the two methods above, the hydrogen generation amount was measured by on-line gas chromatography (Bruker 450 GC) connected to the reactor. The results are shown in FIGS. 14-16.

Figure 14:
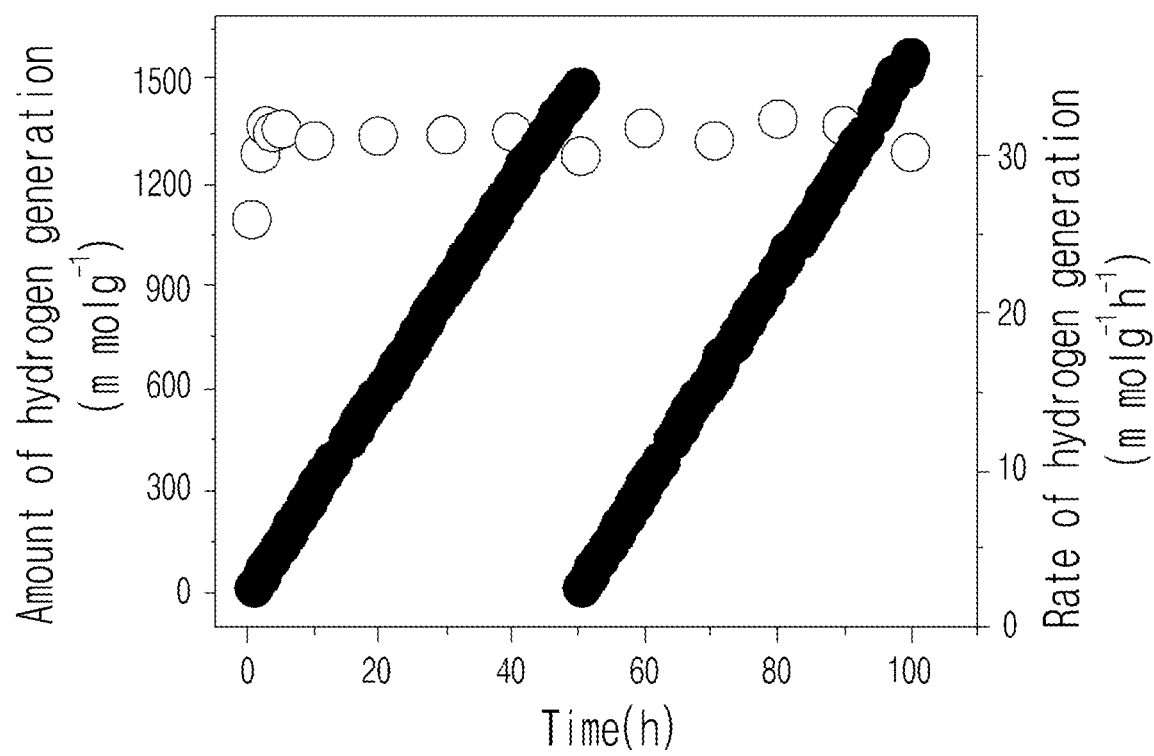
FIG. 14~FIG. 16 are graphs illustrating the evaluation of the catalytic stability of the reduced titania photocatalyst containing 0.25% of platinum (Pt) prepared in the example of the present invention.

As shown in FIG. 14, $H_2$ was quite regularly generated at the rate of 30 m molg–1h–1 for about 50 hours and after that, $H_2$ was generated at the same rate for another 50 hours.

Figure 15:
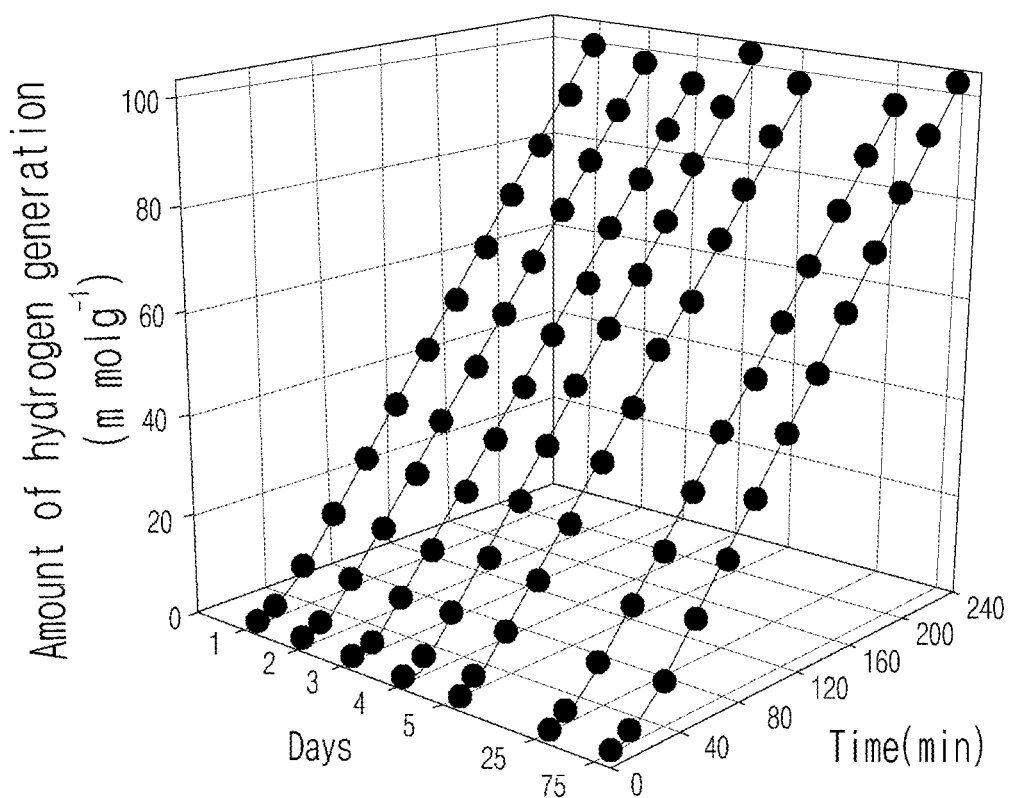
Figure 16:
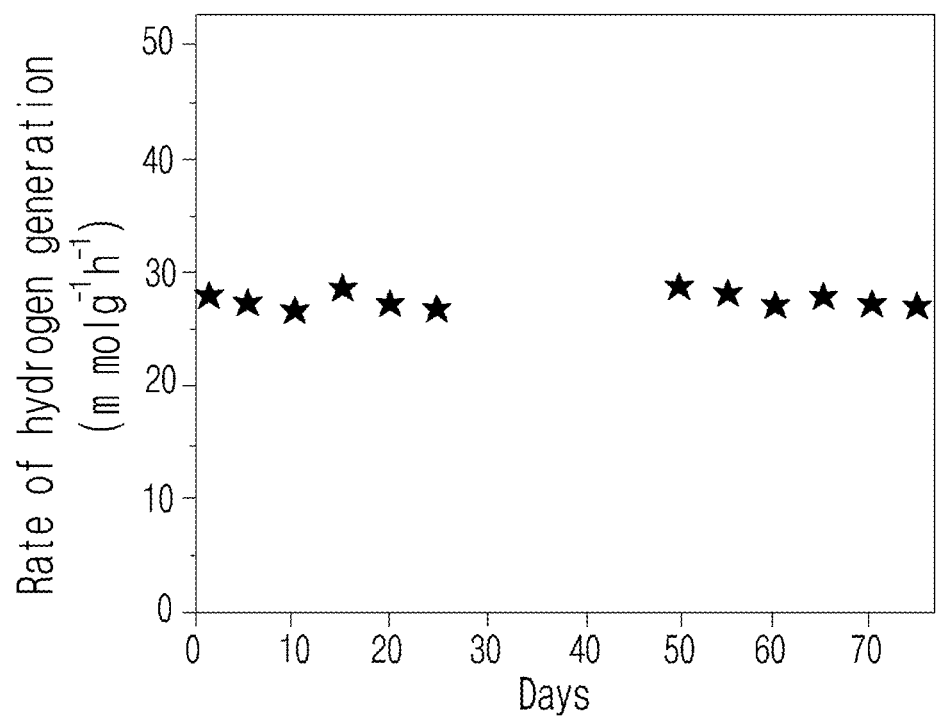

As shown in FIGS. 15 and 16, $H_2$ was regularly generated at the rate of 30 m molg–1h–1 for 4 hours on the first day and thereafter for 25 days $H_2$ was regularly generated. After stored for 25 days and then irradiated with visible light for another 25 days, $H_2$ was generated at the same rate.

Therefore, it was confirmed that the reduced titania photocatalyst prepared by the method of the present invention had a significantly high catalytic stability.

Experimental Example 8 Evaluation of Hydrogen Generation Rate, Stability, and Turnover Number (TON) of the Reduced Titania Photocatalyst Containing Pt The following experiment was performed to investigate the Pt-dependent hydrogen generation rate of the reduced titania photocatalyst prepared by the method of the invention.

The reduced titania photocatalysts containing Pt at the different contents, prepared in examples 5~8, were loaded in a reactor containing 20% methanol, followed by irradiation with the simulated sunlight for about 100 hours. He hydrogen generation amount was measured by on-line gas chromatography (Bruker 450 GC) connected to the reactor. The results are shown in FIG. 17.

Figure 17:
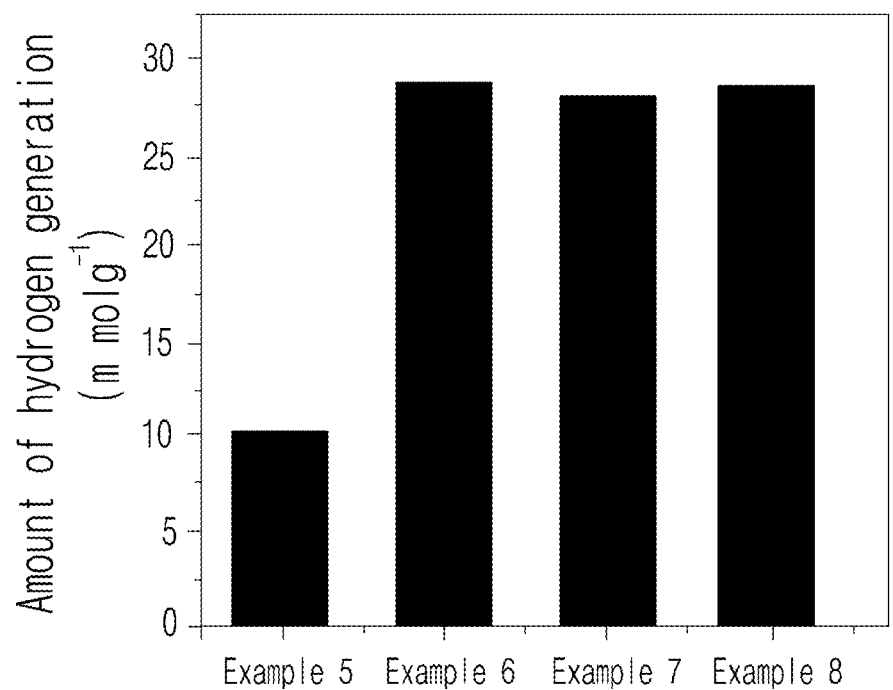
FIG. 17 and FIG. 18 are graphs illustrating the hydrogen generation rate of the reduced titania photocatalyst according to the concentration of platinum (Pt) therein and the hydrogen generation performance of the reduced titania photocatalyst containing 0.25% of platinum (Pt) prepared in the example of the present invention.
Figure 18:
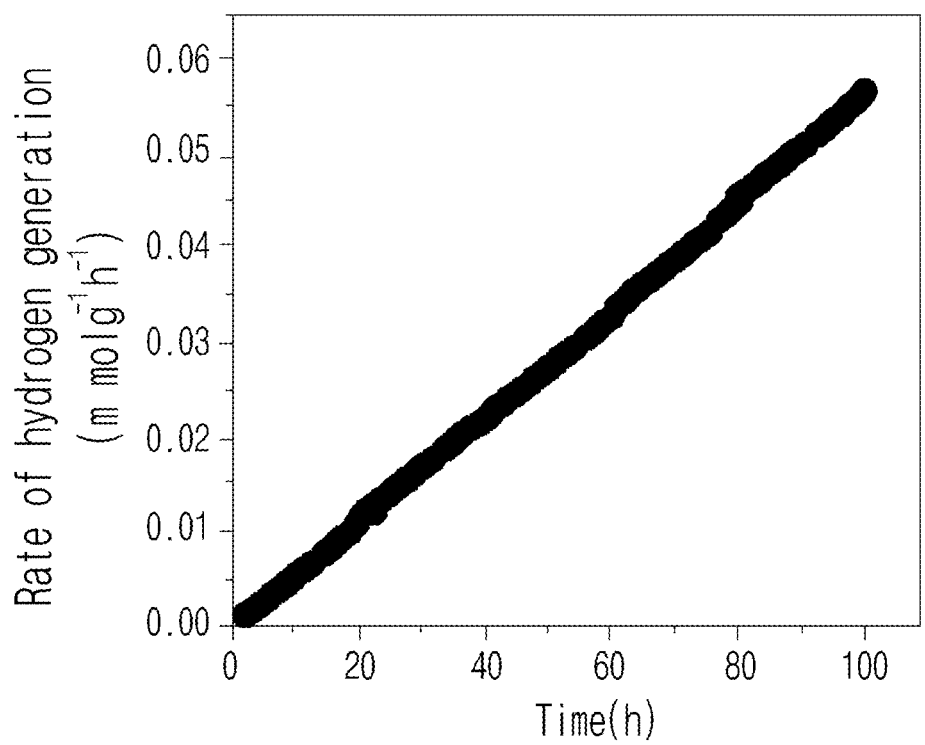

As shown in FIG. 17, the hydrogen generation rate of the photocatalyst containing 0.1% of Pt prepared in example 5 was approximately 10 m molg–1h–1, while the hydrogen generation rates of the photocatalysts containing 0.25, 0.5, and 1% of Pt respectively prepared in examples 6~8 were similarly about 30 m molg–1h–1. As shown in FIG. 18, the hydrogen generation rate of the photocatalyst containing 0.25% of Pt prepared in example 6 was maintained constant for about 100 hours.

That is, even when the content of platinum (Pt) contained in the reduced titania photocatalyst was more than 0.25%, the hydrogen generation rate was not increased nor changed greatly. The photocatalyst containing 0.25% of Pt was confirmed to have an excellent catalytic stability.

Further, when the turnover number was calculated according to formula 2, the turnover number of 20 mg of the photocatalyst containing 0.25% of platinum (Pt), in which the mole number of the generated hydrogen was 0.0612 and the mole number of the Pt was $2.56 \times 10^{-7}$, was 238680 for 100 hours.

Turnover number=mole number of generated hydrogen/mole number of used Pt      <Formula 2>

Therefore, it was confirmed that the catalyst efficiency can be further improved by adding 0.25% of platinum to the reduced titania prepared by the method of the present invention as a method of raising the water decomposition effect of a photocatalyst while minimizing the use of platinum.

Experimental Example 9 Comparison of Bandgap

The following experiment was performed to compare the bandgap of the reduced titania ($TiO_{2-x}$) prepared by the method of the present invention and the bandgap of the titania ($TiO_2$) before the reduction.

Figure 19:
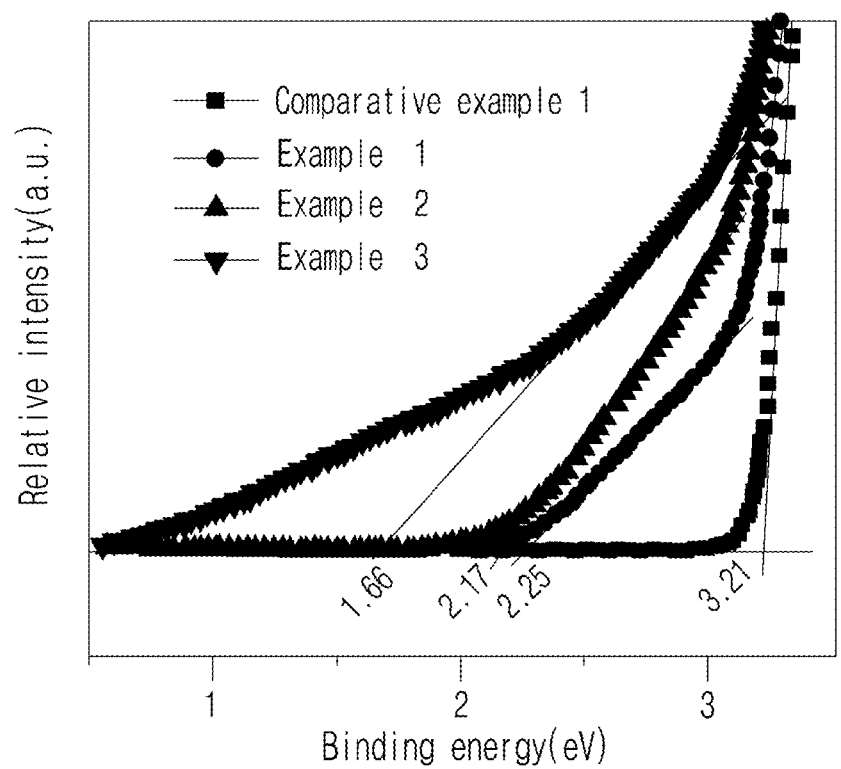
FIG. 19 is a Tauc plot illustrating the bandgaps of the titania photocatalysts prepared in the comparative example and the example of the present invention.

Absorption spectra of the titania ($TiO_2$) photocatalyst of comparative example 1 and the reduced titania ($TiO_{2-x}$) photocatalysts prepared in examples 1~3 were obtained by using Ultraviolet-Visible-Near Infrared Spectrophotometer (CARY5000, Agilent Technology). Tauc plot was obtained from the above results, by which bandgap was determined. The results are shown in FIG. 19 and Table 3. At this time, the Tauc Plot is a graph presenting the light absorption amount to light energy, and the energy bandgap can be obtained by a method of linear extrapolation of the slope of the graph to the energy axis.

Figure 20:
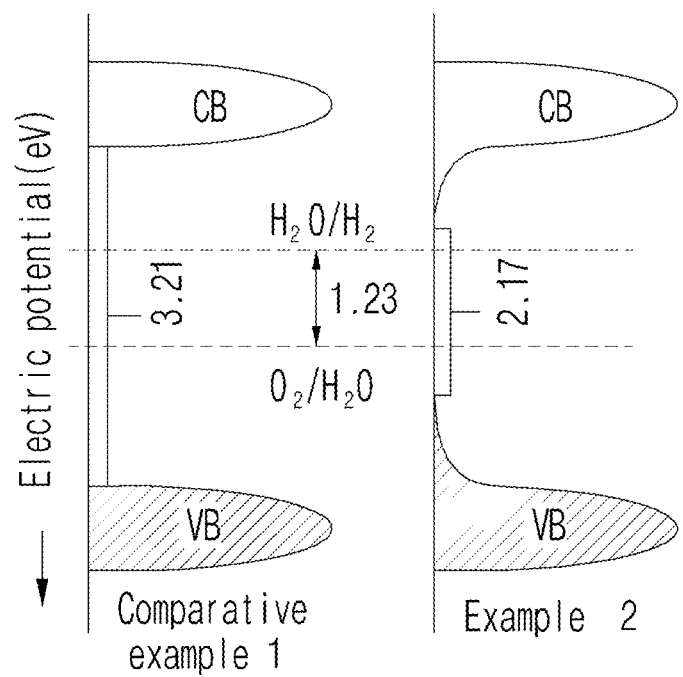
FIG. 20 is a band energy diagram illustrating the bandgaps of the titania photocatalysts prepared in the comparative example and the example of the present invention.

The location of the valence band of the titania ($TiO_2$) photocatalyst of comparative example 1 and that of the reduced titania ($TiO_{2-x}$) photocatalyst prepared in example 2 were compared by XPS. Considering the obtained valence band location and bandgap, a band energy diagram was made and is shown in FIG. 20.

TABLE 3

|  | Bandgap (eV) |
| --- | --- |
| Comparative Example 1 | 3.21 |
| example 1 | 2.25 |
| example 2 | 2.17 |
| example 3 | 1.66 |

One end of the peak of the valence band of the titania ($TiO_2$) photocatalyst of comparative example 1 and the reduced titania ($TiO_{2-x}$) photocatalyst prepared in example 2 was 2.53 and 1.88 eV respectively, indicating that the valence band of the reduced titania photocatalyst prepared in example 2 moved to the position showing relatively low binding energy. That is, the upper part of the valence band of the reduced titania photocatalyst prepared in example 2 moved toward the Fermi level.

As shown in FIG. 20, the reduced titania ($TiO_{2-x}$) prepared by the method of the present invention had the bandgap of 2.17 which is narrower than the bandgap of the conventional titania ($TiO_2$) because a part of the valence band was increased and a part of the conduction band was lowered. The changes in the energy bandgap can be attributed to the oxygen vacancy formed on the surface of the reduced titania photocatalyst.

Experimental Example 10 Comparison of Photoluminescence Performance

The following experiment was performed with changing the concentration of magnesium hydride ($MgH_2$) in order to compare of the photoluminescence capacity of the reduced titania ($TiO_{2-x}$) photocatalyst containing 1% of Pt.

Preparation of a Film for the Analysis of Photoluminescence

The titania photocatalyst of comparative example 6 and the reduced titania photocatalysts ($TiO_{2-x}$) prepared in examples 8~10 containing 1% of Pt were dispersed in water.

The photocatalyst dispersed solution was dropped on a glass board, resulting in the preparation of a film comprising the dried photocatalyst.

The photoluminescence spectrum was obtained from the film above by using a wavelength of 325 nm and a slit of 10 nm. The results are shown in FIG. 21.

Figure 21:
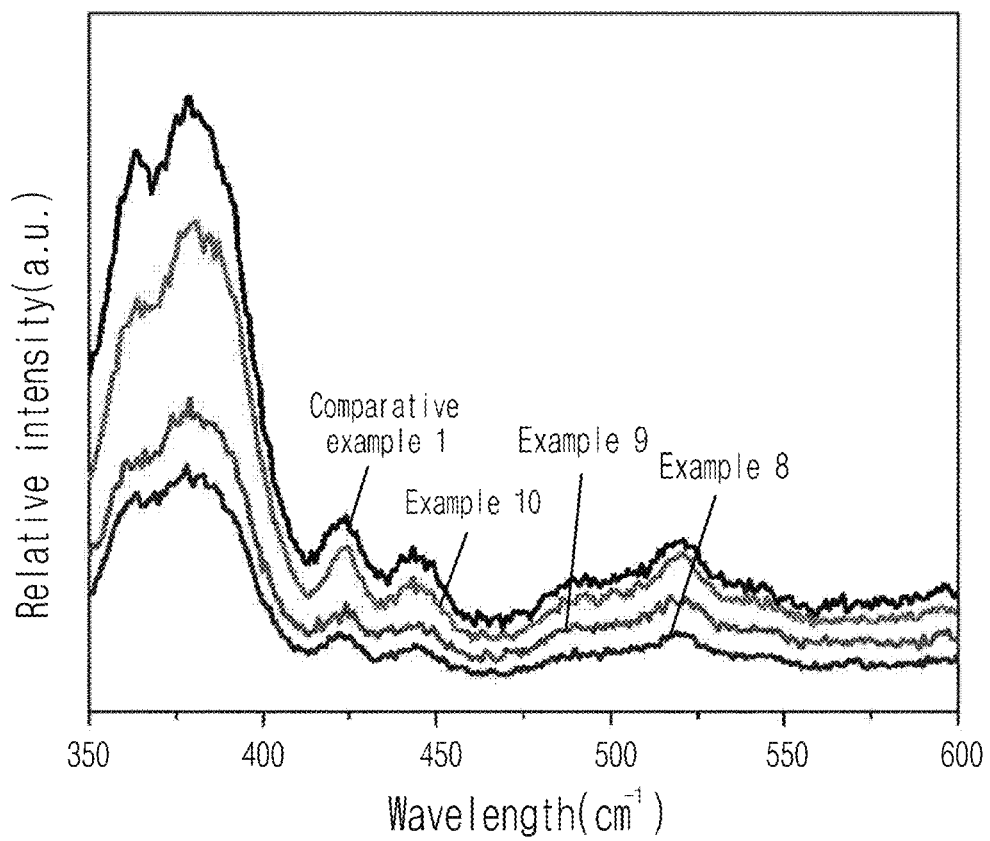
FIG. 21 is a photoluminescence spectrum illustrating the photoluminescence characteristics of the titania photocatalysts prepared in the comparative example and the example of the present invention.

As shown in FIG. 21, the reduced titania photocatalysts containing 1% of Pt prepared in examples 8~10 showed relatively low photoluminescence strength than the titania photocatalyst of comparative example 6. In particular, the reduced titania of example 8 showed the weakest strength of photoluminescence. This can be attributed to the electron-hole recombination effect. That is, the photocatalyst of example 10 included higher content of $MgH_2$, so that the surface defect was increased, resulting in the narrower bandgap as much as the result of experimental example 9. However, once the detects were increased more than a certain point, a new electron-hole recombination site was formed so that the recombination was increased. By this phenomenon, the catalytic activity of the photocatalyst began to decrease again.

Therefore, the reduced titania photocatalyst of the present invention shows the most excellent photocatalytic characteristics when it includes $MgH_2$ at the molar ratio of 0.5 to the titania ($TiO_2$)

Experimental Example 11 Analysis of Hydrogen Component

The following experiment was performed to compare the hydrogen component included in the reduced titania ($TiO_{2-x}$) photocatalyst prepared by the method of the present invention and the titania ($TiO_2$) photocatalyst before the reduction.

The hydrogen component included in the titania photocatalyst of comparative example 1 and the reduced titania photocatalyst prepared in example 2 was investigated via proton (1H) solid phase nuclear magnetic resonance (NMR) resonance spectrum. The results are shown in FIGS. 22 and 23.

Figure 22:
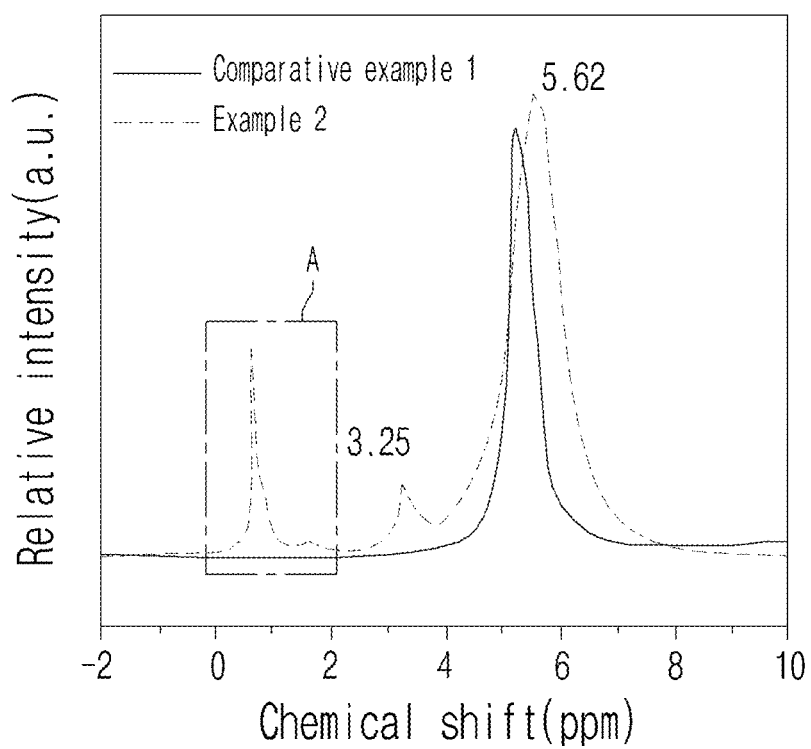
FIG. 22 and FIG. 23 are tritium (1H) solid state nuclear magnetic resonance (NMR) spectra illustrating the hydrogen states of the titania photocatalysts prepared in the comparative example and the example of the present invention.
Figure 23:
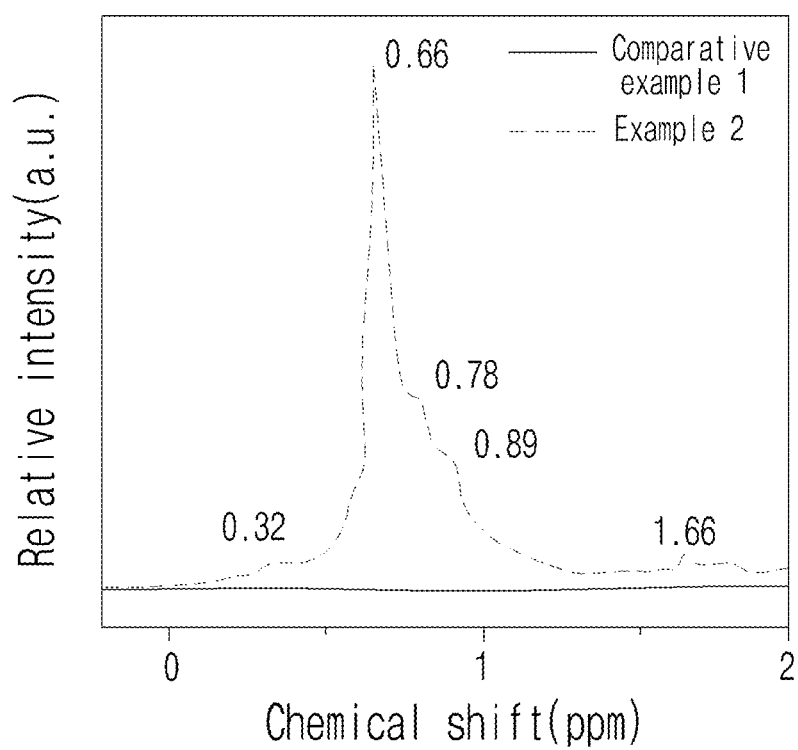

As shown in FIGS. 22 and 23, in the case of the titania photocatalyst of comparative example 1, the peak was only found in the location of 5.26 ppm presenting the hydrogen attached on the surface. In the meantime, in the case of the reduced titania photocatalyst prepared in example 2, the peaks were found not only in the location of 5.62 ppm presenting the hydrogen attached on the surface but also in the locations of 0.66 ppm and 0.32 ppm indicating the hydrogen included in the oxygen vacancy and the interstitial detect. That is, it was confirmed that hydrogen was doped on the surface of the reduced titania photocatalyst prepared in example 2.

The reduced titania photocatalyst prepared by the method of the present invention had a narrower bandgap and displayed reduced electron-hole recombination, so that it could have the increased light absorption capacity for the light of visible light range.

Experimental Example 12 Comparison of Hydrogen Generation Performance (4)—Hydrogen Generation Performance According to the Solution Type The following experiment was performed to investigate the hydrogen generation from pure water, 20% methanol aqueous solution, and sea water containing 20% methanol by the reduced titania ($TiO_{2-x}$) photocatalyst prepared by the method of the invention when the simulated sunlight (AM 1.5 G, 1 Sun) was irradiated.

The reduced titania photocatalyst prepared in example 2 was loaded in a reactor together with pure water, 20% methanol aqueous solution, or sea water containing 20% methanol, which was irradiated with the simulated sunlight (AM 1.5 G, 1 Sun). The hydrogen generation amount and the generation rate were measured by on-line gas chromatography (Bruker 450 GC) connected to the reactor. The results are shown in FIGS. 24 and 25.

Figure 24:
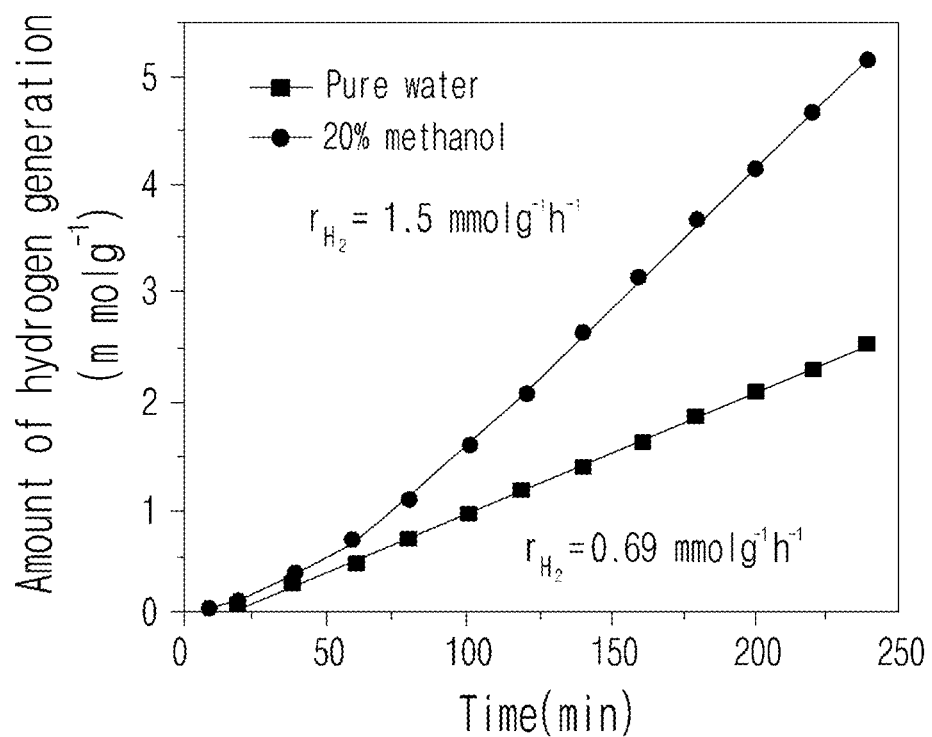
FIG. 24 is a graph illustrating the hydrogen generation performance of the reduced titania photocatalyst not-containing platinum (Pt), prepared in the example of the present invention, from pure water and methanol using sunlight.
Figure 25:
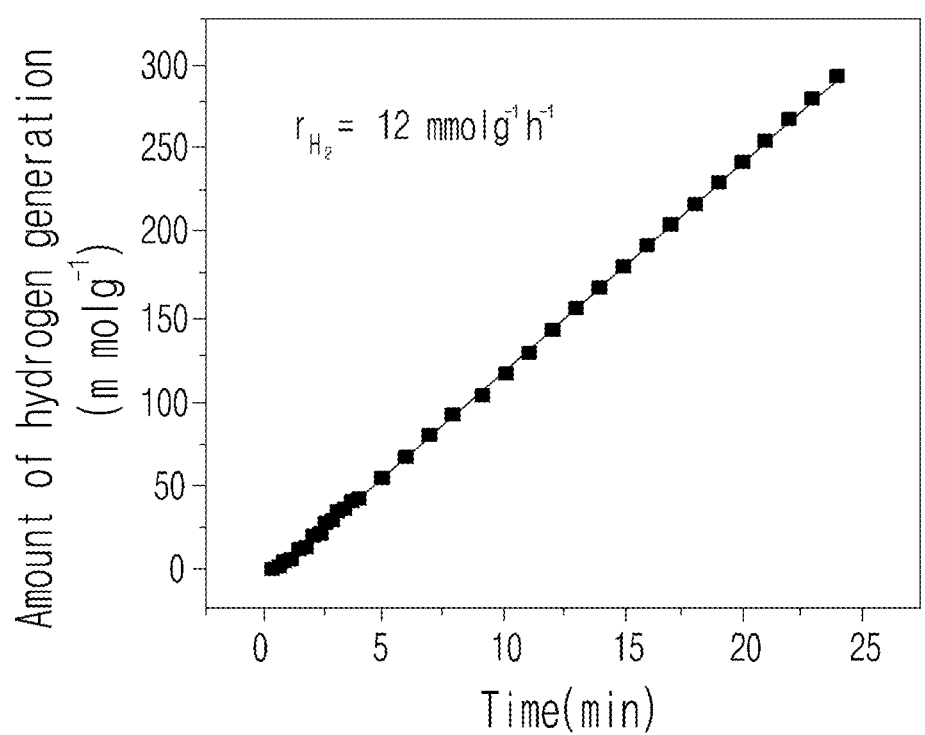
FIG. 25 is a graph illustrating the hydrogen generation performance of the reduced titania photocatalyst containing 0.25% of platinum (Pt) prepared in the example of the present invention from seawater containing 20% of methanol.

As shown in FIG. 24, when water splitting was induced with the reduced titania photocatalyst prepared in example 2 that did not contain Pt, the rates of hydrogen generation from pure water and 20% methanol aqueous solution were approximately 0.69 and 1.5 m molg–1h–1 respectively. That is, the rate of hydrogen generation was further increased when 20% methanol was included than when using pure water.

When hydrogen generation was induced in sea water containing 20% methanol using the reduced titania photocatalyst containing 0.25% of Pt prepared in example 6, the hydrogen generation rate was about 12 m molg–1h–1, which was stable for 24 hours. The efficiency of solar to $H_2$ (STH) in sea water containing 20% methanol was investigated by the same manner as described in experimental example 5. As a result, the efficiency of STH in sea water was approximately 1%.

The reduced titania photocatalyst of the present invention can induce hydrogen generation from non-purified sea water by using sunlight, indicating that the photocatalyst is useful to produce hydrogen economically and pro-environmentally.

In the meantime, when hydrogen generation was induced in 20% methanol aqueous solution using the reduced titania photocatalysts containing 0.25% (experimental example 8: evaluation of H2 generation rate using simulated sunlight) and not-containing Pt (experimental example 12), the hydrogen generation rate was approximately 30 and 1.5 m molg–1h–1 respectively. Therefore, it was confirmed that when Pt was included in the reduced titania photocatalyst, the hydrogen generation performance of the photocatalyst was more increased.

Experimental Example 13 Comparison of Hydrogen Generation Performance (5)—Hydrogen Generation Performance According to the Preparation Method The following experiment was performed to compare the performance of the reduced titania photocatalysts prepared by different methods.

The hydrogen generation amount and the generation rate of the reduced titania photocatalysts containing 0.25% of Pt prepared in example 2 and comparative examples 3~5 were investigated by the same manner as described in experimental example 4. The results are shown in FIGS. 26 and 27.

Figure 26:
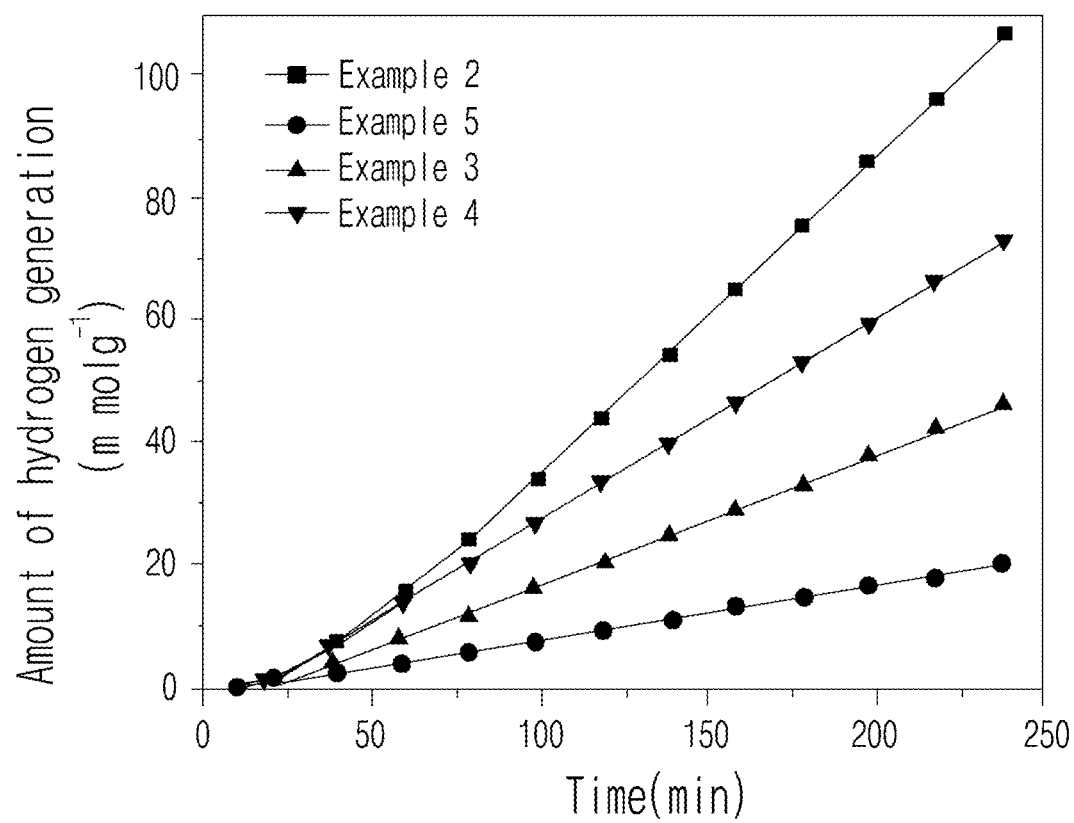
FIG. 26 and FIG. 27 are graphs comparing the hydrogen generation performance of the reduced titania photocatalysts containing 0.25% of platinum (Pt) prepared by using different preparation methods using different reducing agents.
Figure 27:
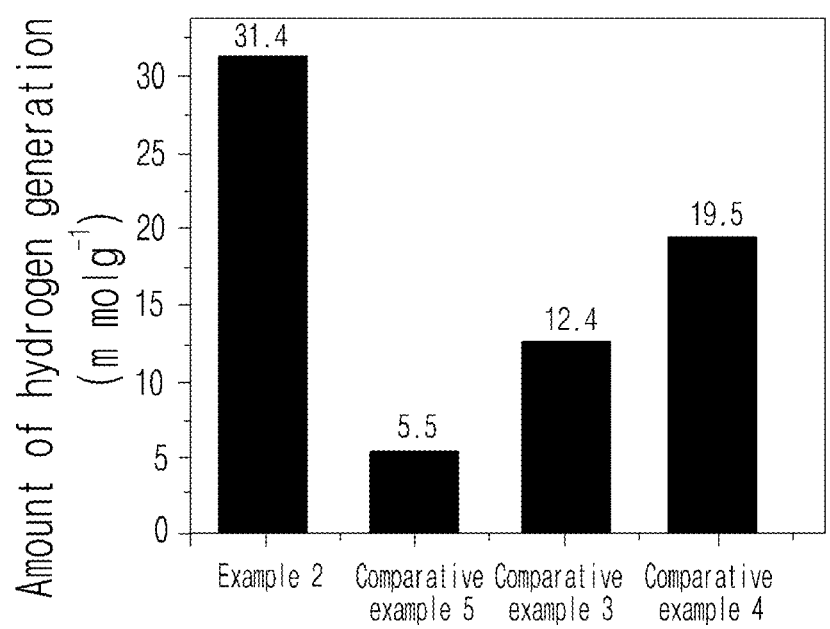
Figure 28:
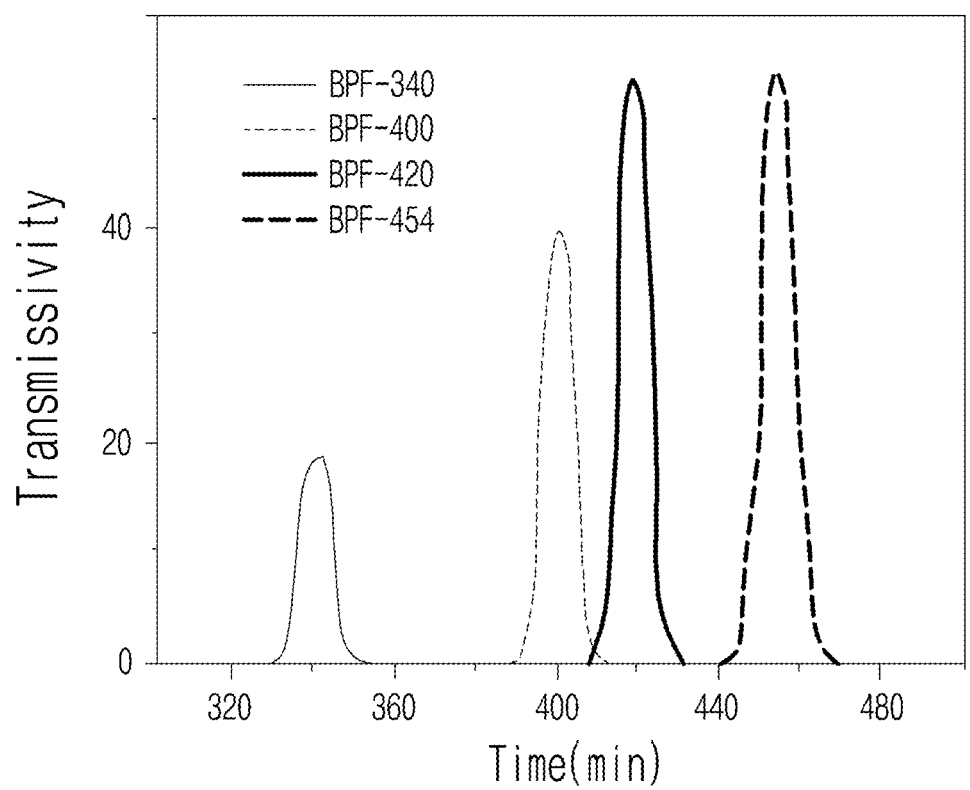
FIG. 28~FIG. 31 are graphs illustrating the changes in hydrogen generation performance and quantum efficiency of the reduced titania ($TiO_{2-x}$) photocatalyst containing platinum (Pt), prepared in the example of the present invention, according to the irradiation of the light of a specific wavelength of ultraviolet light and visible light range.

As shown in FIG. 26 and FIG. 27, the hydrogen generation amount and the generation rate of the reduced titania photocatalyst prepared in example 2 added with Pt after the reduction were higher than those of the reduced titania photocatalysts prepared in comparative examples 3~5 added with Pt after the reduction.

Therefore, it was confirmed that the reduced titania photocatalyst prepared by the preparation method of the present invention using MgH$_2$ had a significantly improved photocatalyst performance in visible light range.

Experimental Example 14 Quantum Efficiency of the Reduced Titania Photocatalyst Containing Platinum (Pt)

The following experiment was performed to investigate the quantum efficiency of the reduced titania (TiO$_{2-x}$) photocatalyst of the invention according to the irradiation of the light of specific wavelength in ultraviolet and visible light range.

The reduced titania photocatalyst containing Pt, prepared in example 6, was loaded in a reactor containing 20% methanol aqueous solution, which was irradiated with 450 mWcm−2 Xenon lamp. At this time, the light of specific wavelength (340, 400, 420, and 454 m) selected by using a blue bandpass was used to irradiate the photocatalyst. Then, the hydrogen generation amount and the quantum efficiency were measured by on-line gas chromatography (Bruker 450 GC) connected to the reactor. The results are shown in FIGS. 28~31.

Figure 29:
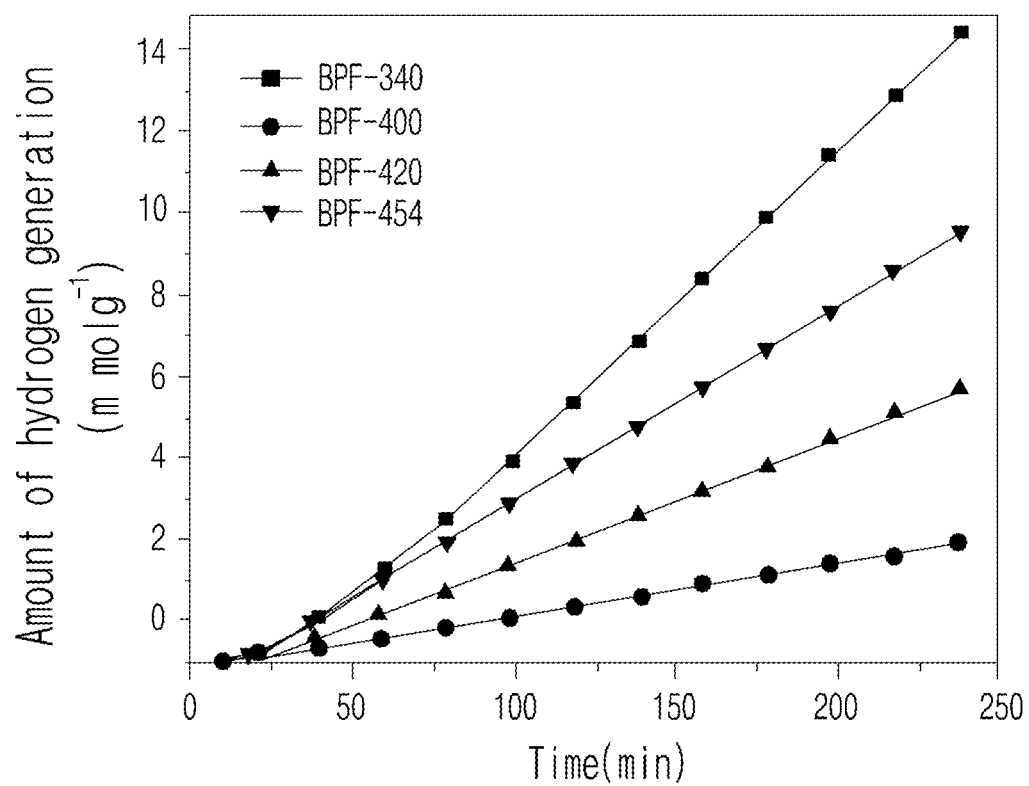
Figure 30:
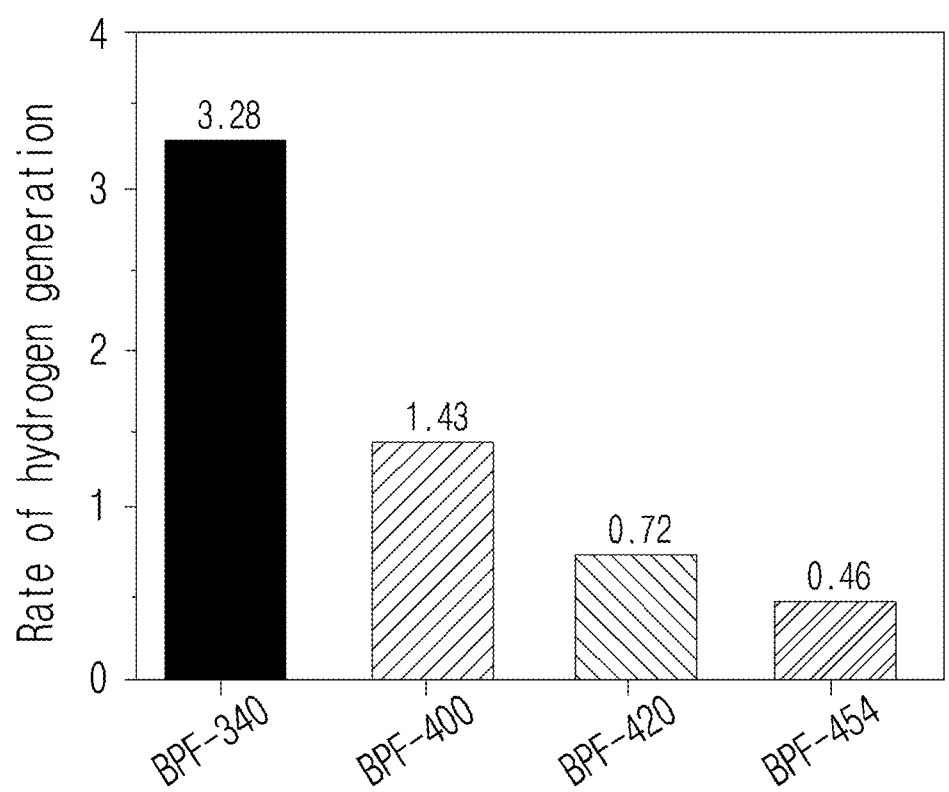
Figure 31:
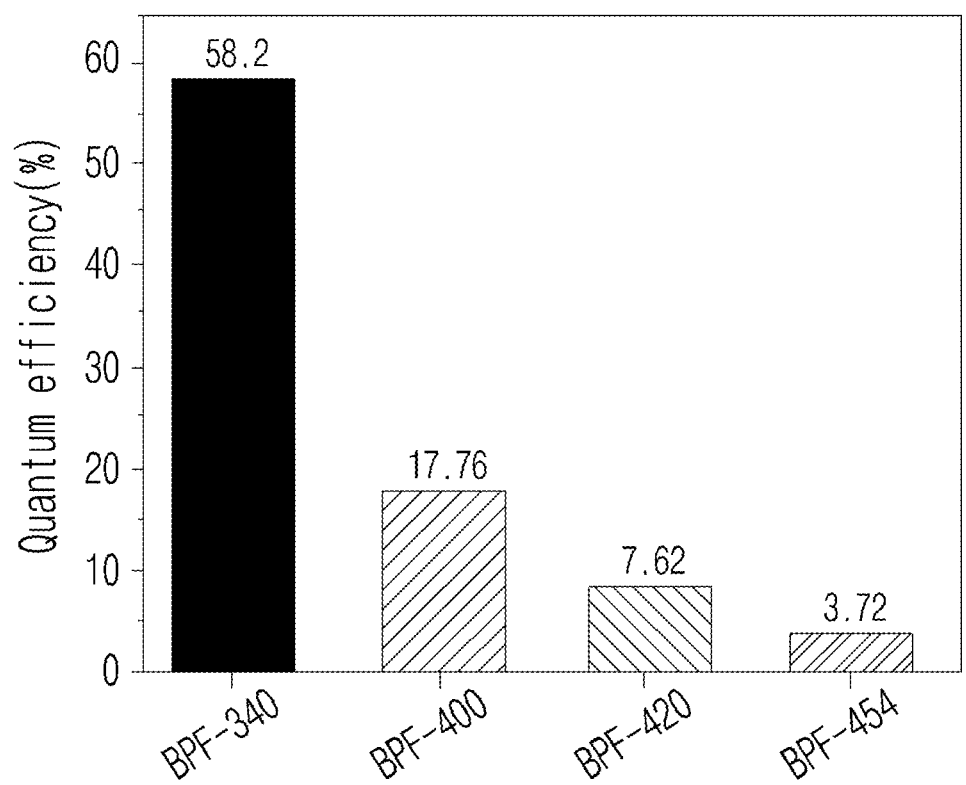

As shown in FIG. 28~FIG. 31, only the light of a specific wavelength was transmitted by each blue bandpass filter. When the photocatalyst was irradiated with the light above that passed through the filter, the hydrogen generation amount and the generation rate were as shown in FIGS. 29 and 30. As shown in FIG. 31, the quantum efficiency was 17.8, 7.62, and 3.72% in the visible light range of 400±10, 420±10, and 454±10 nm, indicating the excellent water splitting activity under visible light. That is, in the visible light range, hydrogen was generated and as the wavelength got shorter, the hydrogen generation amount, the generation rate, and the quantum efficiency were more excellent.

Experimental Example 15

Figure 32:
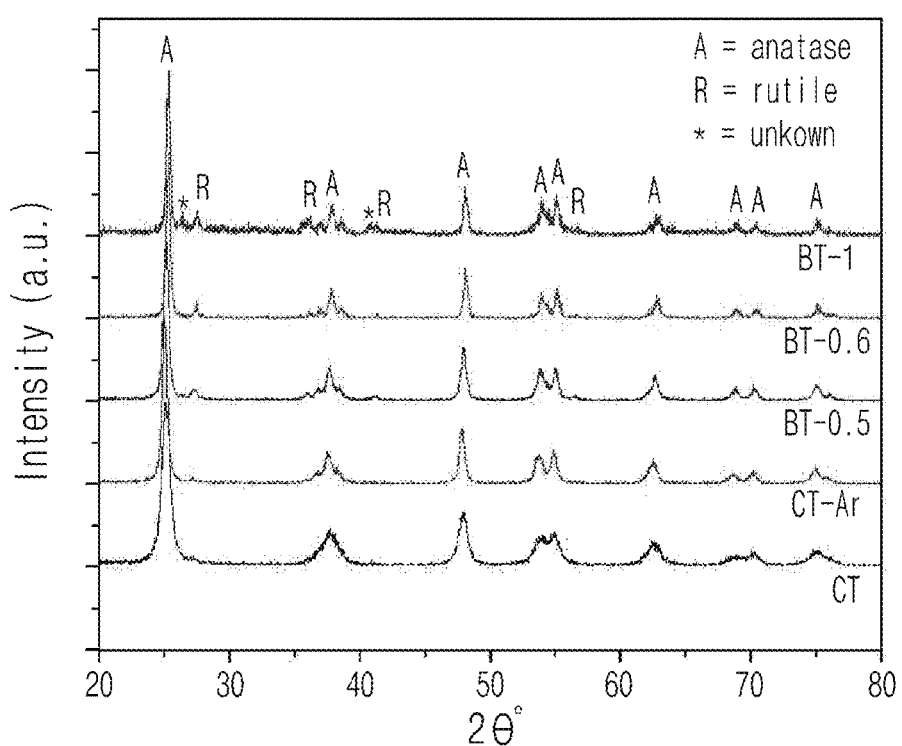
FIG. 32 is a graph illustrating the results of XRD (X-ray diffraction).

FIG. 32 illustrates the results of XRD (X-ray diffraction). XRD was performed at the scanning speed of 4° min−1 at 40 kV and 30 mA by using Cu-Kα (0.15406 nm).

As shown in FIG. 32, it was confirmed that the anatase phase was the major and the rutile phase was the minor in CT and CT-Ar (comparative examples 7 and 8) through the XRD pattern. One of the reasons that the rutile phase appeared is that it was heated at 650° C. The rutile peak was increased with increasing the content of Mg, indicating that the presence of Mg at high temperature facilitated the phase change.

Referring to the XRD pattern shown in FIG. 32, CT and CT-Ar (comparative examples 7 and 8) did not contain Mg or MgO. The XRD pattern above did not show the peaks related to Ti$_2$O$_3$ and other titanium suboxides. In the XRD pattern of FIG. 32, BT-1 (example 16) showed an almost never known peak that did not correspond to a specific titanium compound. The peak did not relate to Ti$_2$O$_3$, MgO, or Mg$_2$TiO$_4$. The peak seemed to be generated by the heat-treatment with a large amount of Mg under H$_2$/Ar atmosphere Experimental Example 16

Table 4 below shows the crystallite size calculated from the XRD data by using Scherrer formula.

TABLE 4

| Scherrer Formula | Sample | Dp (nm) |
|---|---|---|
| $D_p = \dfrac{0.94\lambda}{\beta_{1/2}\cos\theta}$ | Comparative Example 7 (CT) | 10.77 |
| | Comparative Example 8 (CT-Ar) | 16.09 |
| | Example 13 (BT-0.5) | 15.36 |
| | Example 15 (BT-0.75) | 25.78 |
| | Comparative Example 7 (CT) | 26.36 |
| | Comparative Example 8 (CT-Ar) | 10.77 |

Dp: Average crystallite size
β: Line broadening in radians
θ: Bragg angle
λ: Wavelength of X-ray As shown in Table 4, the crystallite size of CT-Ar (comparative example 8) that had been treated with heat under Ar atmosphere was bigger than that of the commercial TiO$_2$ CT (comparative example 7). The crystallite size was bigger as the Mg content increased. Therefore, it was confirmed that the crystallite size was affected by the heat treatment condition and the content of Mg.

Experimental Example 17

Figure 33:
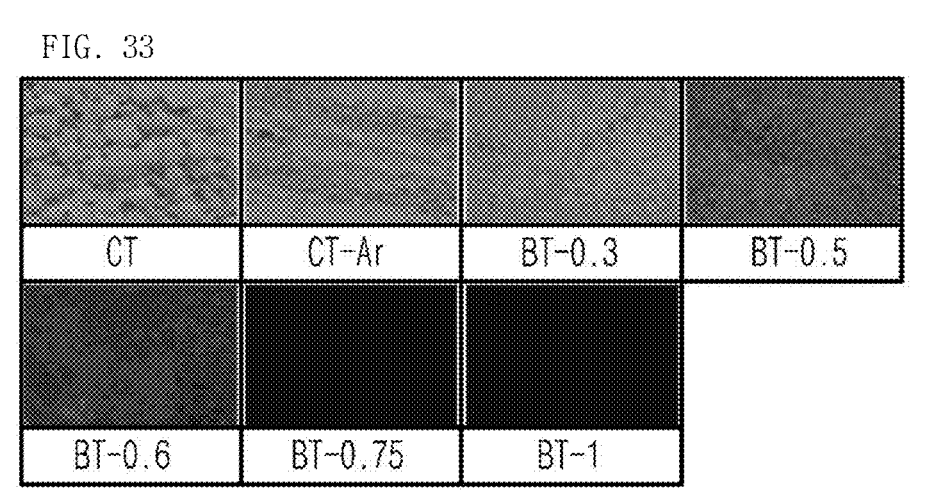

FIG. 33 illustrates the colors of the photocatalysts prepared in the comparative example and the example of the present invention. The surfaces of the titania photocatalysts of the comparative example and the example taken with SEM.

As shown in FIG. 33, Mg affects the TiO$_2$ particles on the surface. In general, when TiO$_2$ particles are rich, the color of the surface is turning from white via gray to black. The surface color of the photocatalysts of comparative examples 7 and 8 (CT and CT-Ar) not containing Mg was bright. However, as shown in examples 12~16, the higher the Mg content, the darker the color. The results of FIG. 32 and FIG. 33 confirmed that Mg played a role in changing the surface of TiO$_2$ particles. The dark color means that the absorbance of visible light is high. So, as the content of Mg was increased, the absorption of visible light was increased.

Experimental Example 18

Figure 34:
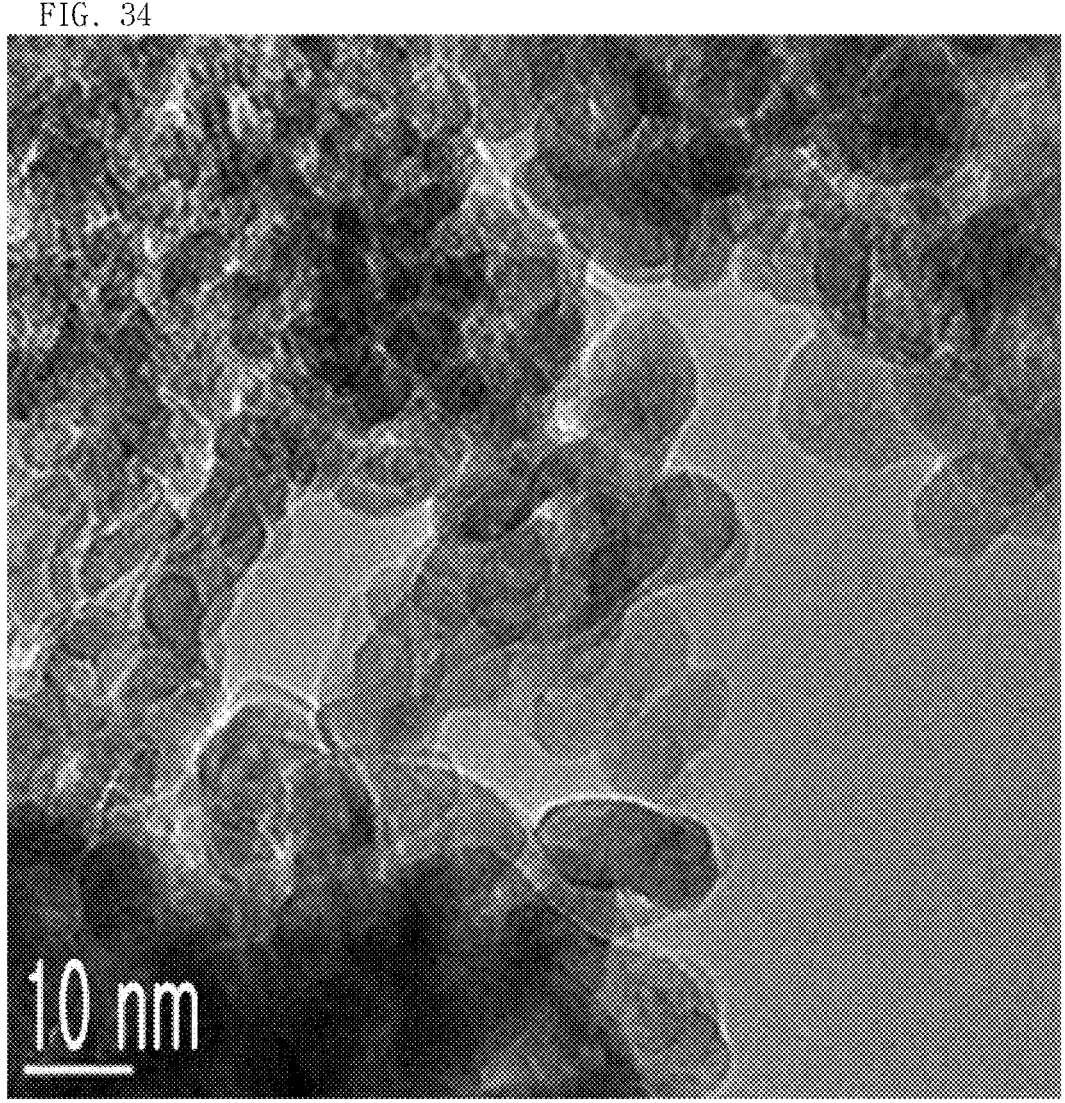
FIG. 34~FIG. 37 are high-resolution transmission electron microscope (HR-TEM) images illustrating the photocatalysts prepared in the comparative example and the example of the present invention.
Figure 35:
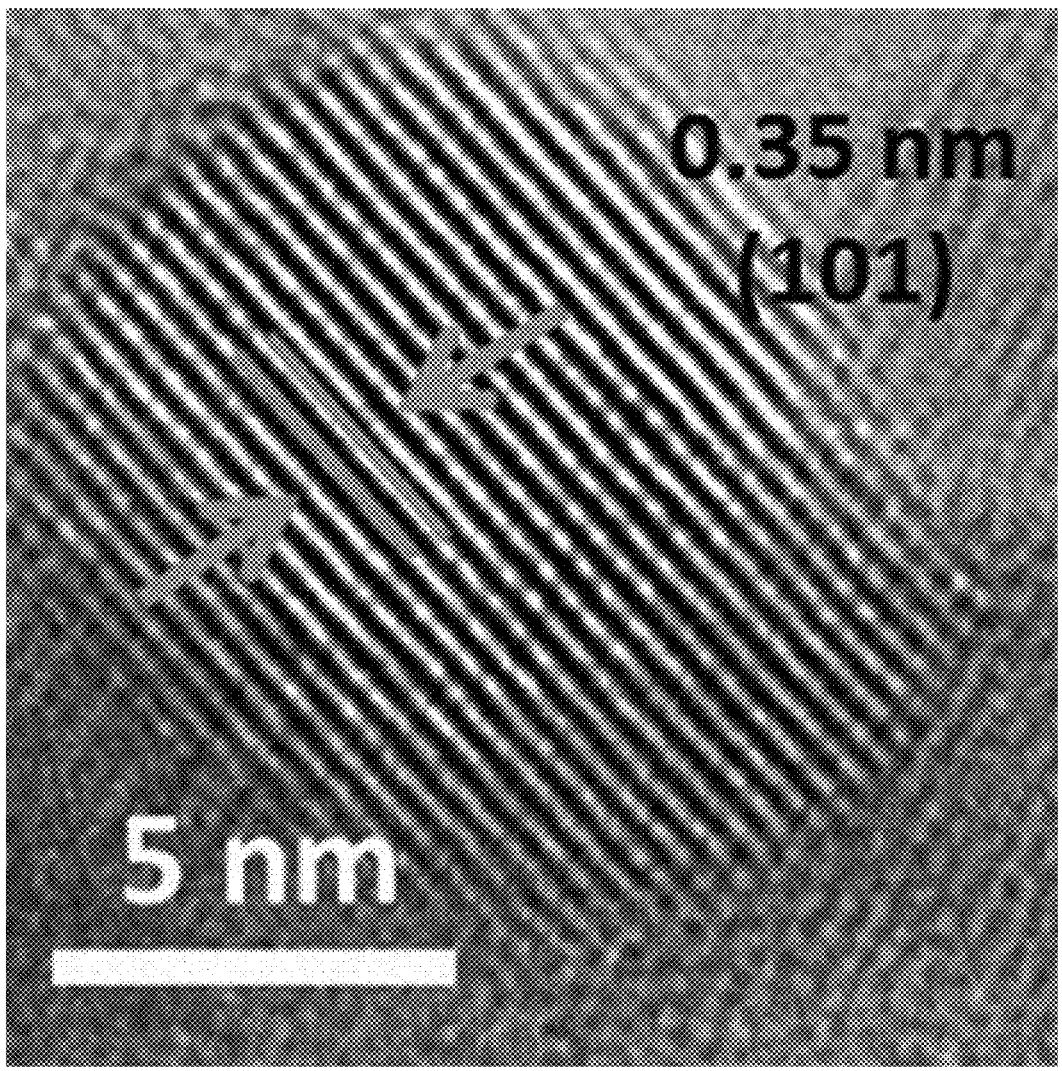
Figure 36:
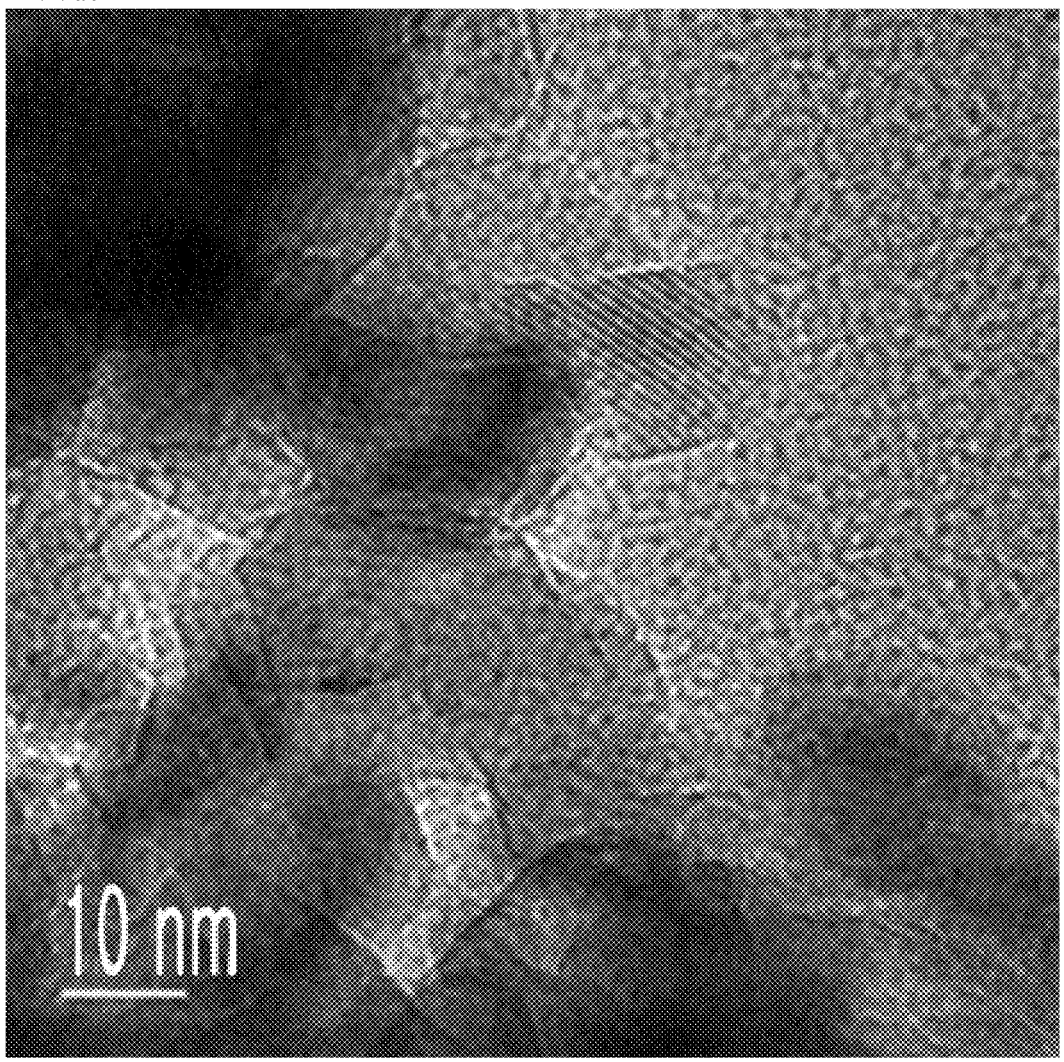
Figure 37:
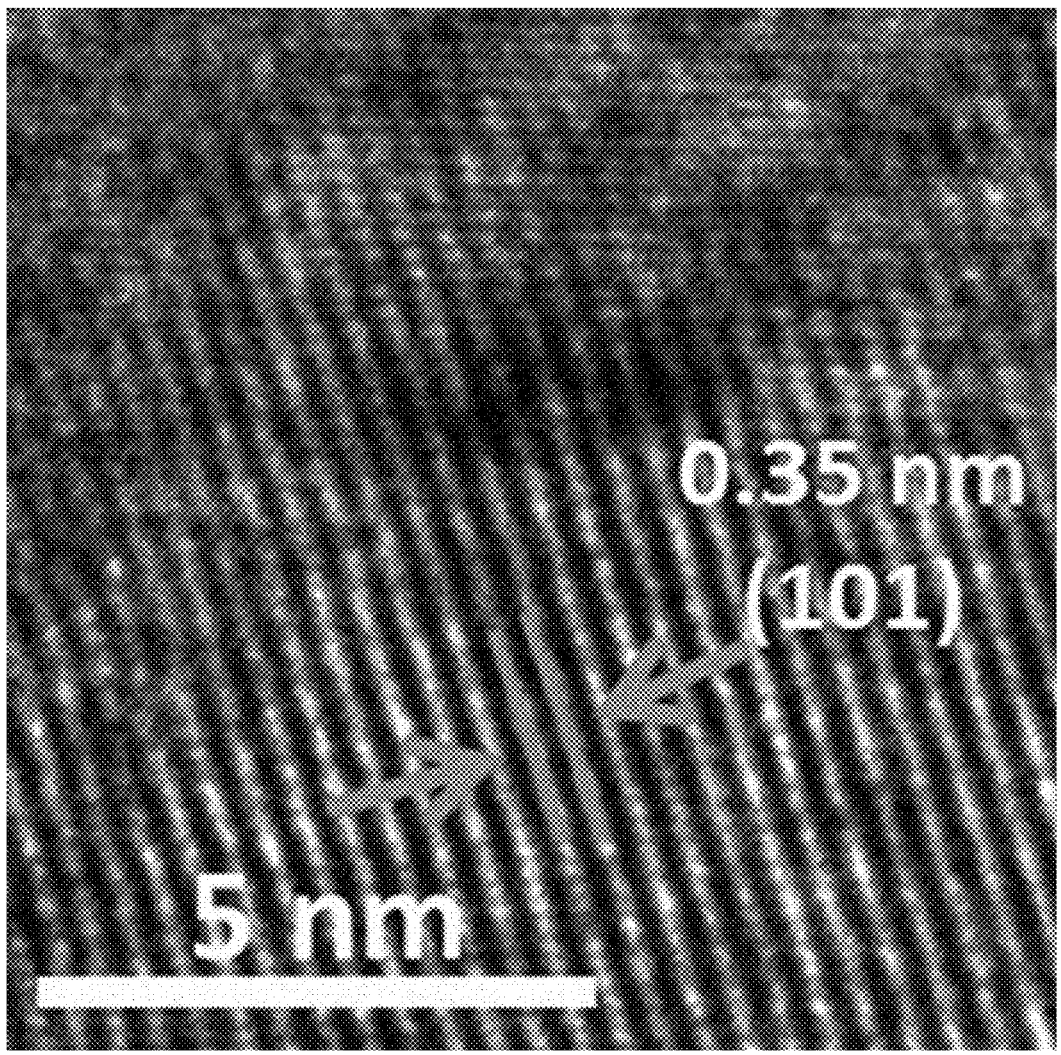

FIG. 34~FIG. 37 are high-resolution transmission electron microscope (HR-TEM) images illustrating the photocatalysts prepared in the comparative example and the example of the present invention. FIG. 34 and FIG. 35 are HR-TEM images of the photocatalyst prepared in comparative example 7 (CT). FIG. 36 and FIG. 37 are HR-TEM images of the photocatalyst prepared in example 13 (BT-0.5). To obtain the HR-TEM images, JEOL FE-2010 operated in the condition of 200 kV was used.

As shown in FIGS. 34~37, the particle size of the photocatalyst of comparative example 7 (CT) was 10~15 nm, while the particle size of that of example 13 (BT-0.5) was 15~20 nm. The reason of the bigger particle size of the photocatalyst of example 13 (BT-0.5) is the heat treatment at 650° C., by which some of the particles were aggregated, or the Mg treatment.

As shown in FIGS. 34~37, the distance between the lattice bands in the photocatalysts of comparative example 7 (CT) and example 13 (BT-0.5) was approximately 0.35 nm, which was corresponding to the plane of the anatase phase (101). The plane of the anatase phase (101) was exposed in both cases of the photocatalysts of comparative example 7 (CT) and example 13 (BT-0.5). The exposed surface of the anatase titania was maintained as it was during the magnesiothermic reduction.

The exposed plane {101} of the titania crystal is an important factor for the photocatalyst phenomenon. The {001} plane of the anatase $TiO_2$ was thermodynamically stable and showed higher energy and activity than the {101} plane. However, when Pt was present as a co-catalyst, the {101} plane showed the highest activity for producing hydrogen by water splitting.

Experimental Example 19

Figure 38:
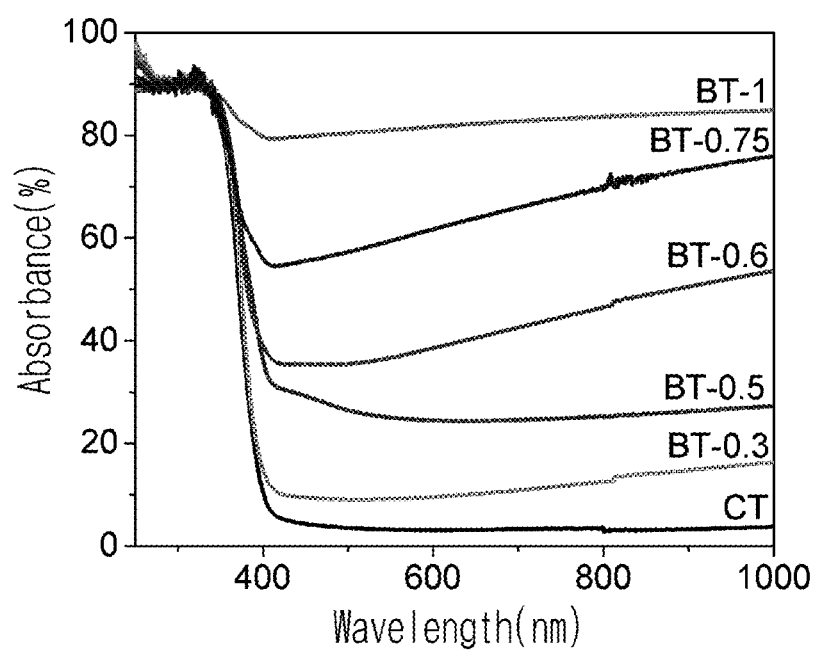
FIG. 38 is a graph illustrating the absorption spectra of the photocatalysts of comparative examples and examples of the invention.

FIG. 38 is a graph illustrating the absorption spectra of the photocatalysts of comparative examples and examples of the invention. The absorption spectra were measured by using Ultraviolet-Visible-Near Infrared Spectrophotometer (CARY5000, Agilent Technology).

As shown in FIG. 38, the photocatalysts containing Mg prepared in examples 12~16 (BT-0.3, BT-0.5, BT-0.6, BT-0.75, and BT-1.0) demonstrated relative high absorbance from UV region to VIS and IR regions as well, compared with the commercial $TiO_2$ of comparative example 1 (CT). As the content of Mg was increased in examples 12~17 (BT-0.3, BT-0.5, BT-0.6, BT-0.75, and BT-1.0), the absorbance was also increased. The absorbance extending in the visible (VIS) and infrared (IR) regions was related to the color change of the surface described above. As shown in FIGS. 33~38, the magnesiothermic treatment of titanium nanoparticles can increase the absorbance or induce the surface transformation represented by color change.

Experimental Example 20

Figure 39:
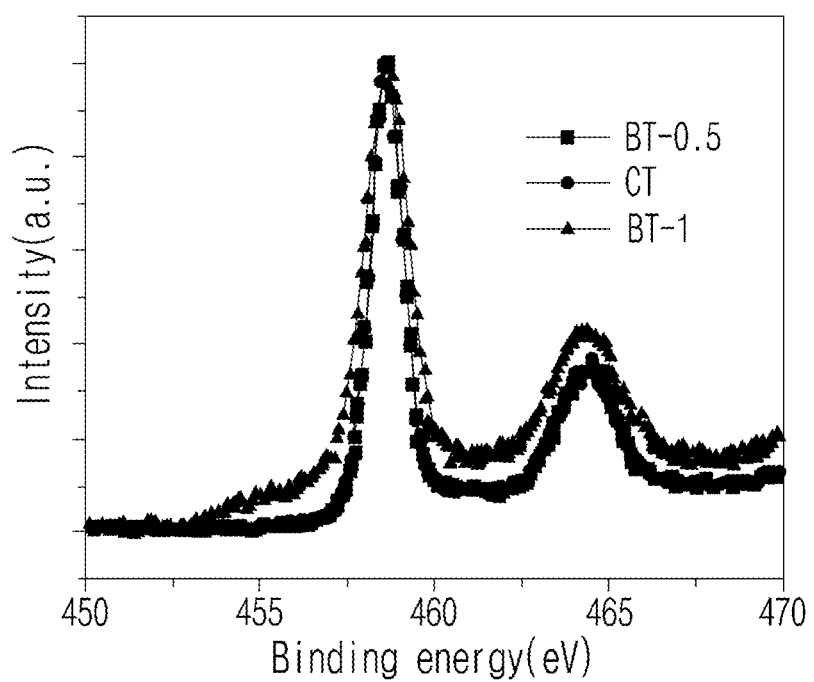
FIG. 39 is a graph illustrating the results of X-ray photoelectron spectroscopy.

FIG. 39 illustrates the results of XPS (X-ray photoelectron spectroscopy). XPS was performed with ESCALAB 250 XPS system using Kα (150 W) source.

Experimental Example 21

Figure 40:
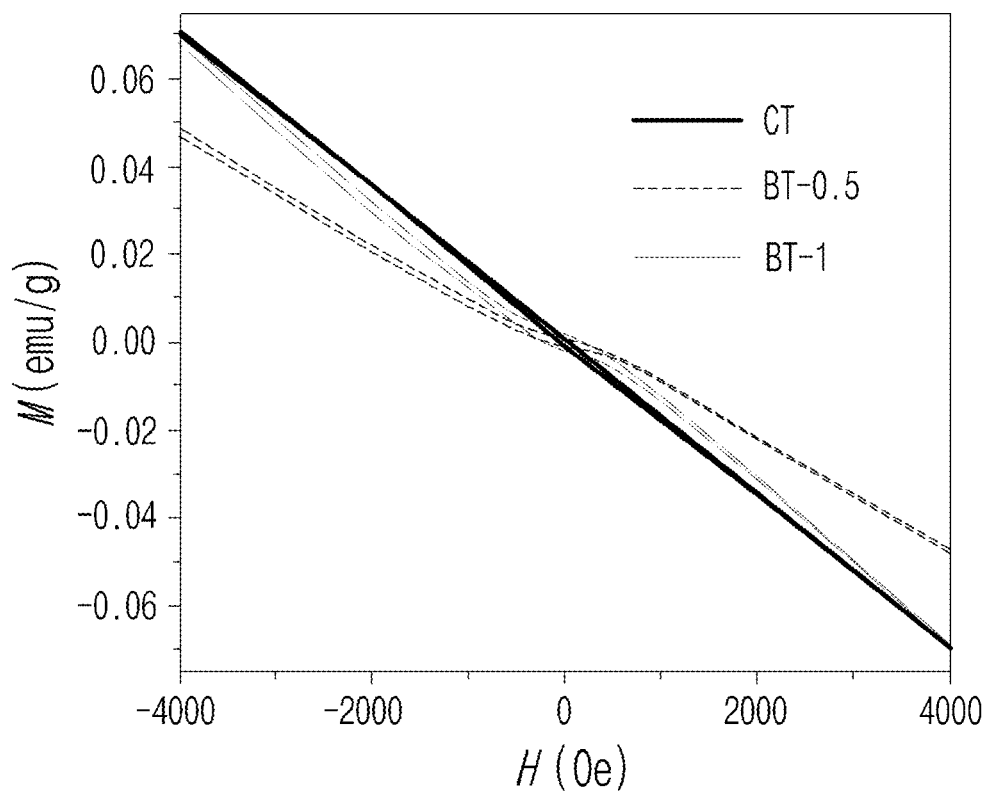
FIG. 40 is a graph illustrating the magnetic fields of BT-0.5 (example 13), BT-1 (example 16) and CT (comparative example 7) according to the magnetization plots.

FIG. 40 illustrates the magnetic fields of BT-0.5 (example 13), BT-1 (example 16) and CT (comparative example 7) according to the magnetization plots.

As shown in FIG. 39, the Ti 2p XPS spectrum of BT-1 (example 16) showed some absorbance toward the lower binding energy because of the presence of $Ti^{3+}$. However, the absorbance in the lower energy region was not observed in BT-0.5 (example 13). As shown in FIG. 40, the presence of $Ti^{3+}$ in $TiO_2$ could be explained by the ferromagnetism measured by magnetization plot. The plot related to BT-0.5 (example 13) and BT-1 (example 16) showed hysteresis clearly. In the meantime, the hysteresis was not observed in CT (comparative example 7). This result indicates that the ferromagnetic properties are caused by the formation of $Ti_{3+}$ in BT-0.5 (example 13) and BT-1 (example 16) while being synthesized using Mg. The presence of $Ti^{3+}$ in $TiO_2$ can increase the activity of the catalyst. Therefore, when the titania catalyst was prepared in the example of the present invention by including Mg, the photoactivity of the catalyst could be improved.

Experimental Example 22

Figure 41:
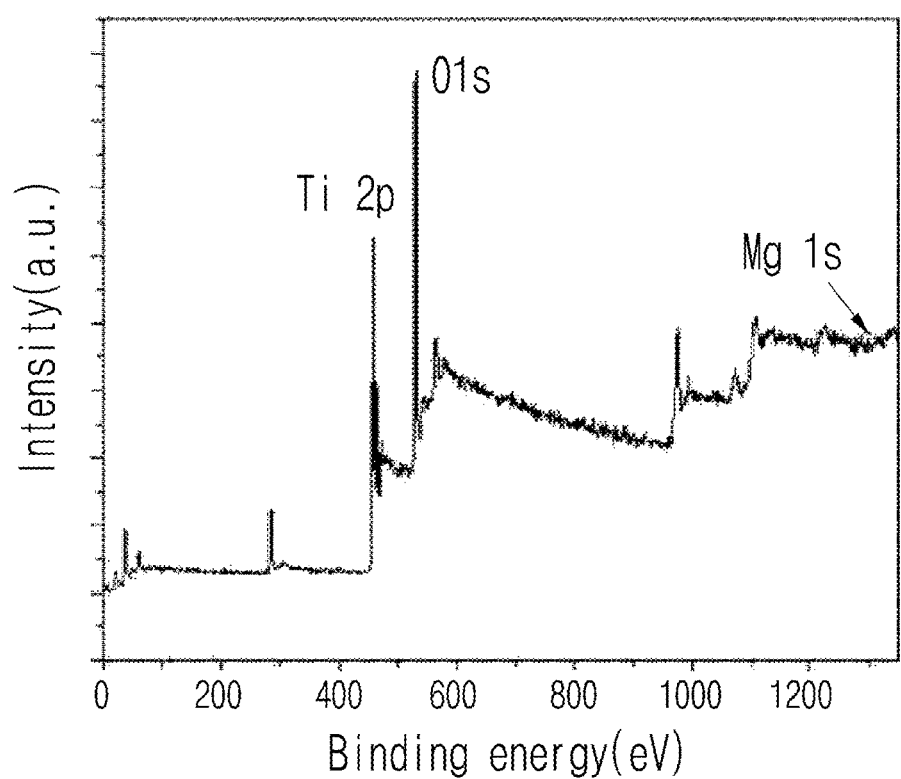
FIG. 41 is a graph illustrating the results of XPS analysis for the whole BT-0.5 (example 13).
Figure 42:
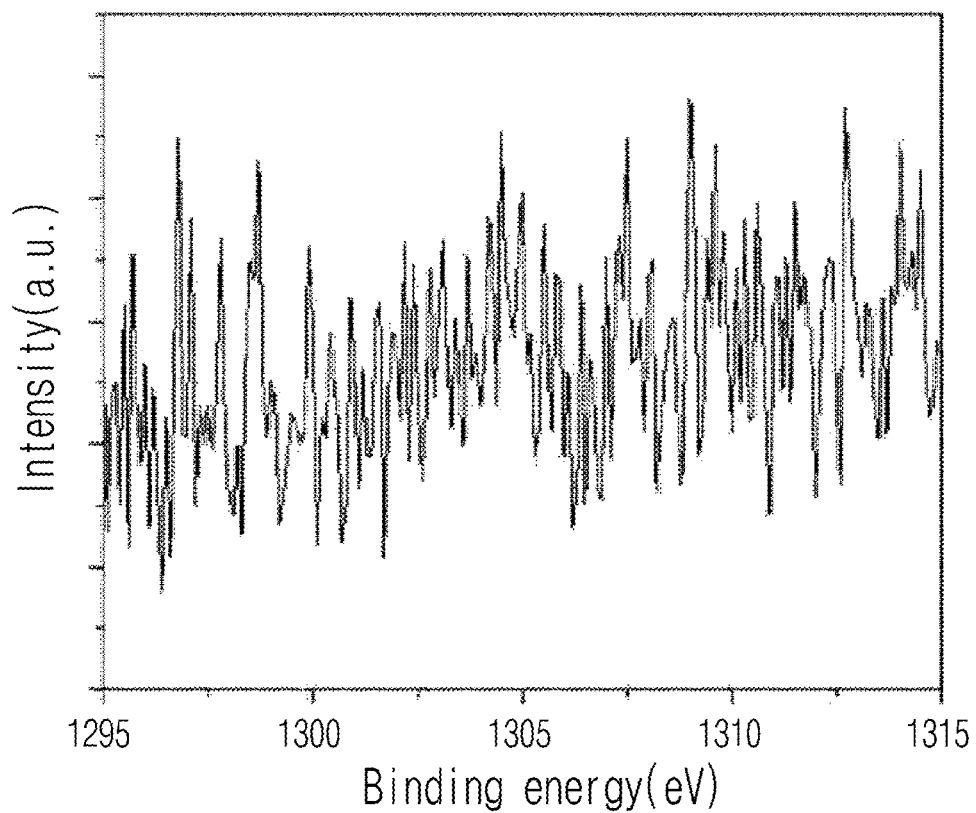
FIG. 42 is a graph illustrating the results of XPS analysis for Mg is of BT-0.5 (example 13).
Figure 43:
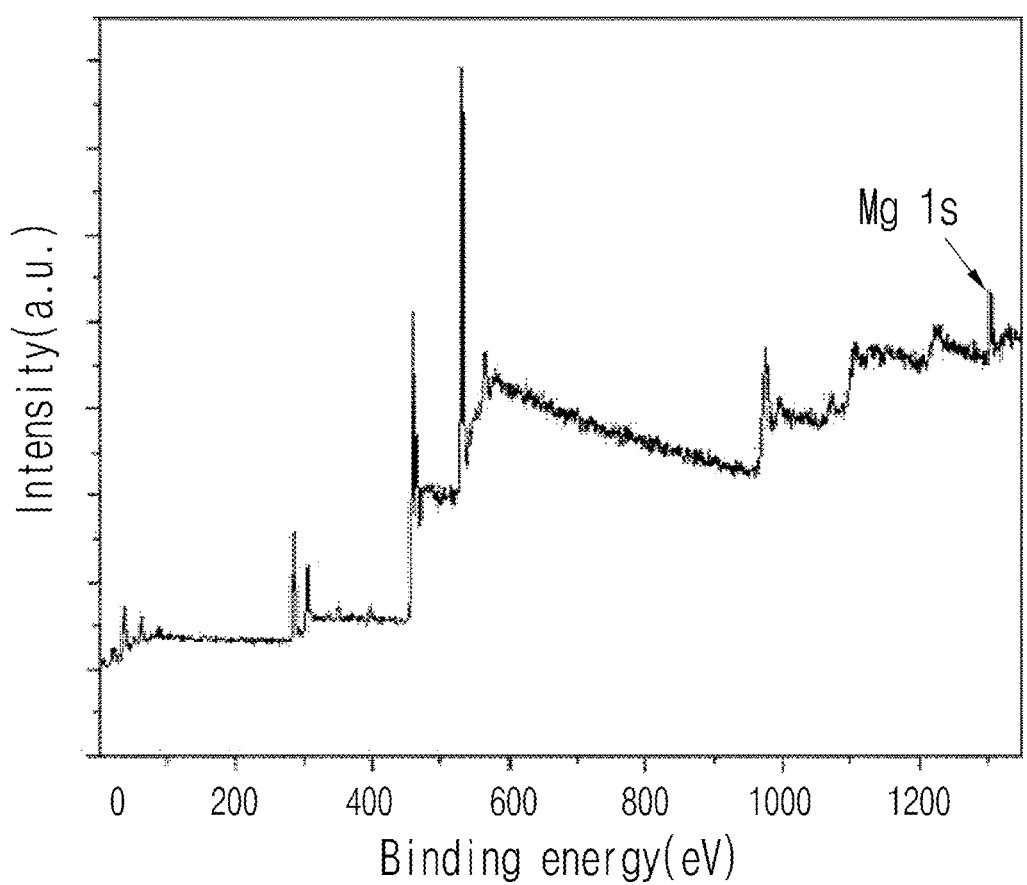
FIG. 43 is a graph illustrating the results of XPS analysis for the whole BT-1.0 (example 16).
Figure 44:
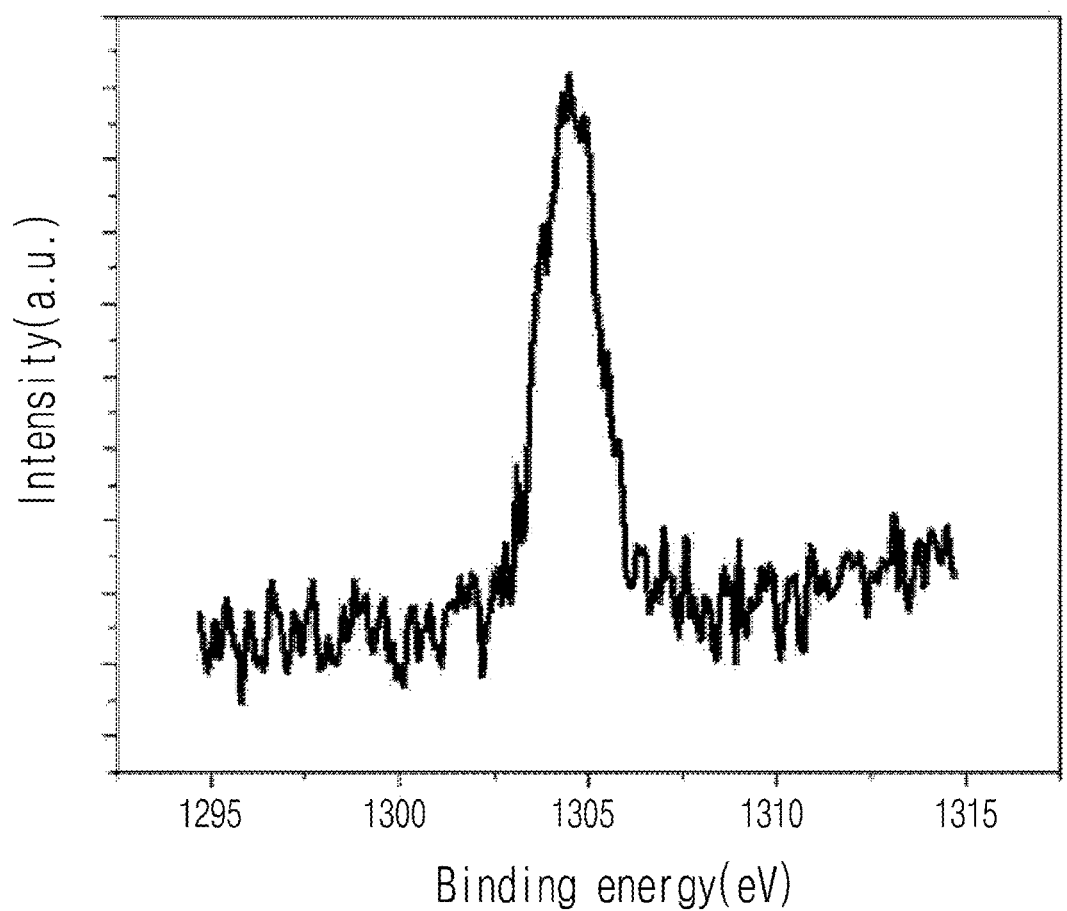
FIG. 44 is a graph illustrating the results of XPS analysis for Mg is of BT-1.0 (example 16).

FIG. 41 and FIG. 42 illustrate the results of XPS analysis for the whole BT-0.5 and Mg is of BT-0.5 (example 13). FIG. 43 and FIG. 44 illustrate the results of XPS analysis for the whole BT-1.0 and Mg is of BT-1.0 (example 16).

As shown in FIGS. 41~44, the results of XPS with BT-1.0 (example 16) confirmed that the titania structure was doped with Mg. The XPS profile of Mg is confirmed the peak (1304.5) corresponding oxygen related Mg ions. Since the ionic radius of $Mg^{2+}$ is larger than that of $Ti^{4+}$, the formation of $Mg^{2+}$-doped titania is consistent with the increase in the size of the crystal grains of BT-1.0 (example 16). Therefore, it was confirmed that as the content of Mg was increased, the size of the crystal grain was increased.

Experimental Example 23

Figure 45:
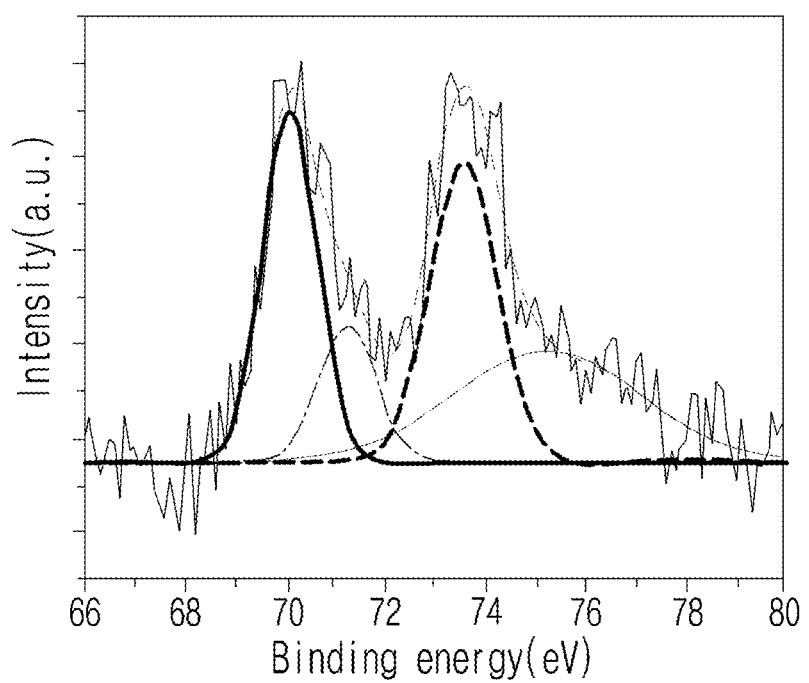
FIG. 45 is a graph illustrating the results of XPS analysis for Pt4f of BT-0.5 (example 13) after Pt deposition under ultraviolet light (UV).

FIG. 45 is a graph illustrating the results of XPS analysis for Pt4f of BT-0.5 (example 13) after Pt deposition under ultraviolet light (UV).

As shown in FIG. 45, there were three different Pts. The waveform showing spin-orbit split binding energies of 70.1 eV to 73.6 eV indicated that platinum was predominantly present in the state of metal Pt (0). The other two different waveforms were related to $Pt(II)O$ and $Pt(IV)O_2$. The number ratio of Pt to $TiO_2$ was 0.9%. When titania was separated into electrons and holes according to the bandgap energy by light, platinum played a role of generating hydrogen by reducing water by receiving electrons.

Experimental Example 24

FIGS. 46~51 illustrate high-resolution transmission electron microscope (HR-TEM) images and EDS elemental mapping.

Figure 46:
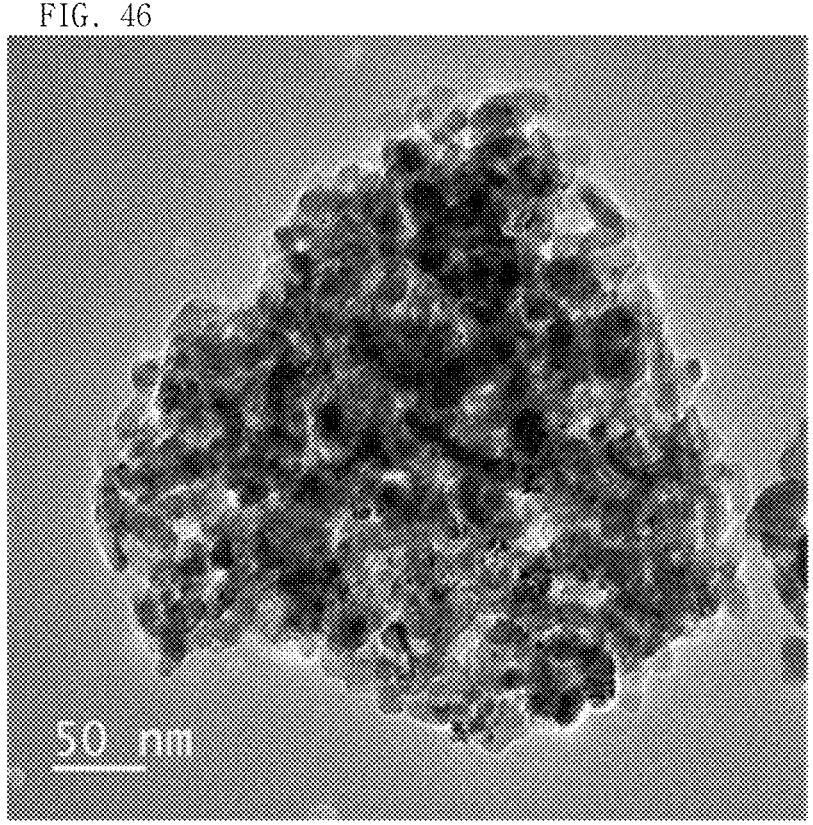
FIG. 46 and FIG. 47 illustrate high-resolution transmission electron microscope (HR-TEM) images.
Figure 47:
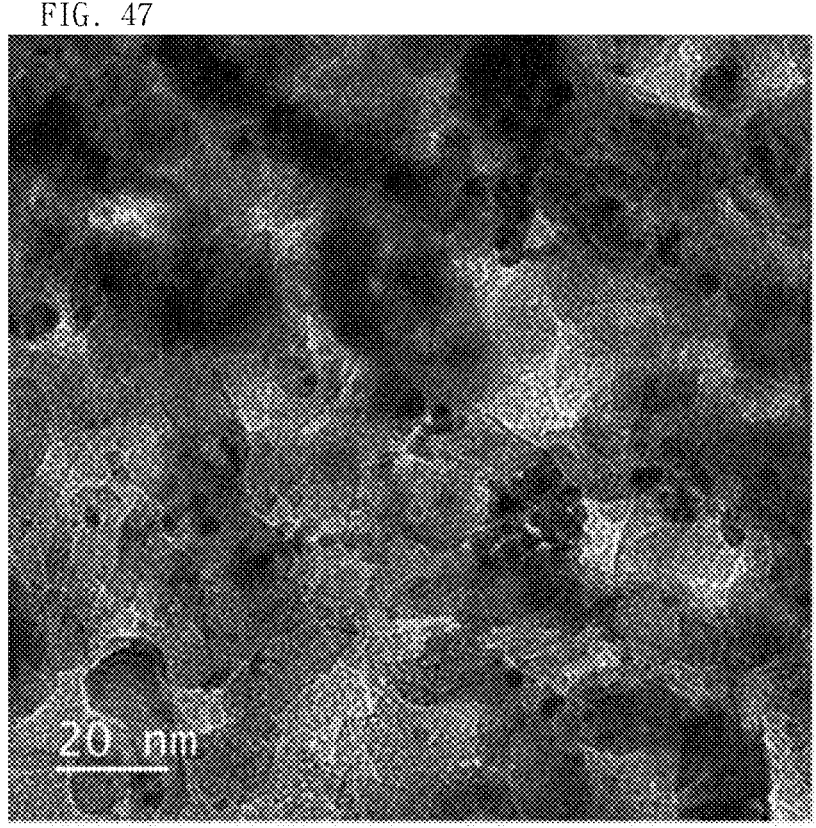
Figure 48:
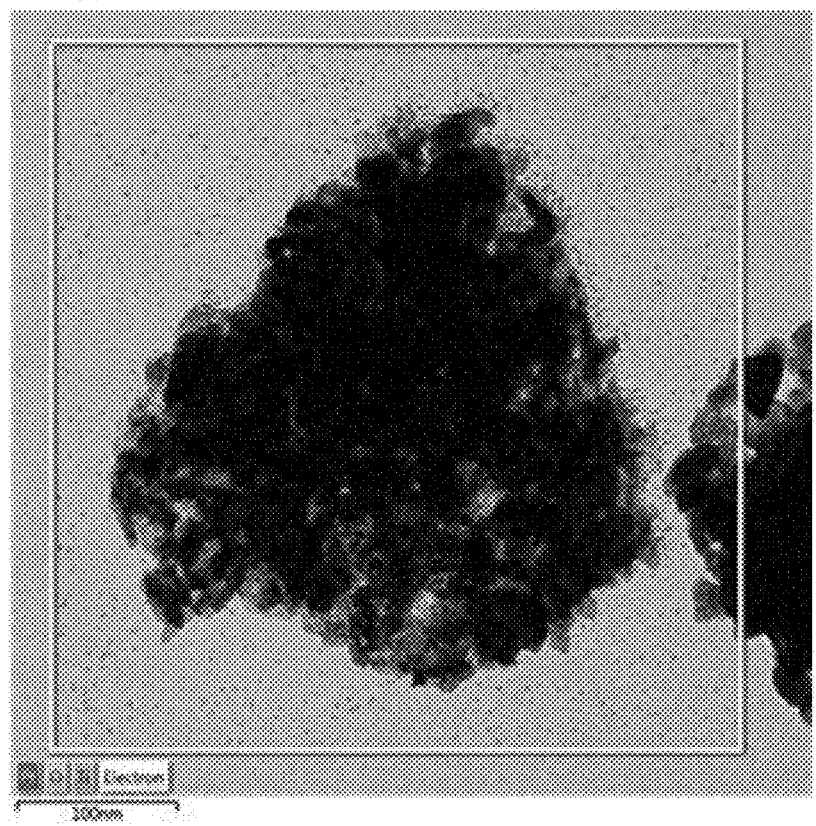
FIG. 48~FIG. 51 illustrate EDS elemental mapping.
Figure 49:
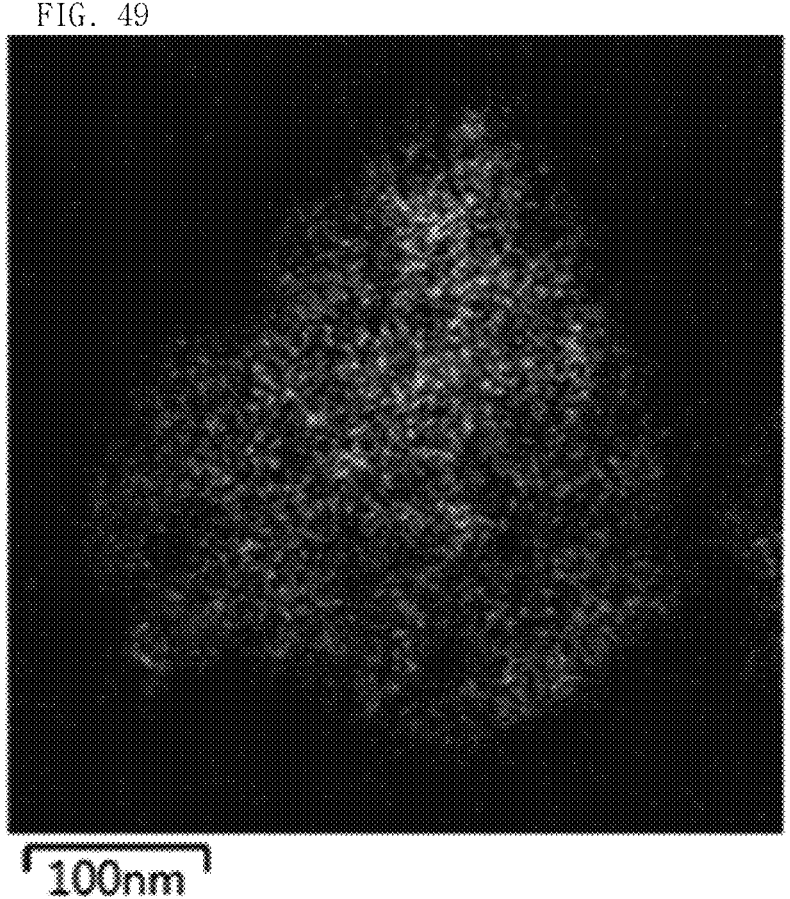
Figure 50:
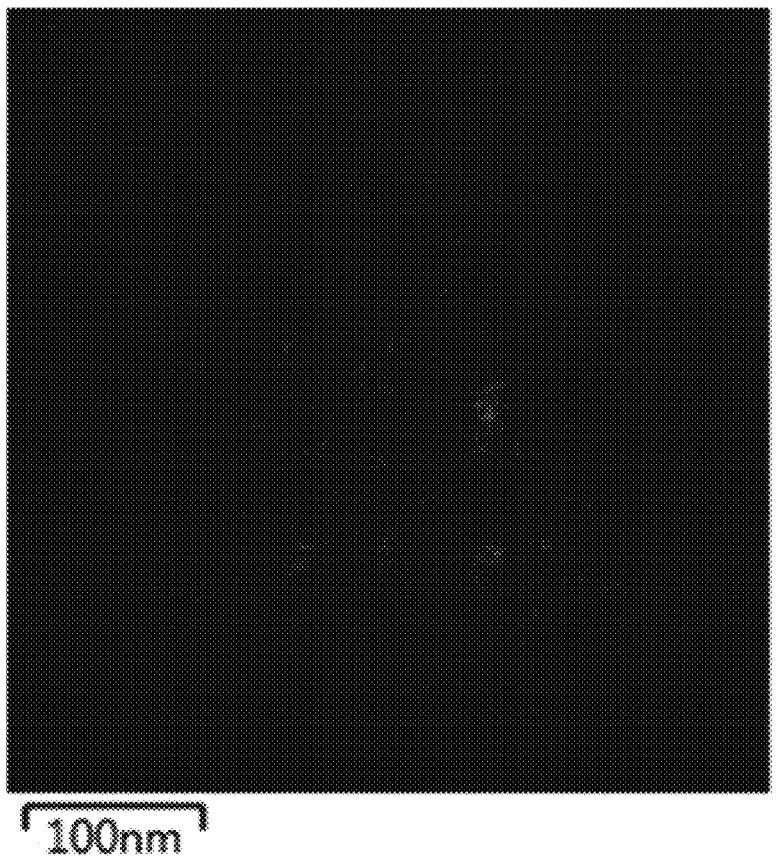
Figure 51:
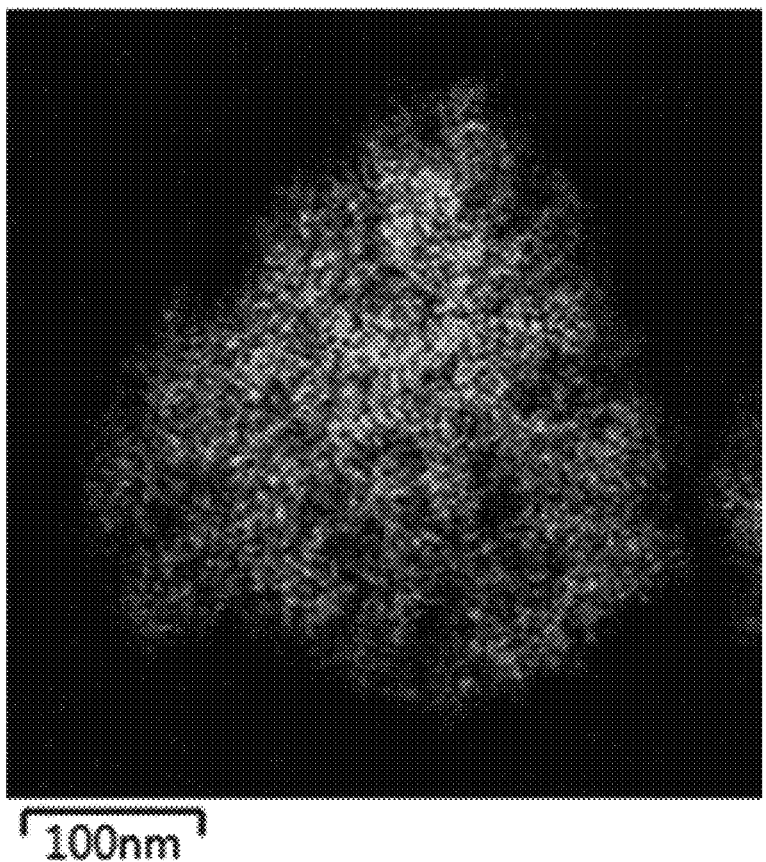

FIGS. 46 and 47 illustrate high-resolution transmission electron microscope (HR-TEM) images of the photocatalyst prepared in example 13 (BT-0.5). FIGS. 48~51 illustrate EDS elemental mapping of the photocatalyst prepared in example 13 (BT-0.5). FIG. 48 illustrates EDS images resulted from EDS mapping with all the components. FIGS. 46~51 illustrate that Pt nanoparticles (under 2 nm) were evenly coated on the surface of the photocatalyst prepared in example 13 (BT-0.5).

Experimental Example 25

Figure 52:
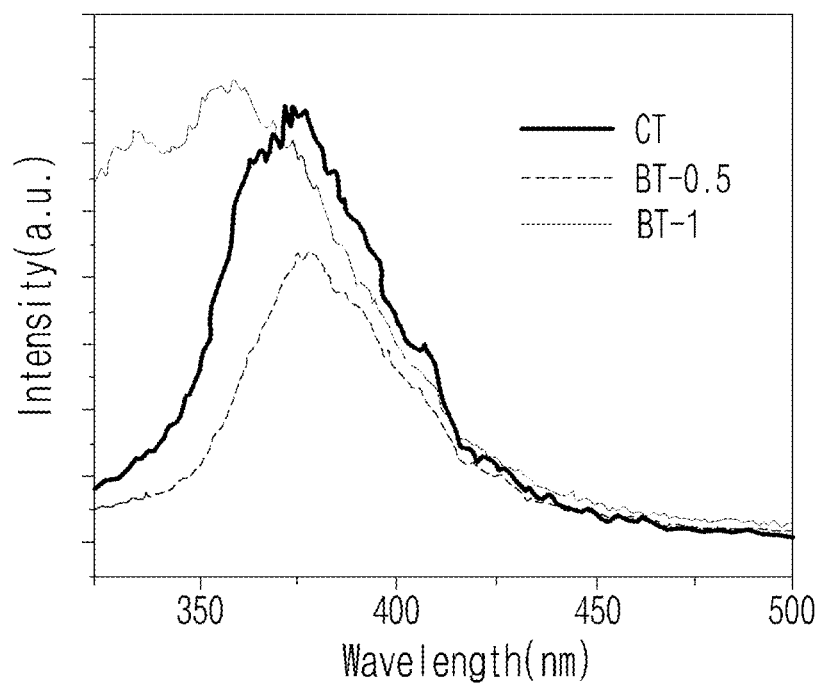
FIG. 52 is a graph illustrating the results of PL (photoluminescence).
Figure 53:
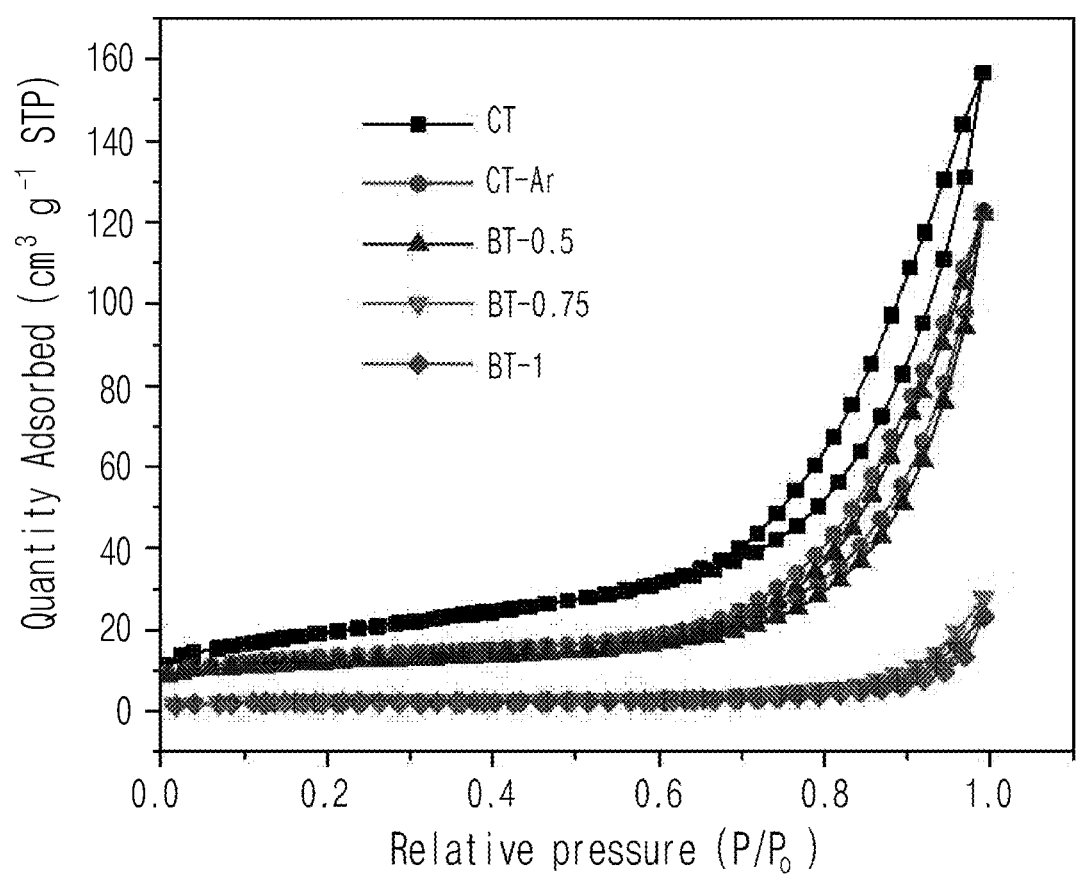
FIG. 53 is a graph illustrating the N2 adsorption/desorption isotherm. The amount of adsorption according to the applied pressure is shown.

FIG. 52 is a graph illustrating the results of PL (photoluminescence).

As shown in FIG. 52, the sample was dispersed in ethanol (1 mg/5 ml) to obtain PL spectrum. At this time, the excitation wavelength was 300 nm. Since $TiO_2$ is an indirect bandgap semiconductor, the bandgap PL is not displayed. However, a wide PL spectrum can be obtained due to recombination of the electrons collected with the balance band holes. At this time, the intensity of PL is closely related to the electron recombination. High intensity is associated with fast recombination. FIG. 52 illustrates that the electron recombination in the photocatalyst prepared in example 16 (BT-1) is faster than that in the photocatalyst prepared in example 13 (BT-0.5). These results strongly influence the photocatalyst activity

Experimental Example 26 applied pressure is a graph illustrating the N2 adsorption/desorption isotherm. The amount of adsorption according to the applied pressure is shown. To obtain the N2 adsorption/desorption isotherm, the samples of the example and the comparative example were dehydrated at 150° C. for 12 hours up to 20 mTorr, followed by degassing. Then, the surface area was measured by using Micromeritics ASAP 2460 equipped with a porosity analyzer at −196° C. The specific surface area was determined based on Brunauer-Emmett-Teller (BET) method The surface area was reduced by the treatment of Mg. The $N_2$ isotherm was changed according to the decrease of the surface area when the content of Mg was more than 0.5. The surface areas obtained from those of comparative examples 7 and 8 (CT and CT-Ar), examples 13, 15, and 16 (BT-0.5, BT-0.75, and BT-1) were respectively 69, 40, 36, 12, and 9 m2g−1. The surface areas obtained from those of comparative example 8 (CT-Ar) and example 13 (BT-0.5) were smaller than that of the photocatalyst of comparative example 7 (CT) but similar between themselves. Therefore, it was confirmed that the decrease of the surface area was attributed to the heat-treatment. The quick decrease of the surface area of the photocatalysts of example 15 (BT-0.75) and example 16 (BT-1.0) was associated with the increase of the crystal size observed in the results of XRD.

Figure 54:
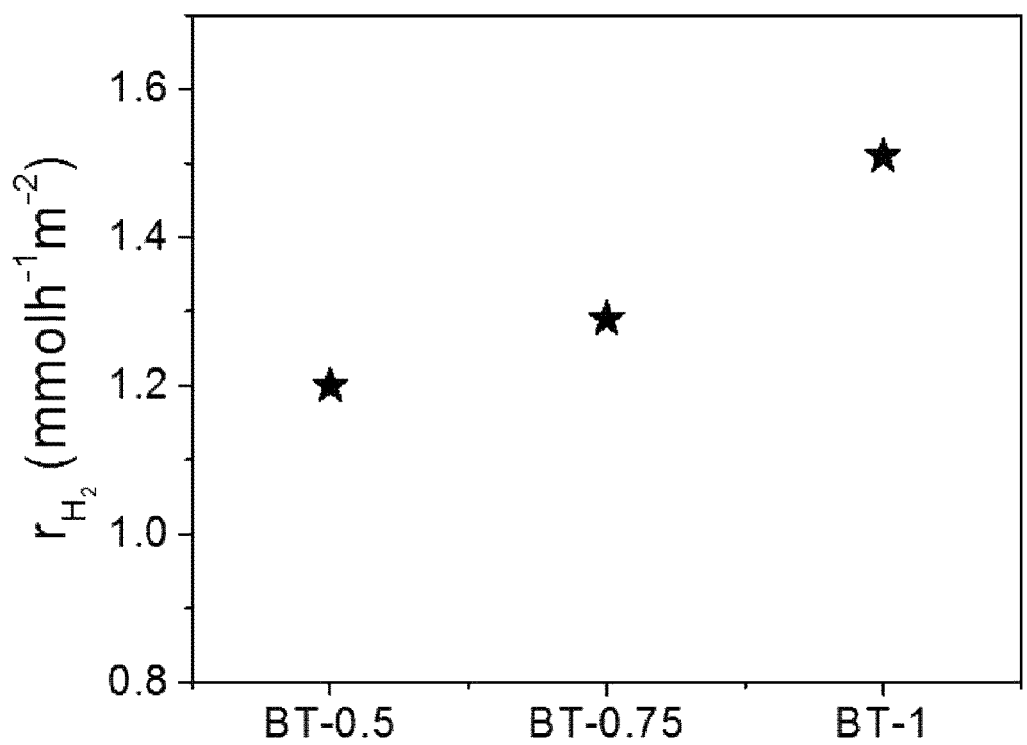
FIG. 54 illustrates the surface normalized hydrogen generation rate.

This may cause the decrease of the hydrogen generation rate. To confirm this, the rates of the surface normalized hydrogen generation of the photocatalysts of the example and the comparative example were calculated. FIG. 54 illustrates the mass and surface normalized hydrogen generation rates.

The rate of hydrogen generation is usually reported as the mass normalized hydrogen generation rate. As shown in FIG. 54, the photocatalyst of example 13 (BT-05) exhibited the hydrogen generation activity superior to the photocatalysts of examples 15 and 16 (BT-0.75 and BT-1.0). The mass normalized hydrogen generation rate (mmolh−1g−1) was divided by the specific surface areas (m2g−1) of the photocatalysts of examples and comparative examples to calculate the surface normalized hydrogen generation rate. In Table 5 below, the surface normalized hydrogen generation rates calculated thereby are presented. The surface normalized hydrogen generation rates of the photocatalysts of examples 13, 15, and 16 (BT-0.5, BT-0.75, and BT-1.0) were 1.2, 1.3, and 1.5 mmolh−1m−2 respectively. That is, the rate of the hydrogen generation per unit area of the sample was increased as the content of Mg was increased. Therefore, the reason of the decrease of the rate of the hydrogen generation per unit mass of the photocatalysts of examples 15 and 16, compared with the photocatalyst of example 13, was the decrease of the surface area. That is, it can be interpreted that the decrease of the hydrogen generation rate is caused by the decrease of the available surface area.

TABLE 5

| Sample | Mass normalized hydrogen generation rate (mmolh$^{-1}$g$^{-1}$) | Surface area (m$^2$g$^{-1}$) | Surface normalized hydrogen generation rate (mmolh$^{-1}$m$^{-2}$) |
| --- | --- | --- | --- |
| Example 13 (BT-0.5) | 43.2 | 36 | 1.2 |
| Example 15 (BT-0.75) | 15.4 | 12 | 1.3 |
| Example 16 (BT-1.0) | 13.9 | 9 | 1.5 |

As shown in Table 5, the mass normalized hydrogen generation rate of the photocatalyst of example 13 (BT-0.5) was higher than that of the photocatalyst of example 16 (BT-1.0) containing high content of Mg. So, when an equal amount of the titania photocatalyst was used, the photoactivity of the photocatalyst of example 13 (BT-0.5) was higher than that of the photocatalyst of example 16 (BT-1.0). Considering the above description, the absorbance of the photocatalyst of example 16 (BT-1.0) was higher than that of the photocatalyst of example 13 (BT-0.5) but the photoactivity was different. That is, in order to prepare the titania photocatalyst having excellent absorbance and photoactivity, the regulation of Mg content is necessary. When Mg is included at the molar ratio of 0.3~0.6 to $TiO_2$, the most excellent photoactivity could be expected.

Experimental Example 27

FIG. 54 and Table 5 illustrate the gradual increase of the surface normalized hydrogen generation rate according to the increase of Mg content. Even though various factors are involved in water splitting by the photocatalyst in a semiconductor crystal system, high Mg content causes the decrease of hydrogen generation by reducing the surface area, confirmed in example 15 and example 16 (BT-0.75 and BT-1.0). A material having a large surface area can provide more active regions to improve the overall catalytic activity and can also increase the activity by increasing the dispersity of Pt nanoparticles.

Experimental Example 28

Figure 55:
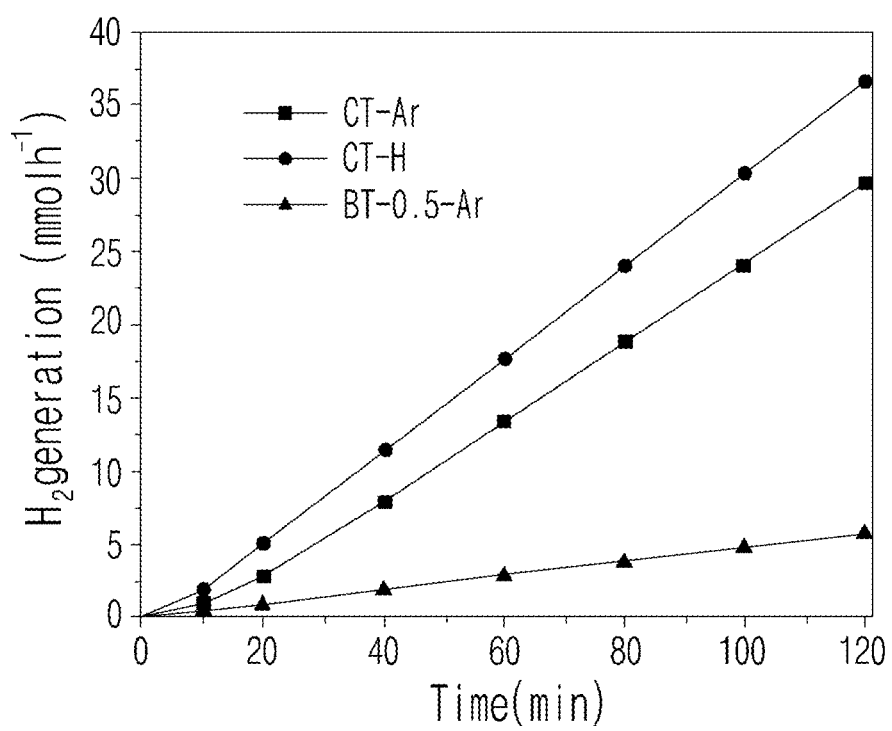
FIG. 55 illustrates the hydrogen generation profiles of CT-Ar (comparative example 8), CT-H (comparative example 9), and BT-0.5-Ar (comparative example 10).
Figure 56:
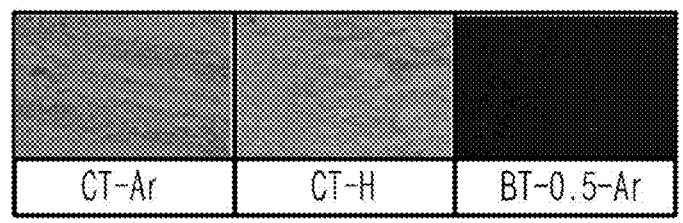
FIG. 56 illustrates the surface colors of comparative examples 8~10.

FIG. 55 illustrates the hydrogen generation profiles of the photocatalysts of comparative example 8 (CT-Ar), comparative example 9 (CT-H), and comparative example 10 (BT-0.5-Ar). FIG. 56 illustrates the surface colors of the photocatalysts of comparative examples 8~10.

The hydrogen generation rates of the photocatalysts of comparative examples 8, 9, and 10 (CT-Ar, CT-H, and BT-0.5-Ar) were 15.2, 18.5, and 3 mmolh−1g−1 respectively. The fast increase of the hydrogen generation rate of the photocatalyst of comparative example 9 (CT-H), compared with comparative example 8 (CT-Ar), might be because of the hydrogen in a nano $TiO_2$ material. However, the hydrogenation effect was very limited, and the colors of the photocatalysts of comparative examples 8 and 9 were still bright. This result indicates that the excellent photocatalytic activity of the photocatalyst of example 13 (BT-0.5) was not attributed to the light $H_2$. On the other hand, the color of the photocatalyst of comparative example 10 (BT-0.5-Ar) was dark and the photocatalytic activity thereof was very poor. This result could be related to the result of example 16 (BT-1.0) showing the black surface color. That is, Mg and $H_2$ worked together to make synergy effect to improve photocatalytic activity. As shown in FIGS. 55 and 56, the absorbances of the photocatalysts of comparative examples 8 and 9 (CT-Ar and CT-H) that did not contain Mg were poor. The photocatalyst of comparative example 10

(BT-0.5-Ar), which contained Mg but was heat-treated under Ar atmosphere without hydrogen, had worse optical activity.

Experimental Example 29

Figure 57:
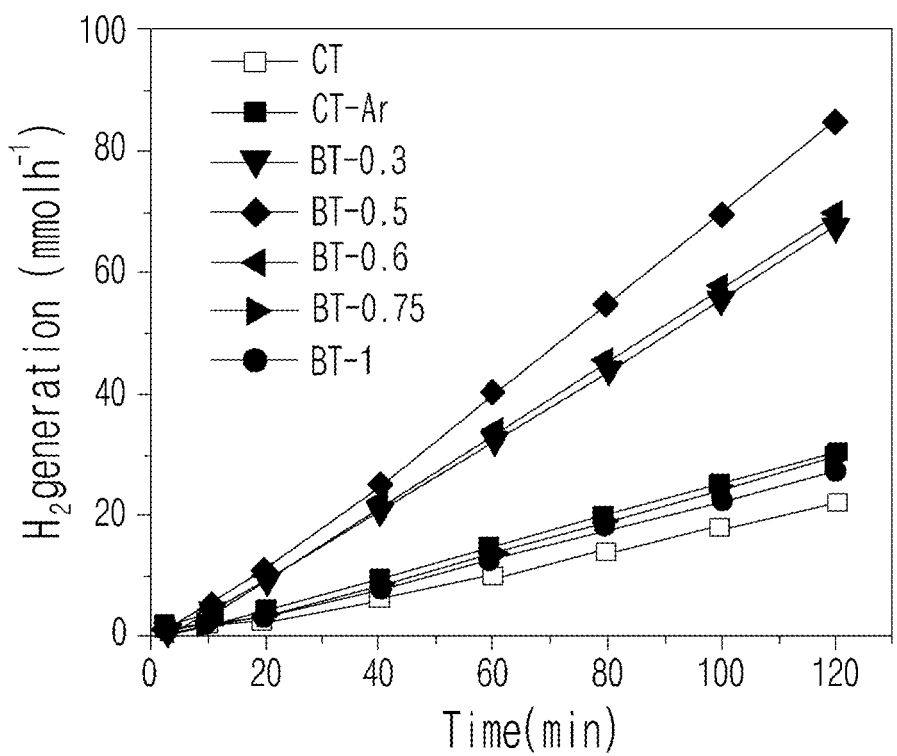
FIG. 57 and FIG. 58 illustrate the amount of hydrogen generation and the rate of hydrogen generation under sunlight wavelength.
Figure 58:
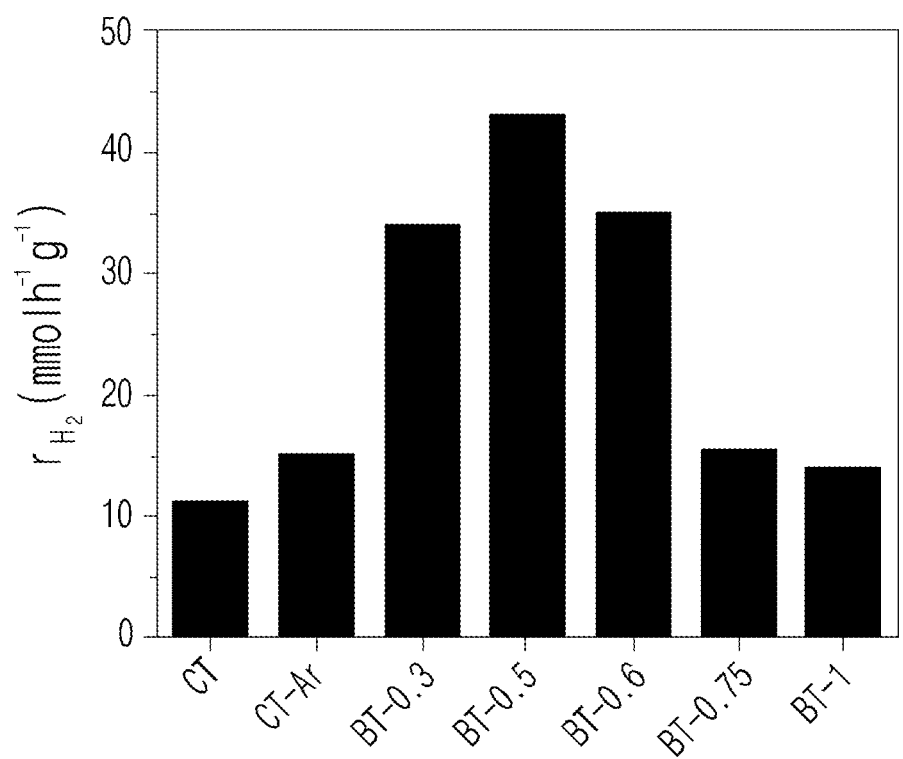
Figure 59:
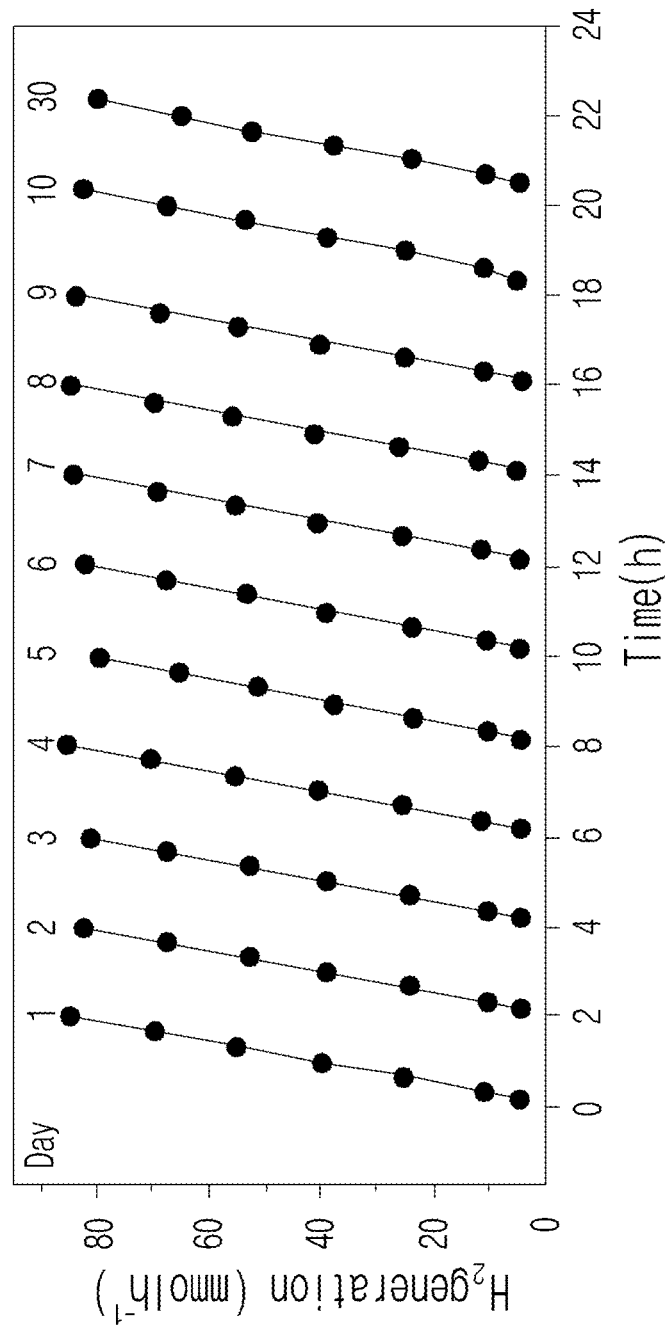
FIG. 59 illustrates the amount of hydrogen generation of BT-0.5 (example 13) under sunlight wavelength.
Figure 60:
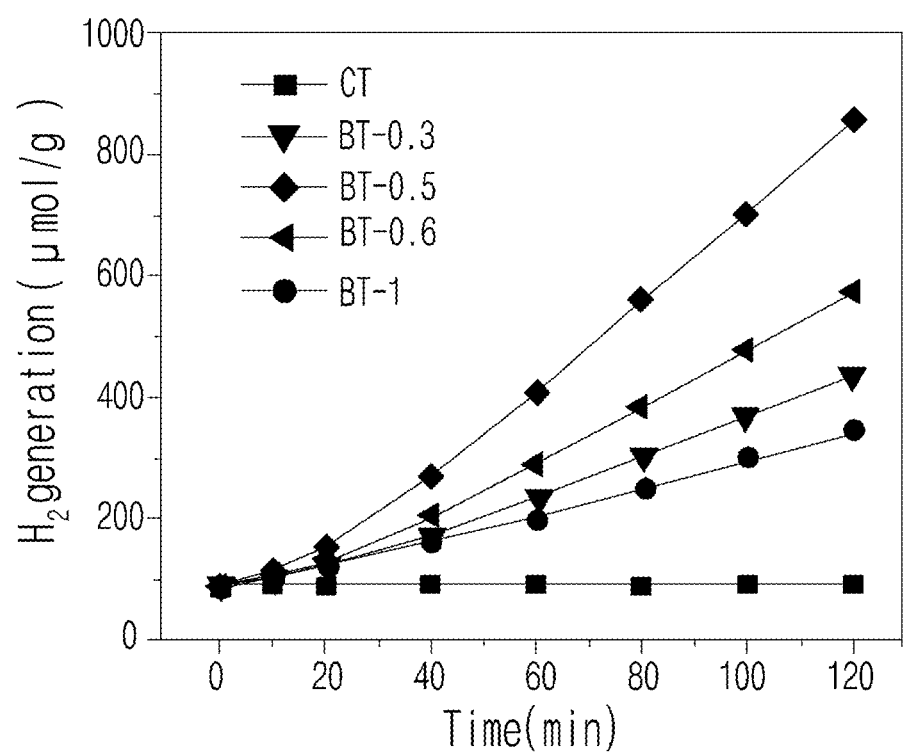
FIG. 60 and FIG. 61 illustrate the amount of hydrogen generation and the rate of hydrogen generation under visible light.
Figure 61:
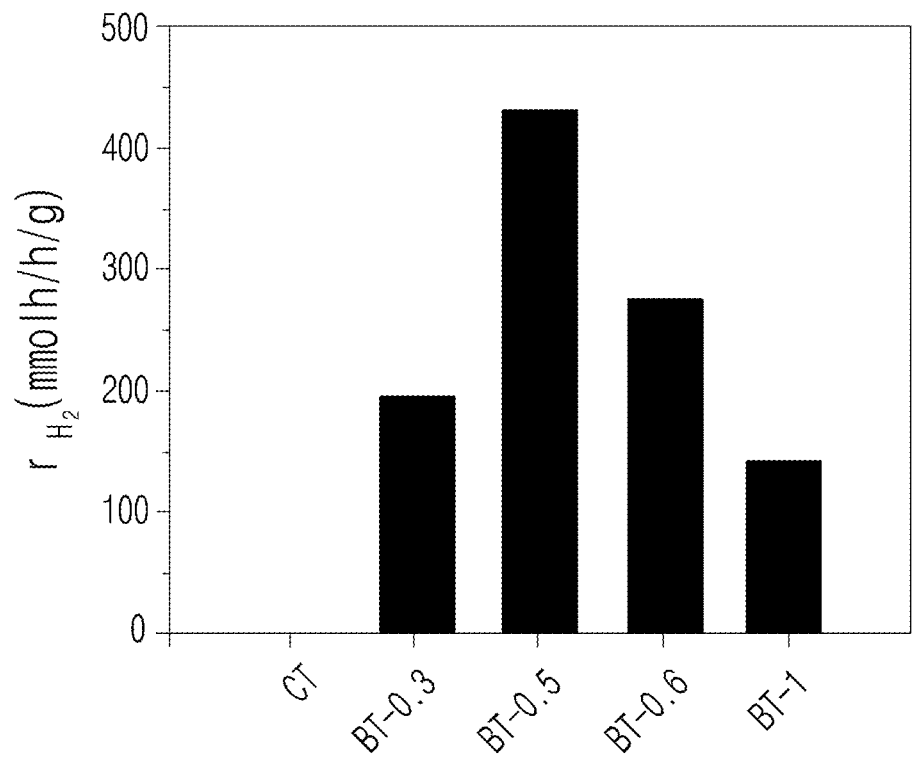

FIGS. 57 and 58 illustrate the hydrogen generation amount and the generation rate at the solar wavelength. FIG. 59 illustrates the hydrogen generation amount by the photocatalyst of example 13 (BT-0.5) at the solar wavelength. FIGS. 60 and 61 illustrate the hydrogen generation amount and the generation rate at the visible light.

FIG. 57 and FIG. 58 illustrate the hydrogen generation over the time after the irradiation with the entire wavelength of sunlight. As shown in FIGS. 57 and 58, the photocatalysts of example 12 (BT-0.3), example 13 (BT-0.5), and example 14 (BT-0.6) showed the high hydrogen generation. In particular, the photocatalyst of example 13 (BT-0.5) showed the highest hydrogen production.

FIG. 59 illustrates the time-dependent hydrogen generation by the photocatalyst of example 13 (BT-0.5) induced by the repeated irradiation with the entire wavelength of sunlight for 30 days. As shown in FIG. 59, the hydrogen generation amount was constant even though the entire wavelength of sunlight was continuously irradiated for 30 days. Therefore, the photocatalyst of example 13 (BT-0.5) was confirmed to have a stable photocatalytic activity.

FIG. 60 and FIG. 61 illustrate the time-dependent hydrogen generation according to the irradiation of the wavelength of visible light. As shown in FIGS. 60 and 61, the photocatalysts of example 12 (BT-0.3), example 13 (BT-0.5), and example 14 (BT-0.6) showed the high hydrogen generation. In particular, the photocatalyst of example 13 (BT-0.5) showed the highest hydrogen production. In the meantime, the commercial $TiO_2$ of comparative example 7 (CT) hardly generated H2, relatively.

Therefore, as shown in FIGS. 57~61, it was confirmed that the black titanias prepared according to examples of the present invention had a high photocatalytic activity not only in the entire wavelength of sunlight but also in the wavelength of visible light.

As described hereinbefore, as the amount of Mg was increased in the course of reduction, the color of the titania photocatalyst became darker and the absorbance in the visible light region was increased. However, the hydrogen production activity by water splitting of the photocatalyst of example 13 (BT-0.5) was higher than that of the photocatalyst of example 16 (BT-1.0) which showed the highest visible light absorbance.

The results above indicate that once the titania is excessively reduced, the absorption of visible light is greatly improved but the recombination site is also generated in proportion to that, so that the hydrogen generation activity is rather decreased. Therefore, when Mg is used for the heat-reduction inducement of $TiO_2$ under the condition of $H_2$/Ar, bandgap size, surface detect site, and oxygen vacancy site can be systematically regulated and accordingly a titania photocatalyst with an optimum condition can be prepared.

Experimental Example 30 Comparison of Color

To compare the colors between the black zirconia ($ZrO_{2-x}$) prepared in the present invention and the conventional zirconia ($ZrO_2$), the black zirconias ($ZrO_{2-x}$) prepared in examples 17~19 and the zirconia ($ZrO_2$) of comparative example 11 were observed by the naked eye. The results are shown in FIG. 62.

As shown in FIG. 62, the conventional zirconia ($ZrO_2$) of comparative example 11 was white, while the black zirconias ($ZrO_{2-x}$) prepared in examples 17~21 were dark gray or black. The black zirconia ($ZrO_{2-x}$) of example 17 was darker than that of example 18 and the black zirconia ($ZrO_{2-x}$) of example 19 was darker than that of example 17.

Therefore, it was confirmed that the black zirconia ($ZrO_{2-x}$) prepared above had a black-based color, unlike the conventional zirconia ($ZrO_2$). At this time, the higher the magnesium content, the darker the black color. The dark color means the high absorbance of visible light. So, as the content of Mg was increased, the absorbance of visible light was also increased.

Experimental Example 31 X-Ray Diffraction Analysis (1)—Phase Analysis

To compare the phases between the black zirconia ($ZrO_{2-x}$) prepared according to the present invention and the conventional zirconia ($ZrO_2$), the following experiment was performed with the zirconia ($ZrO_2$) of comparative example 11 and the black zirconias ($ZrO_{2-x}$) prepared in example 17 and example 20.

First, in order to compare the phases between the conventional zirconia ($ZrO_2$) and the black zirconia ($ZrO_{2-x}$) of the present invention, the black zirconia ($ZrO_{2-x}$) prepared in example 17 and the zirconia ($ZrO_2$) of comparative example 11 were analyzed by XRD. To investigate the phases before and after the acid treatment, the zirconias ($ZrO_{2-x}$) prepared in examples 17 and 20 were analyzed by XRD.

At this time, XRD was performed using Cu-Kα (0.15406 nm) at 40 kV and 30 mA at the scanning speed of 4° min−1. The results are shown in FIG. 63.

Figure 63:
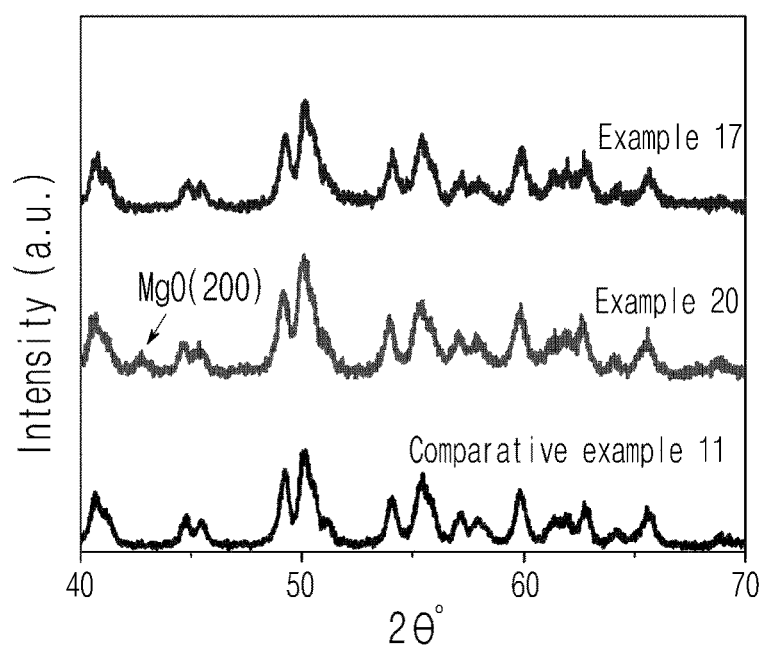
FIG. 63 is a graph illustrating the results of XRD with the zirconias prepared in the comparative example and the example of the present invention.

As shown in FIG. 63, the zirconias of comparative example 11 and example 17 showed the same phase.

Therefore, the black zirconia ($ZrO_{2-x}$) prepared according to the preparation method of the present invention was confirmed to have the same phase as the conventional zirconia ($ZrO_2$).

In the meantime, magnesium oxide (MgO) was detected in the black zirconia ($ZrO_{2-x}$) prepared in example 20 without stirring in HCl solution for 24 hours. However, magnesium oxide (MgO) was not detected in the black zirconia ($ZrO_{2-x}$) prepared in example 17.

The results above indicate that once magnesium oxide (MgO) was generated in example 17 and example 20 after the heat-treatment of the mixture comprising zirconia ($ZrO_2$) and magnesium (Mg), the generated magnesium oxide (MgO) was eliminated by dipping the mixture in HCl solution after the heat-treatment in example 17. However, in example 20, the step of treating HCl was not performed so that magnesium oxide (MgO) was not eliminated.

So, it was suggested that magnesium (Mg) was oxidized and zirconia ($ZrO_2$) was reduced during the heat-treatment, resulting in the preparation of the black zirconia ($ZrO_{2-x}$) having oxygen vacancy.

Experimental Example 32 X-Ray Diffraction Analysis (2)—Analysis of Crystallite Size To compare the phases between the black zirconia ($ZrO_{2-x}$) prepared according to the present invention and the conventional zirconia ($ZrO_2$), the following experiment was performed with the black zirconia (ZrO$_{2-x}$) prepared in example 17 and the zirconia (ZrO$_2$) of comparative example 11.

The crystallite size was calculated from the XRD results obtained in experimental example 31 using the Scherrer equation of formula 3.

$$D_p = \frac{0.94\lambda}{\beta_{1/2}\cos\theta} \qquad \text{<Formula 3>}$$

Dp: Average crystallite size
β: Line broadening in radians
θ: Bragg angle
λ: Wavelength of X-ray

TABLE 6

|  | Comparative Example 11 | Example 17 |
| --- | --- | --- |
| 2θ | 28.08 | 28.01 |
| Width | 0.423 | 0.436 |
| Average crystallite size | 20.23 nm | 19.6 nm |

As shown in Table 6, the crystallite size was similar between the zirconias prepared in example 17 and comparative example 11.

In the meantime, the results of experimental example 31 and experimental example 32 confirmed that the black zirconia (ZrO$_{2-x}$) prepared according to the preparation method of the present invention was the kind that had the same phase and the same crystallite size as the conventional white zirconia (ZrO$_2$)

Experimental Example 33 Raman Spectroscopy

The following experiment was performed to compare the surface condition between the black zirconia (ZrO$_{2-x}$) prepared according to the present invention and the conventional zirconia (ZrO$_2$).

The surface of the black zirconia (ZrO$_{2-x}$) prepared in example 17 and the zirconia (ZrO$_2$) of comparative example 11 was analyzed by Raman spectroscopy with the wavelength of 532 nm. The results are shown in FIG. 64.

Figure 64:
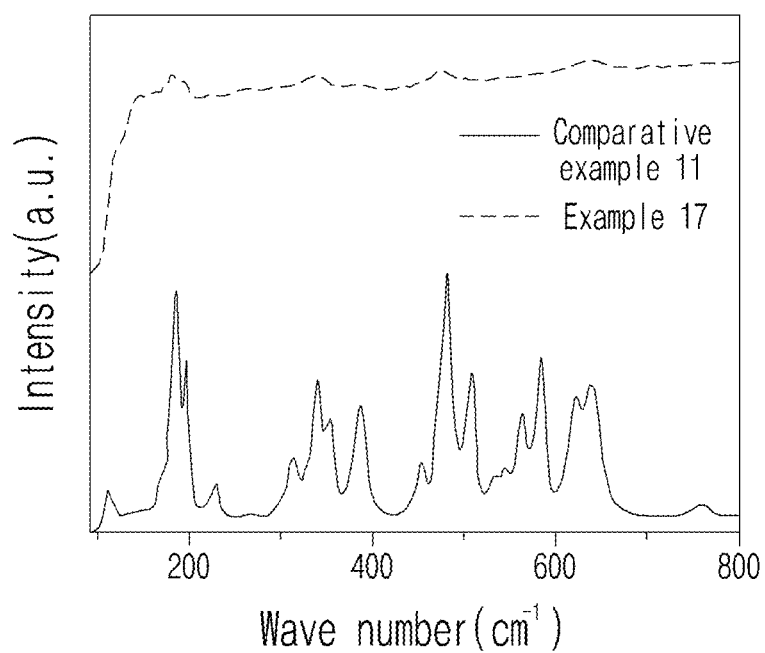
FIG. 64 is a graph illustrating the results of Raman spectroscopy with the zirconias prepared in the comparative example and the example of the present invention.

As shown in FIG. 64, Raman spectroscopy is an analytical method that shows the difference in the characteristics and shape of a material by Raman scattering which occurs when it is irradiated with certain energy, and is an useful analytical method to examine atomic defects on the surface.

Even though the zirconia (ZrO$_{2-x}$) prepared in example 17 had the same phase as the zirconia (ZrO$_2$) of comparative example 11, the black zirconia (ZrO$_{2-x}$) did not show Raman peak, suggesting that the black zirconia (ZrO$_{2-x}$) had a surface detect. This result suggested that the black zirconia (ZrO$_{2-x}$) reduced from the zirconia (ZrO$_2$) had oxygen vacancy, because of which Raman peak was not observed.

Experimental Example 34 High-Resolution Transmission Electron Microscope (HR-TEM) Analysis The following experiment was performed to investigate the surface condition of the black zirconia (ZrO$_{2-x}$) prepared according to the preparation method of the present invention.

The surface of the black zirconia (ZrO$_{2-x}$) prepared in example 17 was analyzed by using high-resolution transmission electron microscope (HR-TEM). The results are shown in FIGS. 65 and 66.

Figure 65:
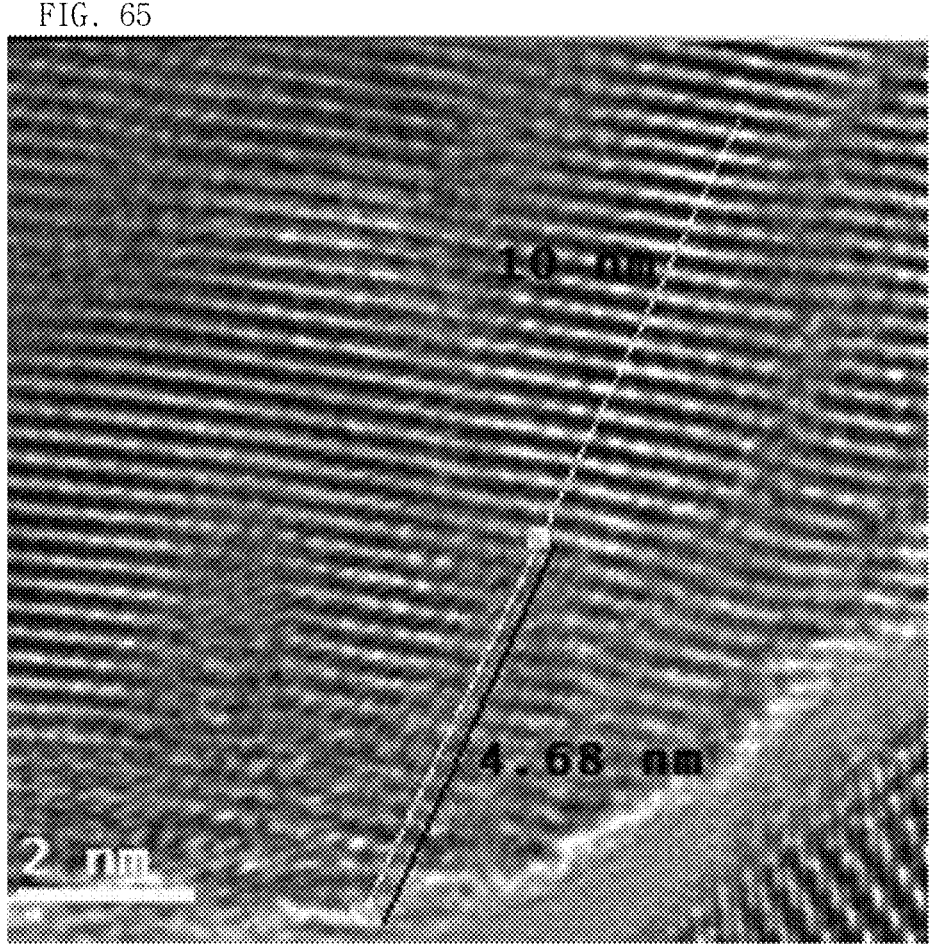
FIG. 65 is a high-resolution transmission electron microscope (HR-TEM) photograph illustrating the zirconia prepared in the example of the present invention.

FIG. 65 is a high-resolution transmission electron microscope (HR-TEM) image of the black zirconia (ZrO$_{2-x}$) prepared in example 17. FIG. 66 is a histogram presenting the contrast of the image above. At this time, the high-resolution transmission electron microscope (HR-TEM) image was obtained by using JEOL FE-2010 operating at 200 kV.

Figure 66:
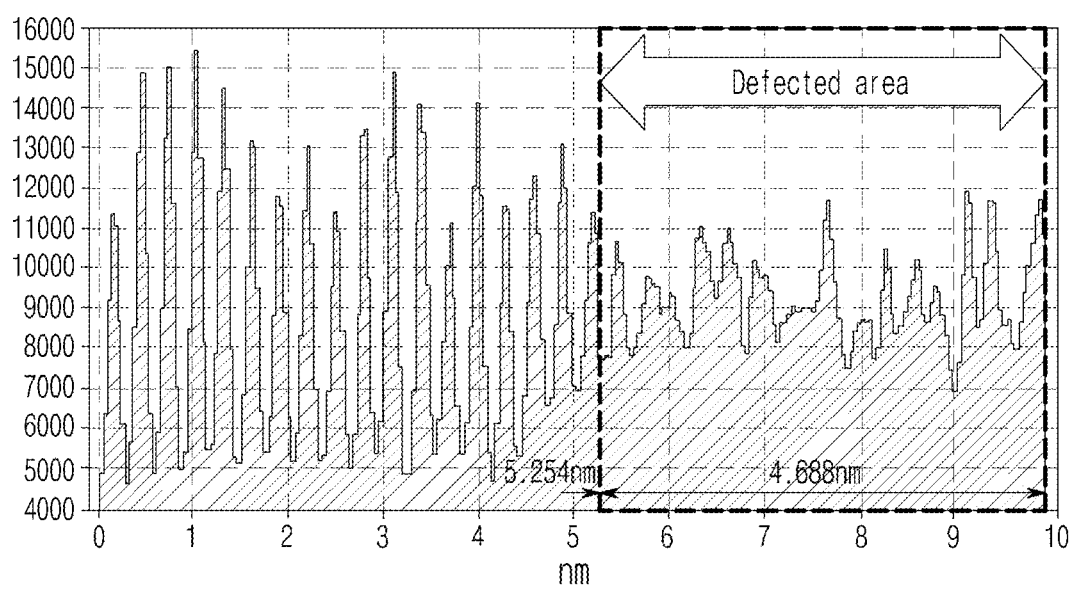
FIG. 66 is a histogram graph illustrating the high-resolution transmission electron microscope (HR-TEM) image presenting the degree of defect of the zirconia prepared in the example of the present invention.

As shown in FIGS. 65 and 66, the surface detect was observed in the black zirconia (ZrO$_{2-x}$) prepared in example 17, which seemed because of the oxygen vacancy generated by the reduction of zirconia (ZrO$_2$) in the course of the preparation of the black zirconia (ZrO$_{2-x}$)

Experimental Example 35 X-Ray Photoelectron Spectroscopy (XPS) (1)

The following experiment was performed to compare the oxygen atom binding energy on the surface between the black zirconia (ZrO$_{2-x}$) prepared according to the present invention and the conventional zirconia (ZrO$_2$).

Figure 67:
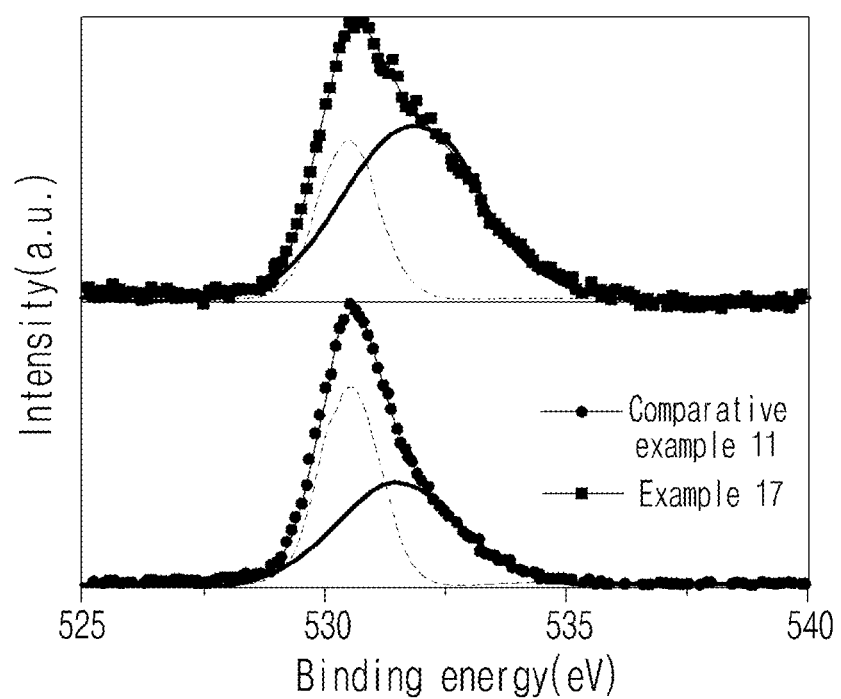
FIG. 67 is a graph illustrating the results of X-ray photoelectron spectroscopy (XPS) performed with the zirconias prepared in the comparative example and the example of the present invention.

The oxygen atom is binding energy was compared between the black zirconia (ZrO$_{2-x}$) prepared in example 17 and the conventional zirconia (ZrO$_2$) of comparative example 11 by X-ray photoelectron spectroscopy (XPS). The results are shown in FIG. 67. The results of calculation of the ratio of oxygen and oxygen vacancy are shown in Table 7 below. At this time, for the X-ray photoelectron spectroscopy (XPS), ESCALAB 250 XPS system using Al Kα (150 W) source was used.

TABLE 7

|  | Oxygen atom peak area | Oxygen vacancy Peak area | Oxygen vacancy rate (%) |
| --- | --- | --- | --- |
| Comparative Example 11 | 1.45 | 1.11 | 43 |
| Example 17 | 0.87 | 2.09 | 71 |

As shown in FIG. 67, the oxygen atom is binding energy spectrum is divided by the oxygen atom binding energy of 530.5 eV and the oxygen vacancy binding energy of 531.9 eV. The black zirconia (ZrO$_{2-x}$) prepared in example 17 had more oxygen vacancies than the conventional zirconia (ZrO$_2$) of comparative example 11. The oxygen vacancy rate was obtained from the width of the graph. As shown in Table 7, the black zirconia (ZrO$_{2-x}$) prepared in example 17 had more oxygen vacancies (71%) than the zirconia (ZrO$_2$) of comparative example 11 (43%).

The oxygen vacancy was generated in the course of reduction of zirconia. Therefore, the black zirconia (ZrO$_{2-x}$) prepared according to the present invention is the kind of reduced ZrO$_2$, that is the kind of reduced ZrO$_2$ having multiple numbers of oxygen vacancies on the surface.

Experimental Example 36 Thermogravimetric Analysis (TGA)

The following experiment was performed to confirm the oxygen deficiency state of the black zirconia prepared according to the present invention.

Weight changes were compared between the black zirconia prepared in example 17 and the zirconia of comparative example 11. The weights were measured by using a thermographic analyzer with raising temperature from 0° C. to 700° C. under $O_2$ atmosphere. The results are shown in FIG. 68.

Figure 68:
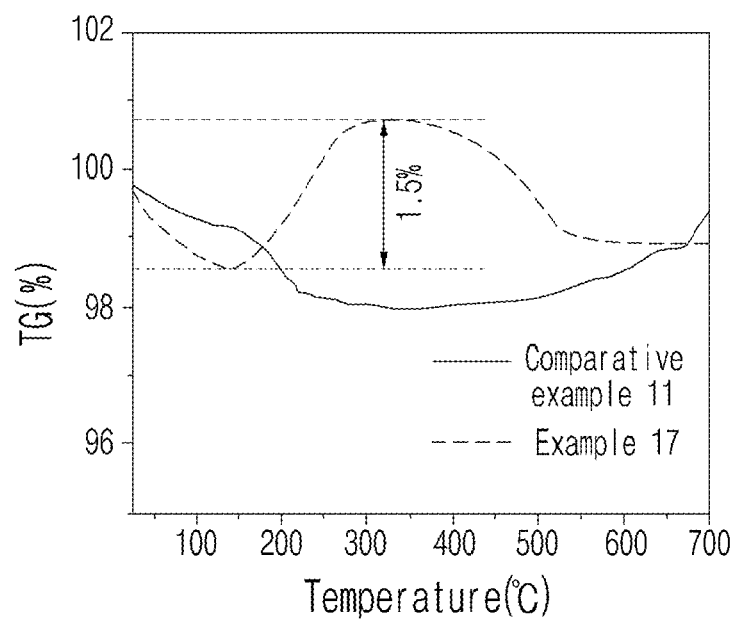
FIG. 68 is a graph illustrating the results of thermogravimetric analysis (TGA) performed with the zirconias prepared in the comparative example and the example of the present invention.

As shown in FIG. 68, the zirconia of comparative example 11 did not show the weight changes during the temperature raising process, while the black zirconia prepared in example 17 showed the weight changes from the temperature of 150° C. This result was attributed to the oxygen absorption of the black zirconia ($ZrO_{2-x}$) in the course of raising temperature. Therefore, it was confirmed that the black zirconia ($ZrO_{2-x}$) existed in an oxygen deficient state.

Experimental Example 37 X-Ray Photoelectron Spectroscopy (XPS) (2)

The following experiment was performed to investigate the presence of magnesium (Mg) in the black zirconia prepared according to the present invention and to compare the components between the black zirconia and the conventional zirconia.

Figure 69:
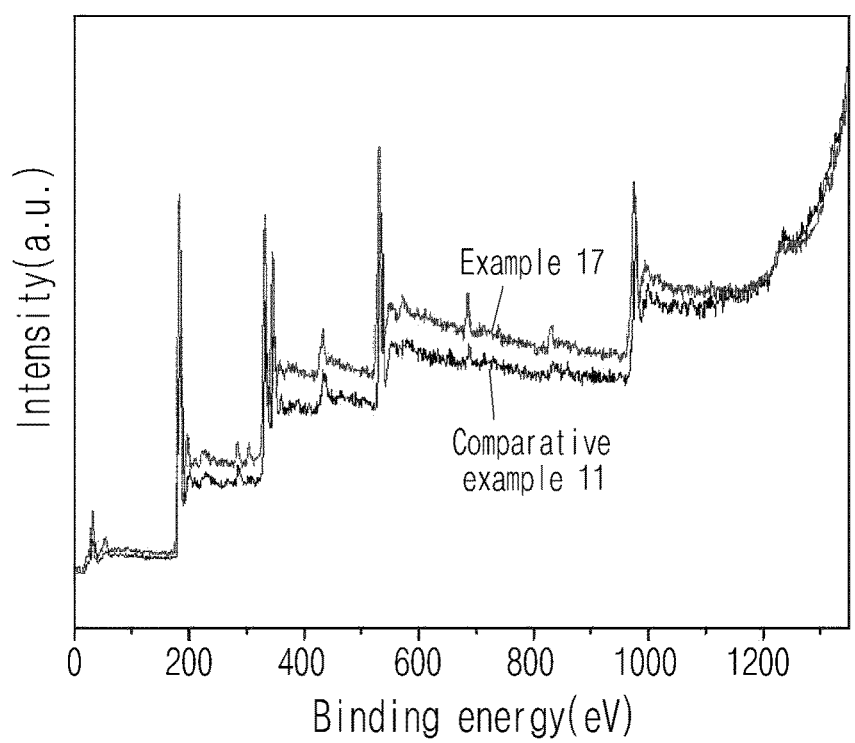
FIG. 69 is a graph illustrating the results of X-ray photoelectron spectroscopy (XPS) performed with the zirconias prepared in the comparative example and the example of the present invention in the entire energy range of 0~1200 eV.
Figure 70:
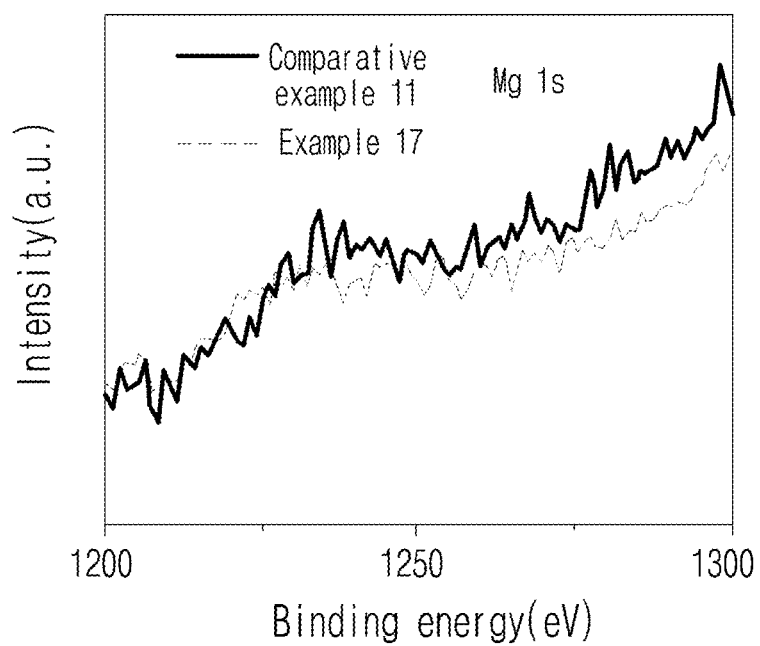
FIG. 70 is a graph illustrating the results of X-ray photoelectron spectroscopy (XPS) performed with the zirconias prepared in the comparative example and the example of the present invention in the energy range of magnesium 1 s.

The signal at 0~1200 eV and the signal corresponding to Mg is binding energy were compared by X-ray photoelectron spectroscopy with the black zirconia ($ZrO_{2-x}$) prepared in example 17 and the zirconia ($ZrO_2$) of comparative example 11. The results are shown in FIGS. 69 and 70. At this time, for the X-ray photoelectron spectroscopy (XPS), ESCALAB 250 XPS system using Al Kα (150 W) source was used.

As shown in FIGS. 69 and 70, both the black zirconia ($ZrO_{2-x}$) prepared in example 17 and the zirconia ($ZrO_2$) of comparative example 11 displayed the same signals at 0~1200 eV and neither showed the signal corresponding to Mg is.

Therefore, it was confirmed that the black zirconia ($ZrO_{2-x}$) of the invention did not include Mg but contained the same components as the zirconia (ZrO2) had, which were Zr and O.

Experimental Example 38 Analysis of UV-VIS Absorption

The following experiment was performed to compare the light absorption characteristics of the black zirconia ($ZrO_{2-x}$) prepared according to the present invention and the conventional zirconia ($ZrO_2$) in ultraviolet and visible light.

Absorption spectra of the black zirconias ($ZrO_{2-x}$) prepared in examples 17~19 and the zirconia ($ZrO_2$) of comparative example 11 were obtained by using Ultraviolet-Visible-Near Infrared Spectrophotometer (CARY5000, Agilent Technology). The results are shown in FIGS. 71 and 72.

Figure 71:
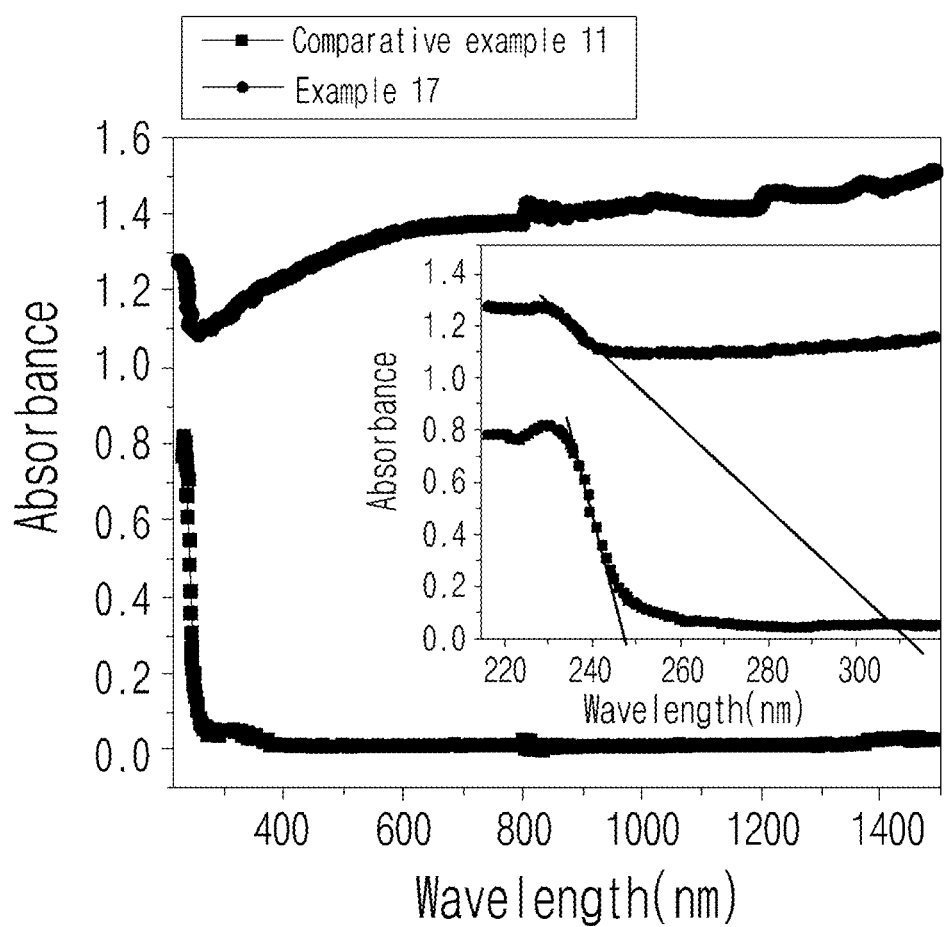
FIG. 71 is a graph illustrating the results of UV-VIS absorption analysis performed with the zirconias prepared in the comparative example and the example of the present invention.
Figure 72:
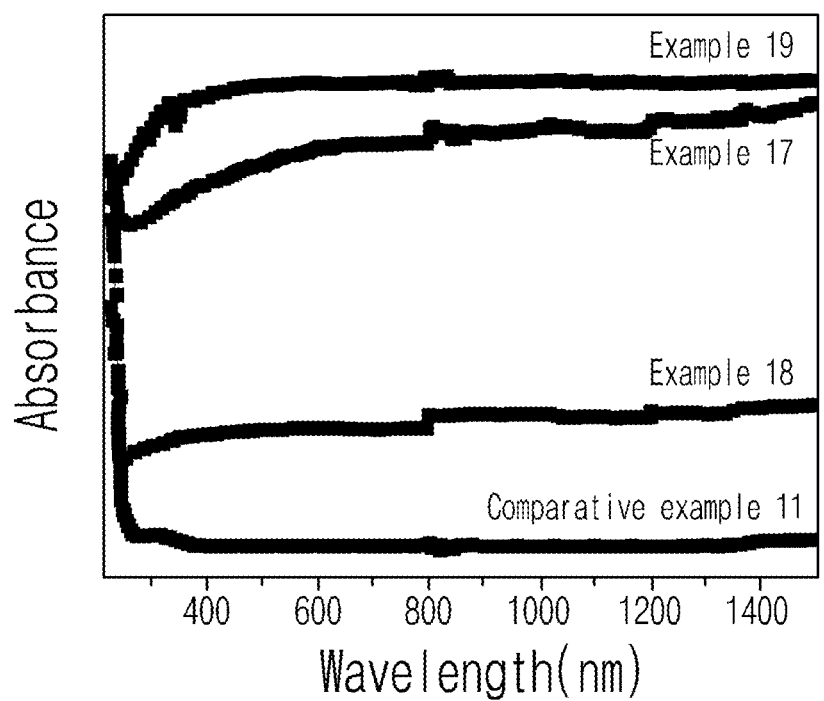
FIG. 72 is a graph illustrating the results of UV-VIS absorption analysis performed with the zirconia prepared in the example of the present invention.

As shown in FIG. 71, the zirconia ($ZrO_2$) of comparative example 11 displayed unique light absorption characteristics at a wavelength of about 246 nm in the ultraviolet region, while the black zirconia ($ZrO_{2-x}$) prepared in example 17 demonstrated excellent light absorption characteristic in the visible light and infrared region. As shown in FIG. 72, the black zirconia ($ZrO_{2-x}$) prepared in example 17 showed the higher light absorption rate than the black zirconia ($ZrO_{2-x}$) prepared in example 18, and also the zirconia ($ZrO_{2-x}$) prepared in example 19 showed the higher light absorption rate than the black zirconia ($ZrO_{2-x}$) prepared in example 17.

Therefore, it was confirmed that the black zirconia ($ZrO_{2-x}$) prepared according to the preparation method of the present invention had excellent light absorption characteristics in the visible light and ultraviolet region, and when the content of Mg was increased in the zirconia ($ZrO_{2-x}$), the light absorption characteristics was improved.

Experimental Example 39 Measurement of Bandgap

The following experiment was performed to determine the bandgaps of the black zirconia ($ZrO_{2-x}$) prepared according to the present invention and the conventional zirconia (ZrO2).

Absorption spectra of the black zirconia ($ZrO_{2-x}$) prepared in examples 17 and the zirconia ($ZrO_2$) of comparative example 11 were obtained by using Ultraviolet-Visible-Near Infrared Spectrophotometer (CARY5000, Agilent Technology). The band gap was obtained from the Tauc plot based on the results above. The results are shown in FIG. 73.

At this time, the Tauc plot is a graph showing the light absorption amount to the photo energy, and the energy bandgap can be obtained by a method of linear extrapolation of the slope of the graph to the energy axis.

Figure 74:
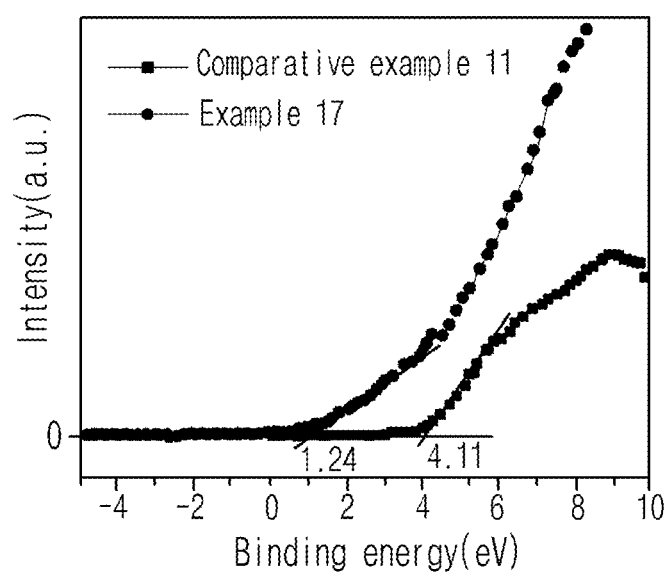
FIG. 74 is a graph illustrating the results of X-ray photoelectron spectroscopy (XPS).
Figure 75:
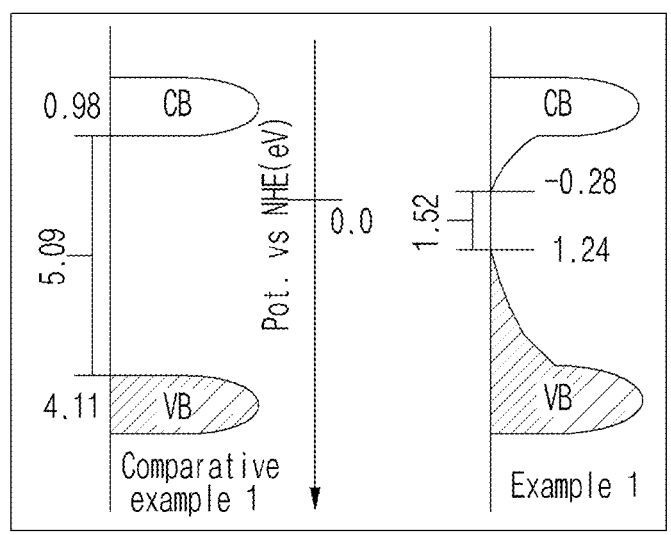
FIG. 75 is a schematic diagram illustrating the band energy diagram.

FIG. 74 illustrates the XPS graph comparing the upper positions of the valence band of the black zirconia ($ZrO_{2-x}$) prepared in example 17 and the zirconia ($ZrO_2$) of comparative example 11. FIG. 75 presents the band energy diagram obtained by considering the upper position of the valence band and the bandgap.

Figure 73:
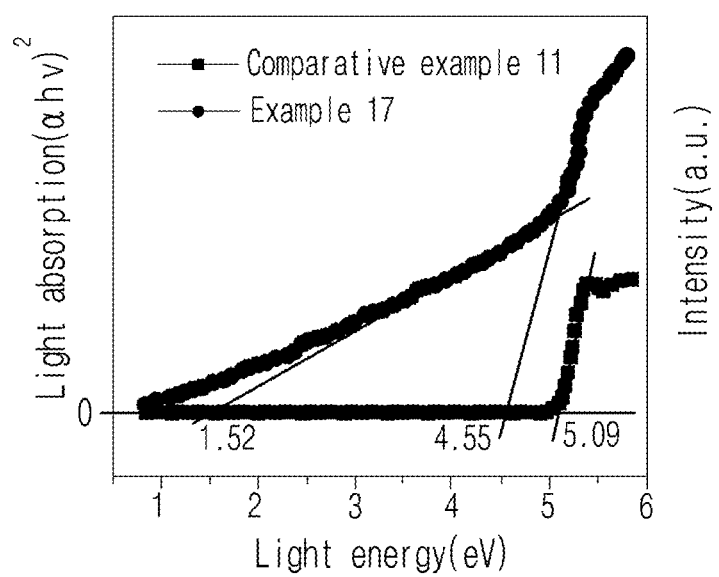
FIG. 73 illustrates a Tauc plot for measuring the bandgap.

As shown in FIG. 73, the zirconia ($ZrO_2$) of comparative example 11 showed the bandgap of 5.09 eV, while the black zirconia ($ZrO_{2-x}$) prepared in example 17 had the bandgap of 4.55 eV and the adjusted bandgap of 1.5 eV.

As shown in FIG. 74, the valence band energy of each of the black zirconia ($ZrO_{2-x}$) prepared in example 17 and the zirconia ($ZrO_2$) of comparative example 11 was respectively 1.24 and 4.11.

As shown in FIG. 75, the black zirconia ($ZrO_{2-x}$) prepared according to the present invention had a narrower bandgap than that of zirconia ($ZrO_2$) as a result of elevation of the valence band position. The change in the energy bandgap was attributed to the oxygen vacancy formed on the surface of the black zirconia ($ZrO_{2-x}$)

Experimental Example 40 Calculation of Bandgap Using Density Functional Theory (DFT)

Figure 76:
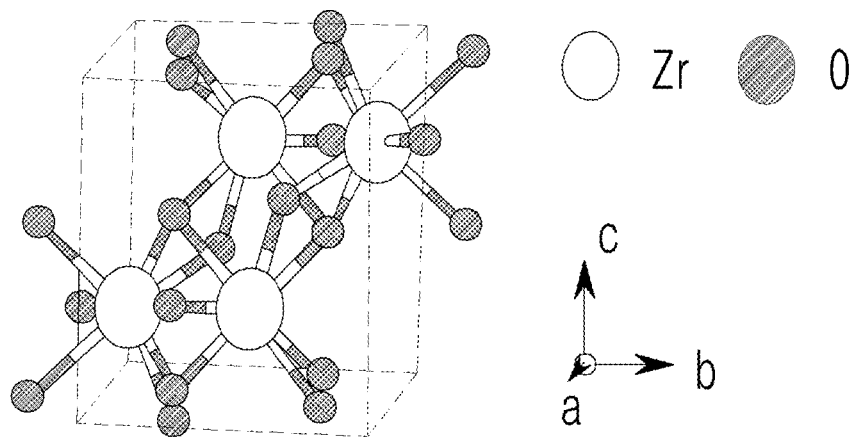
FIG. 76 is a schematic diagram illustrating the unit cell of the conventional zirconia.
Figure 77:
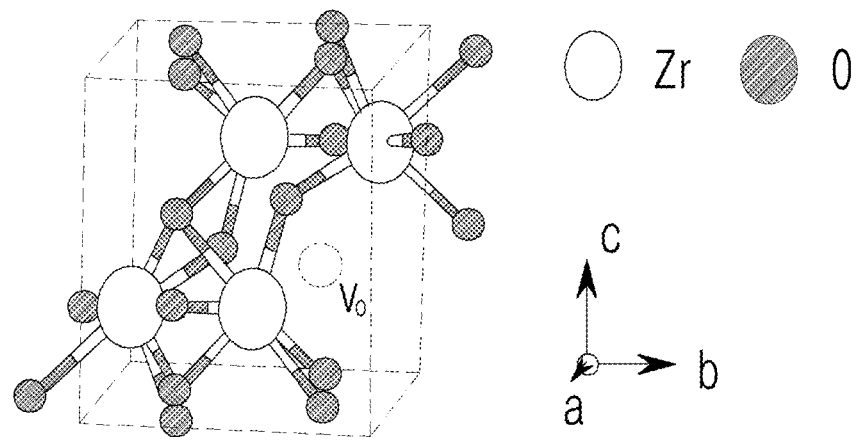
FIG. 77 is a schematic diagram illustrating the unit cell of the oxygen deficient black zirconia prepared in the example of the present invention.

To theoretically determine the bandgap of the black zirconia ($ZrO_{2-x}$) prepared according to the present invention and the conventional zirconia ($ZrO_2$), modeling of the atomic position was performed and the results are shown in FIGS. 76 and 77. The bandgap was calculated by using density functional theory (DFT) based on the positions obtained above. The results are shown in FIG. 78 wherein the results of the conventional zirconia are shown in the upper part and the results of the black zirconia ($ZrO_{2-x}$) of the present invention are shown in the lower part.

As shown in FIGS. 76 and 77, the conventional zirconia ($ZrO_2$) had 12 atoms in the monoclinic unit cell, while the black zirconia ($ZrO_{2-x}$) had oxygen vacancy instead in the monoclinic unit cell.

Figure 78:
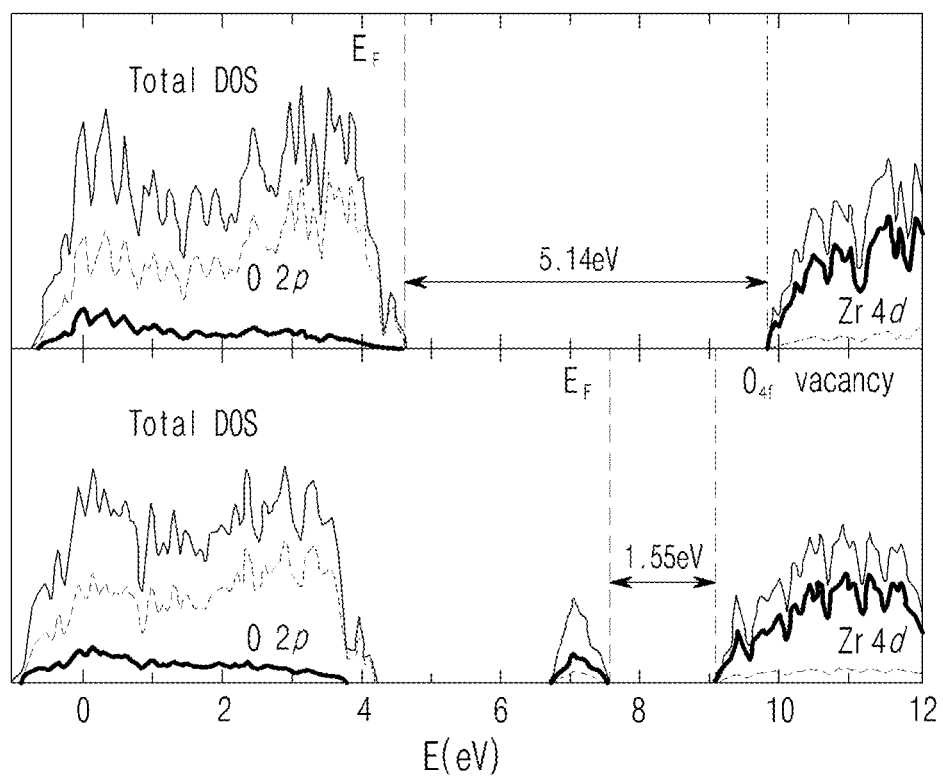
FIG. 78 is a graph illustrating the bandgaps of the conventional zirconia and the black zirconia prepared in the example of the present invention which are calculated by using density functional theory (DFT).

As a result of the investigation of the density of state, as shown in FIG. 78, the bandgap of each of the conventional zirconia ($ZrO_2$) and the black zirconia ($ZrO_{2-x}$) of the present invention was respectively 5.14 eV and 1.55 eV. These results were consistent with the values measured in experimental example 33.

Experimental Example 41 Measurement of Photoluminescence (PL)

The following experiment was performed to measure the photoluminescence (PL) of the black zirconia ($ZrO_{2-x}$) prepared according to the present invention and the conventional zirconia ($ZrO_2$).

The black zirconia ($ZrO_{2-x}$) prepared in example 17 and the zirconia ($ZrO_2$) of comparative example 11 were dispersed in ethanol (1 mg/5 ml). The photoluminescence (PL) spectrum was obtained by using a 5 nm slit at the excitation wavelength of 270 nm. The results are shown in FIG. 79.

At this time, the photoluminescence (PL) intensity is related to the recombination of electrons and holes, and the high intensity indicates the fast recombination.

Figure 79:
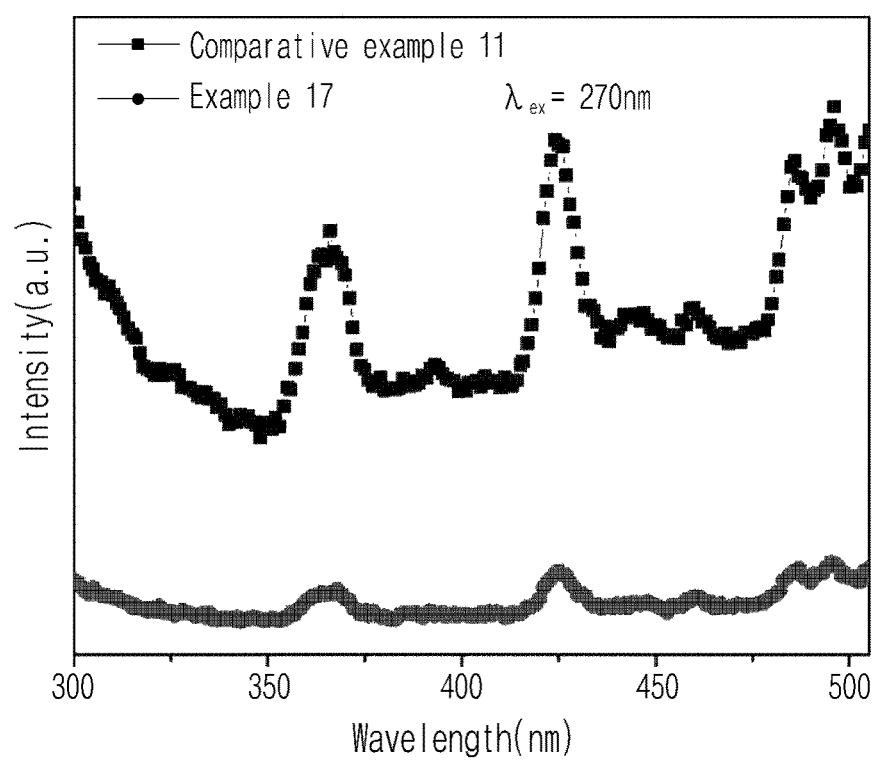
FIG. 79 is a graph illustrating the results of photoluminescence (PL) performed with the zirconias prepared in the comparative example and the example of the present invention.

As shown in FIG. 79, the black zirconia ($ZrO_{2-x}$) prepared according to the present invention shared the same peak with the conventional zirconia ($ZrO_2$) but showed the weaker intensity.

Therefore, it was suggested that the photoactivity efficiency was increased in the black zirconia ($ZrO_{2-x}$) prepared according to the present invention due to the slow recombination of electrons and holes.

Experimental Example 42 Evaluation of Photocatalytic Activity (1)—Evaluation of Rhodamine B (RhB) Removal Capacity The following experiment was performed to measure the photocatalytic activity by investigating the RhB removal capacity of the black zirconia ($ZrO_{2-x}$) prepared according to the present invention and the conventional zirconia ($ZrO_2$) The black zirconia ($ZrO_{2-x}$) prepared in example 17 and the zirconia ($ZrO_2$) of comparative example 11 were dispersed in 50 ml RhB (1 ppm) solution to prepare a mixed solution. The prepared mixed solution was loaded in a glass container, which was stirred under the light of entire solar wavelength given by 100 W Xenon lamp equipped with 1.5 G filter for 60 minutes, during which the decrease of rhodamine B (RhB) was measured. The results are shown in FIG. 80.

Figure 80:
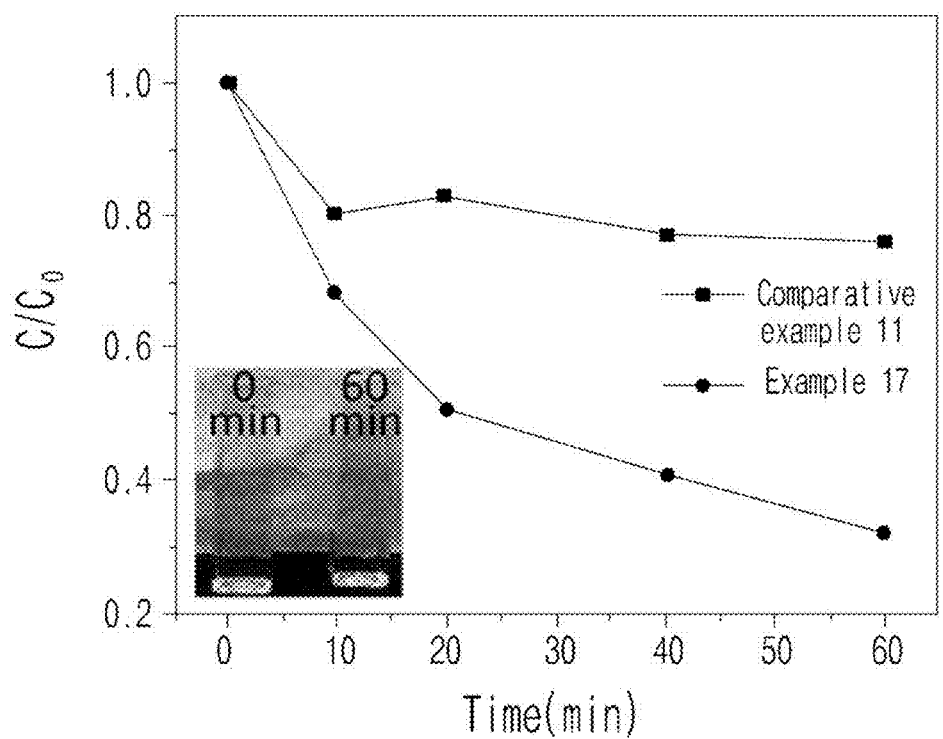
FIG. 80 is a graph illustrating the rhodamine B (RhB) degradation performance measured to evaluate the capability of the zirconias prepared in the comparative example and the example of the present invention as a photocatalyst.

As shown in FIG. 80, when the zirconia ($ZrO_2$) of comparative example 11 was used as a photocatalyst, the concentration of rhodamine B (RhB) was not changed. In the meantime, when the black zirconia ($ZrO_{2-x}$) prepared in example 17 was used as a photocatalyst, the concentration of rhodamine B (RhB) was significantly reduced.

Therefore, it was suggested that the black zirconia ($ZrO_2$) prepared in example 17 was able to absorb visible light taking the most part of sunlight, so that it could be an excellent photocatalyst.

Experimental Example 43 Evaluation of Hydrogen Generation Performance (1)—Evaluation of Photocatalytic Activity The following experiment was performed to investigate the photocatalytic activity of the black zirconia ($ZrO_{2-x}$) prepared according to the present invention and the conventional zirconia ($ZrO_2$) by measuring the hydrogen ($H_2$) generation from water ($H_2O$).

Preparation of Pt Deposited Photocatalyst

The black zirconia ($ZrO_{2-x}$) prepared in example 17 and the zirconia ($ZrO_2$) of comparative example 11 were loaded in the closed gas circulation system, to which 50 me of 20% methanol aqueous solution and $H_2PtCl_6 \cdot 6H_2O$ were added. The mixture was irradiated with UV under Ar atmosphere, resulting in the preparation of the black zirconia ($ZrO_{2-x}$) and zirconia ($ZrO_2$) photocatalysts deposited with Pt.

Hydrogen Generation Experiment 50 mg of the black zirconia ($ZrO_{2-x}$) photocatalyst or the zirconia ($ZrO_2$) photocatalyst deposited with Pt in the closed gas circulation system was added to methanol solution (50 ml, 20%), followed by irradiation with the light of entire solar wavelength using 100 W Xenon lamp equipped with 1.5 G filter for 250 minutes. At this time, methanol was used as a sacrificial reagent. The amount of hydrogen was determined by on-line gas chromatography (Bruker 450 GC) connected to the reactor. The reaction above was induced under At atmosphere at 25° C. The time dependent $H_2$ generation was measured and the results are shown in FIG. 81.

Figure 81:
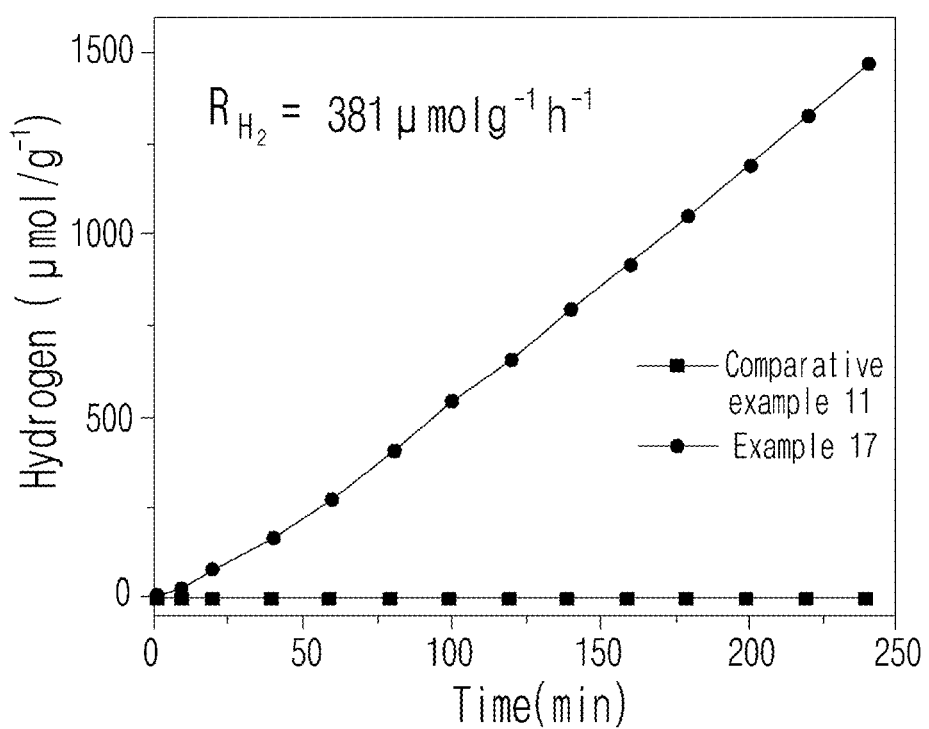
FIG. 81 is a graph illustrating the hydrogen generation performance measured to evaluate the capability of the zirconias prepared in the comparative example and the example of the present invention as a photocatalyst.

As shown in FIG. 81, when the zirconia ($ZrO_2$) of comparative example 11 was used as a photocatalyst, $H_2$ was not generated. On the other hand, when the black zirconia ($ZrO_{2-x}$) prepared in example 18 was used as a photocatalyst, $H_2$ was generated at the rate of 381 μmolg-1h-1.

The above results indicate that the black zirconia ($ZrO_{2-x}$) prepared in example 17 could absorb visible light taking the most part of sunlight, so that it could successfully completed the role of a photocatalyst for sunlight.

Experimental Example 44 Evaluation of Hydrogen Generation Performance (2)—Evaluation of Photocatalytic Stability The following experiment was performed to investigate the photocatalytic stability of the black zirconia ($ZrO_{2-x}$) prepared according to the present invention.

Pt was deposited on the black zirconia ($ZrO_{2-x}$) prepared in example 17 by the same manner as described in experimental example 43. The $H_2$ generation was induced by the same manner as described in experimental example 43 for 2 hours a day for 7 days. The reaction mixture was stored in the atmospheric state for 23 days and then the reaction was induced again on the 30$^{th}$ day for 2 hours to evaluate the photocatalytic stability of the black zirconia ($ZrO_{2-x}$). The amount of $H_2$ generated during the repeated irradiation with the entire wavelength of sunlight for 30 days was measured over the time and the results are shown in FIG. 82.

Figure 82:
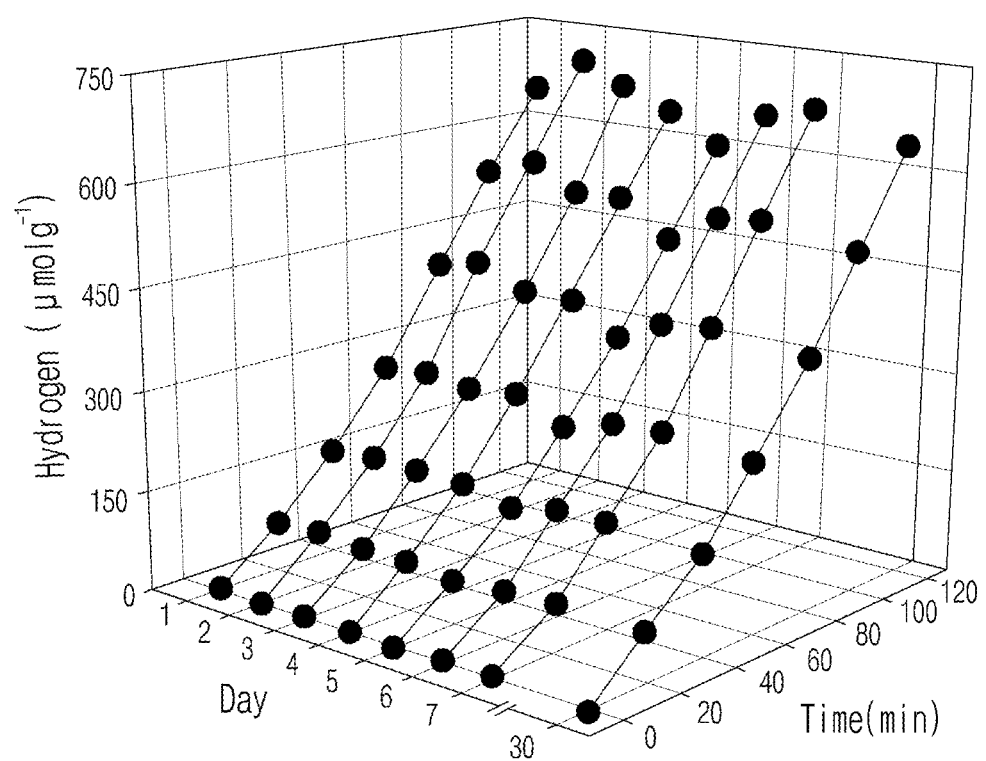
FIG. 82 is a graph illustrating the photocatalytic stability of the zirconia prepared in the example of the present invention.

As shown in FIG. 82, the amount of $H_2$ generated during the constant irradiation with the entire wavelength of sunlight for 30 days was constant. This result indicates that the black zirconia ($ZrO_{2-x}$) prepared in example 17 demonstrated a stable photocatalytic activity.

Experimental Example 45 Evaluation of Hydrogen Generation Performance (3)—Performance Evaluation According to Magnesium (Mg) Content The following experiment was performed to compare the photocatalytic activity according to the content of magnesium (Mg) included in the photocatalyst prepared according to the present invention.

Pt was deposited on the black zirconias ($ZrO_{2-x}$) prepared in examples 17~19 by the same manner as described in experimental example 43. The $H_2$ generation was induced by the same manner as described in experimental example 43. The amount of $H_2$ was measured over the time and the results are shown in FIG. 83.

Figure 83:
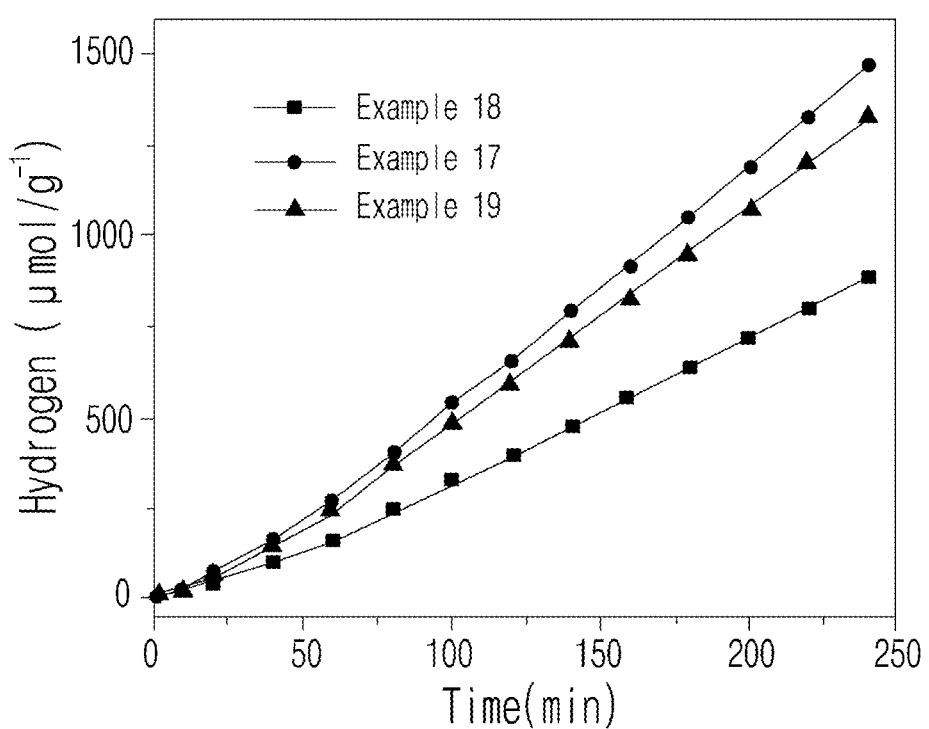
FIG. 83 is a graph illustrating the hydrogen generation performance of the zirconias prepared with different contents of magnesium.

As shown in FIG. 83, the black zirconia ($ZrO_{2-x}$) prepared in example 1 wherein zirconia and Mg were included at the molar ratio of 1:1 showed the highest $H_2$ generation rate of 381 μmolg-1h-1.

Experimental Example 46 Evaluation of Hydrogen Generation Performance (4)—Performance Evaluation According to Manufacturing Conditions The following experiment was performed to compare the photocatalyst performance according to the manufacturing conditions.

Pt was deposited on the black zirconias ($ZrO_{2-x}$) prepared in examples 17~19 and the zirconias of comparative examples 11~14 by the same manner as described in experimental example 43. The $H_2$ generation was induced by the same manner as described in experimental example 43. The $H_2$ production rate was measured and the results are shown in FIG. 84.

Figure 84:
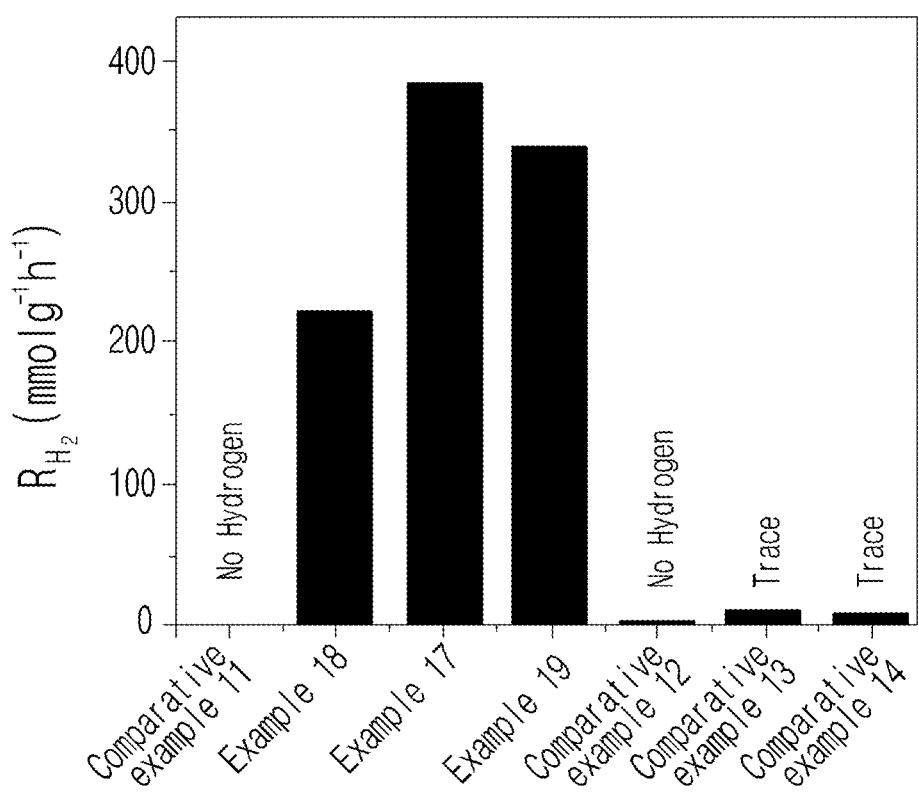
FIG. 84 is a bar graph illustrating the hydrogen generation rate of the zirconias prepared in the comparative example and the example of the present invention.

As shown in FIG. 84, the black zirconias ($ZrO_{2-x}$) prepared in examples 17~19 showed a high $H_2$ generation rate, while the zirconia of comparative example 12 which only used Ar in the course of the heat-treatment did not generate $H_2$ at all. When the zirconia prepared in comparative example 13 using $H_2$ alone and the zirconia prepared in comparative example 14 using Mg alone were used, a very small amount of hydrogen was generated.

Therefore, it was confirmed that in order to increase the photocatalytic activity in the sunlight, both Mg and $H_2$ are necessary in the course of heat-treatment to prepare the black zirconia ($ZrO_{2-x}$). At this time, the black zirconia ($ZrO_{2-x}$) with the highest photocatalytic efficiency can be prepared.

INDUSTRIAL APPLICABILITY

The method of reducing a metal oxide of the present invention can easily reduce metal oxides such as $TiO_2$, $ZrO_2$, $V_2O_3$, and $Fe_2O_3$, and can regulate the reduction in order to prepare any titania material usable in a variety of fields. The method of reducing a metal oxide of the present invention is also advantageous to prepare the reduced titania having an excellent photocatalytic efficiency in the visible light region, compared with the conventional method, so that it can be effectively used to generate hydrogen, the clean energy resources, from water using sunlight.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. A method of producing a photocatalyst containing platinum (Pt) comprising:
preparing a mixture by mixing titania ($TiO_2$) and magnesium hydride ($MgH_2$) (step 1);
preparing a photocatalyst by heat-treating the mixture (step 2); and
dispersing the photocatalyst in a solution containing a platinum (Pt) precursor and irradiating the solution to form platinum (Pt) having a diameter of 0.5-5 nm on a surface of the photocatalyst (step 3),
wherein a molar ratio of the magnesium hydride ($MgH_2$) to the titania ($TiO_2$) is 0.1-1 in step 1.

2. The method of producing a photocatalyst containing platinum (Pt) according to claim 1, wherein the platinum (Pt) is included at a concentration of 0.1-5 weight % based on a weight of the photocatalyst.

3. The method of producing a photocatalyst containing platinum (Pt) according to claim 1, wherein the photocatalyst has the same crystal structure as the titania ($TiO_2$).

4. The method of producing a photocatalyst containing platinum (Pt) according to claim 1, wherein the photocatalyst comprises nanoparticles having a diameter of 5-50 nm.

5. The method of producing a photocatalyst containing platinum (Pt) according to claim 1, wherein the photocatalyst has a hollow surface.

6. The method of producing a photocatalyst containing platinum (Pt) according to claim 1, wherein the photocatalyst shows a solar to H2 (STH) efficiency of 1-4% when it is used for $H_2$ generation reaction.

\* \* \* \* \*